(12) United States Patent
Onaka et al.

(10) Patent No.: US 6,351,323 B1
(45) Date of Patent: Feb. 26, 2002

(54) OPTICAL TRANSMISSION APPARATUS, OPTICAL TRANSMISSION SYSTEM, AND OPTICAL TERMINAL STATION

(75) Inventors: Hiroshi Onaka; Hideyuki Miyata; Kazue Otsuka; Yutaka Kai; Tadao Nakazawa; Terumi Chikama, all of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/080,399

(22) Filed: May 18, 1998

(30) Foreign Application Priority Data

Apr. 2, 1998 (JP) .......................................... 10-090383

(51) Int. Cl.[7] .............................................. H04B 10/04
(52) U.S. Cl. ...................... 359/187; 359/110; 359/308
(58) Field of Search ................................. 359/187, 124, 359/130, 110, 117, 128, 285, 305, 307, 308; 372/13, 20; 385/7, 15

(56) References Cited

U.S. PATENT DOCUMENTS

| | | | |
|---|---|---|---|
| 5,276,543 A | 1/1994 | Olshansky | 359/124 |
| 5,444,528 A | 8/1995 | Puschell | 356/73 |
| 5,452,314 A * | 9/1995 | Aronson | 372/20 |
| 5,724,179 A * | 3/1998 | Hosoi | 359/308 |
| 5,796,882 A | 8/1998 | Schmid | 385/11 |
| 5,850,491 A | 12/1998 | Morasca et al. | 385/7 |
| 6,211,980 B1 * | 4/2001 | Teruhara | 359/128 |

FOREIGN PATENT DOCUMENTS

| | | |
|---|---|---|
| JP | 09-113855 | 5/1997 |
| WO | 97/10658 | 3/1997 |

OTHER PUBLICATIONS

T. Nakazawa et al., "Development of Lithium–Niobate Tunable Filters", *IEICE, OPE96–123*, Dec., 1996, pp. 79–84.

Hosoi et al., "Polarization Independent Tunable Filter Using a Straightly Focused Acoustic Beam on X–cut Y–propagating $LiNbO_3$", *Technical Report of IEICE, OPE97–8*, May, 1997, pp. 41–46.

Fukutoku, et al., "Optical Beat–Induced Crosstalk of an Acousto–Optic Tunable Filter for WDM Network Application", *Technical Report of IEICE, OCS94–38*, pp. 39–45, Jul. 1994.

F. Tian, et al., "Interchannel Interference in Multiwavelength Operation of Integrated Acousto–Optical Filters and Switches", *Journal of Lightwave Technology*, Jun., 1995, vol. 13, No. 6, pp. 1146–1154.

(List continued on next page.)

*Primary Examiner*—Thomas Mullen
(74) *Attorney, Agent, or Firm*—Staas & Halsey LLP

(57) ABSTRACT

In an OADM system, an OADM device includes an AOTF. The AOTF can select an optional wavelength by changing the frequency of an RF signal to be applied. An optical signal having a specified wavelength can be dropped from a wavelength-multiplexed optical signal input from an input terminal, or a wavelength-multiplexed optical signal input from an add port can be multiplexed with a through optical signal. However, considering the increase in coherent cross talk, the AOTF should be exclusively used for dropping in an actual device configuration. Otherwise, a drop optical signal is branched by an optical coupler with the wavelength selected by a tributary station. Thus, the wavelength selected by the tributary station can be extracted by the AOTF from the through optical signal.

28 Claims, 57 Drawing Sheets

OTHER PUBLICATIONS

Perrier, et al., "Rack–mounted optical Add/Drop Multiplexers in Self–Healing Multiwavelenght Ring Network Demonstrator", *PThA4, Photonics in Switching*, Sendai, Apr., 1996.

K. Nakaya et al., "LiNbO$_3$ Acousto–optic tunable module with temperature control function", The 1997 IEICE Spring Conference, 1997, p. 370.

M. Misono,et al., "Wavelength Switching and Stabilization of Acousto–Optic Tunable Filter", The 1995 IEICE Spring Conference, 1995, p. 539.

M. Sakauchi, et al., "Multi–channel optical wavelength controller utilizing AO filter for WDM transmission", The 1996 IEICE Fall Conference, Communication Society, 1996, p. 576.

T. Yoshida et al., "Control of Optical Output Level of WDM Optical Fiber Amplifier", The 1996 IEICE Fall Conference, Communication Society, 1996, p. 581.

T. Hosoi et al., "Wide Tunable Range and Low Sidelobe Level of Double–stage Polarization Independent Acousto–optic Tunable Fitler", The 1996 IEICE Spring Conference, 1996, p. 254.

W. Kawakami et al., "A field experiment of WDM Hub node employing simple ADM configuration with 2R regenerators", The 1997 IEICE Spring Conference, 1997, p. 738.

K. Asahi et al., "WDM four fiber ring experiment", The 1997 IEICE Spring Conference, 1997, p. 739.

T. Sasaki et al., "8 Channel 2.4Gb/s Narrow Band–WDM Transmission Experiment with ADM In–line Amplifier over 600km fibers", The 1997 IEICE Spring Conference, 1997, p. 740.

S. Yamaguchi, et al., "Control of Add signal level for Optical ADM" The 1997 IEICE Spring Conference, 1997, p. 742.

D. Uehara, et al., "Optical add/drop multiplexer using wavelength selectable optical transmitter", The 1997 IEICE Spring Conference, 1997, p. 741.

N. Nagatsu, et al., "WDM ring architectures and networking capability", The 1997 IEICE Fall Conference, Communication Society, 1997, p. 382.

D. Uehara, "Highly Reliable and Economical WDM Ring with Optical Self–Healing and 1:N Wavelenght Protection", The 1997 IEICE Fall Conference, Communication Society, p. 383.

K. Shimano, et al., Node configuration on OADM ring sytem, The 1997 IEICE Fall Conference, Communication Society, 1997 p. 384.

H. Takeshita, et al., "A Development of Optical Network Ssytem (1)—A Study on Alarm Monitoring and Transferring Scheme for Self–Healing Optical Path Network", The 1997 IEICE Fall Conference, Communication Society, 1997 p. 393.

H. Obara, et al., "Transmission over a 200–km single–fiber bidirectional ring network with reconfigurable WDM add/drop repeaters", The 1997 IEICE Fall Conference, Communication Society, 1997, p. 401.

M. Shigematsu, et al., "Analog Transmission Characteristics of Fiber–Bragg–Grating–Based Optical Taps", The 1997 IEICE Fall Conference, Communication Society, 1997 p. 365.

M. Yamashita, et al., "An Optical Signal Monitor Circuit for WDM Network", The 1997 IEICE Fall Conference, Communication Society, 1997, p. 357.

Chang et al., "Multiwavelength Reconfigurable WDM/ATM/SONET Network Testbed", *Journal of Lightwave Technology*, vol. 14, No. 6, Jun. 1996, pp. 1320–1340.

Shibata, "Position of high–density wavelength multiplexing optical communciation", *Special edition: Technology related to high–density wavelength division multiplexing optical communication, O plus E*, Oct., 1997, No. 215, pp. 88–89.

K. Sato et al., "Photonic network and wavelength multiplexing technology", *Special edition: Technology related to high–density wavelength division multiplexing optical communication, O plus E*, Oct., 1997, No. 215, pp. 90–99.

M. Saruwatari, "Wavelenth multiplexing system technology aiming at a large capacity and a long distance", *Special edition: Technology related to high–density wavelength division multiplexing optical communication, O plus E*, Oct., 1997, No. 215, pp. 100–108.

M. Suzuki, "Optical soliton and wavelength multiplexing", *Special edition: Technology related to high–density wavelength division multiplexing optical communication, O plus E*, Oct., 1997, No. 215, pp. 109–120.

Y. Inoue, "Optical fiber non–linear property and wavelength multiplexing process", *Special edition: Technology related to high–density wavelength division multiplexing optical communication, O plus E*, Oct., 1997, No. 215, pp. 121–127.

K. Tsujimura, "Apparatus configuration of wavelength–multiplexing optical communcation system", *Special edition: Technology related to high–density wavelength division multiplexing optical communication, O plus E*, Oct., 1997, No. 215, pp. 128–135.

K. Oguchi, "Standardization Trend on Optical Networking", *Special edition: Technology related to high–density wavelength division multiplexing optical communication (2), O plus E*, Oct., 1997, No. 215, pp. 109–118.

K. Okamoto, "Optical Multiplexing and Demultiplexing Componenets for Wavelenght Multiplexing", *Special edition: Technology related to high–density wavelength division multiplexing optical communication (2), O plus E*, No. 216, pp. 119–126.

S. Sudo, "Optical Amplifiers for Wavelenght Multiplexing", *Special edition: Technology related to high–density wavelength division multiplexing optical communication (2), O plus E*, Oct., 1997, No. 216, pp. 127–134.

Y. Yoshikuni, "Optical Semiconductor Components", *Special edition: Technology related to high–density wavelength division multiplexing optical communication (2), O plus E*, Oct., 1997, No. 216, pp. 135–142.

M. Nishimura, "Optical Fiber for Wavelength Division Multiplexing", *Special edition: Technology related to high–density wavelength division multiplexing optical communication (2), O plus E*, No. 216, pp. 143–148.

\* cited by examiner

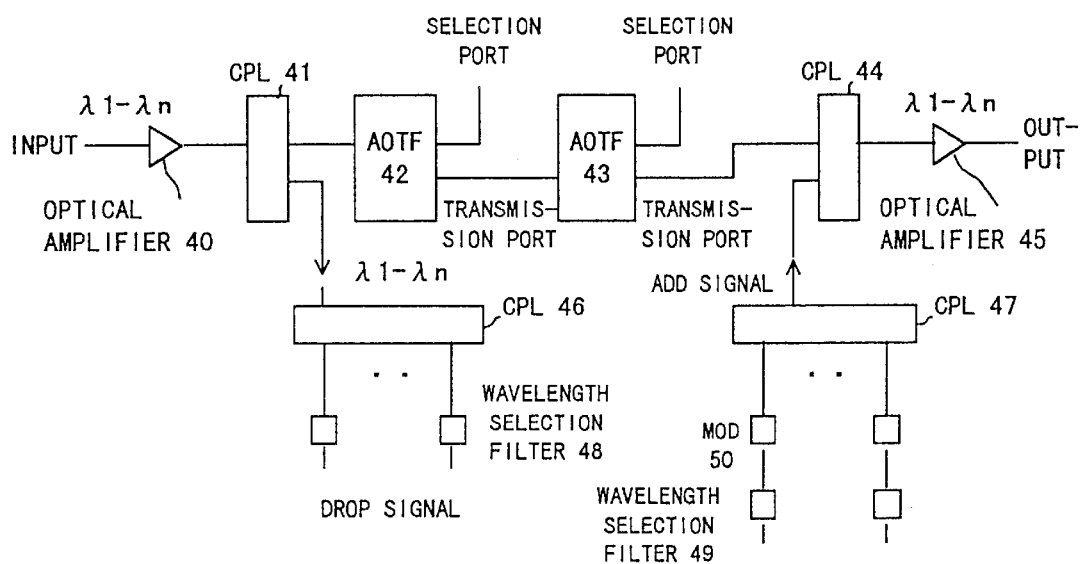
F I G. 4A
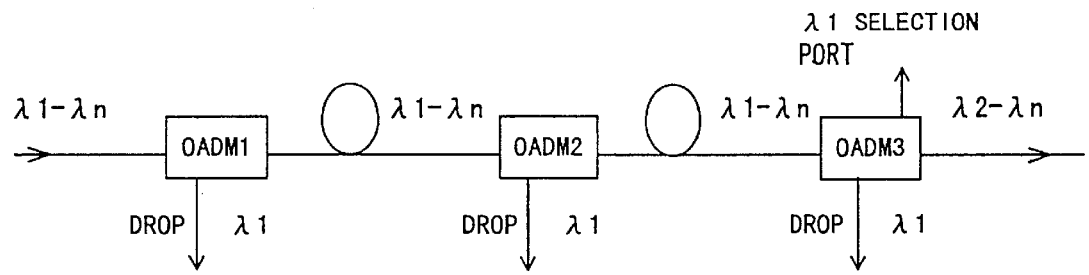
F I G. 4B

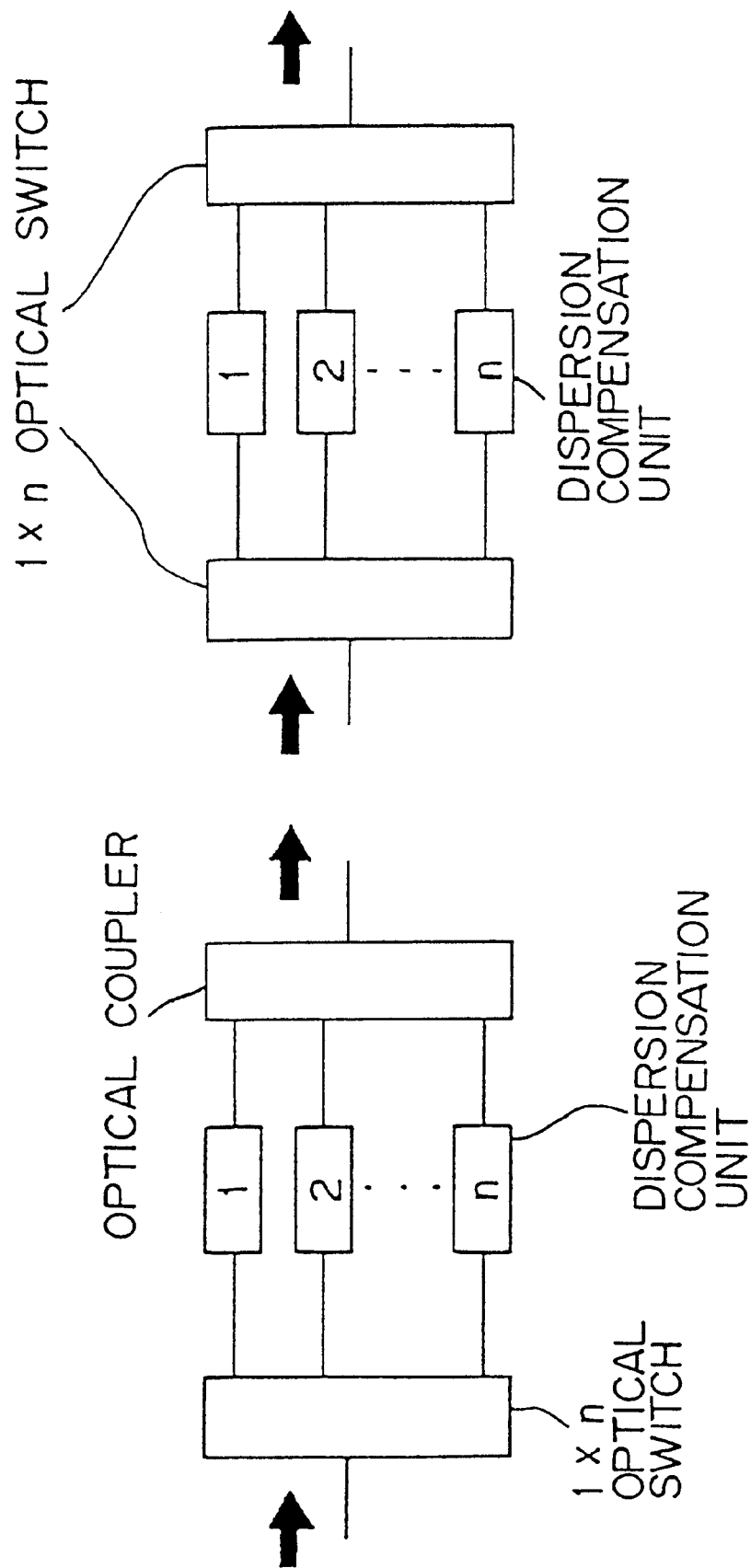

OPTICAL TRANSMISSION APPARATUS, OPTICAL TRANSMISSION SYSTEM, AND OPTICAL TERMINAL STATION

This application incorporates the following related applications by reference: Japanese Patent Application Nos. 07-075787; 07-214733; 05-198674, related to U.S. Pat. Nos. 5,696,614, 5,602,666, 5,612,807, 5,636,046; 08-098704, related to U.S. Ser. No. 08/752,516, now U.S. Pat. No. 5,877,881; 09-044406; 09-044407; 10-040113; 10-038908; 10-090383; 10-072810; 10-020615; 09-216050; 09-201825, related to U.S. Ser. No. 09/017,692, now U.S. Pat. No. 6,104,847; 09-240934; and 09-287489.

BACKGROUND OF THE INVENTION

1. Field of the Invention

The present invention relates to an optical wavelength division multiplexing network.

2. Description of the Related Art

For a future multimedia network, a super-long and large capacity optical communications system and a light wave network using the system is demanded with research and development proceeding vigorously.

A conventional system for realizing large-capacity data communications can be a time-division multiplexing (TDM) system, an optical time-division multiplexing (OTDM) system, a wavelength-division multiplexing (WDM) system, etc.

Among these systems for realizing the functions of the above described light wave network, the WDM system can utilize the broadband and large capacity of optical fibers, and can select, branch, and insert an optical transmission signal independent of a modulation system or speed using an optical wavelength multiplexer/demultiplexer (optical filter).

That is, the light wave network requires an add/drop multiplexer (ADM) for adding/branching signals as necessary, and optical routing and cross-connecting functions for selecting a transmission line.

An add/drop multiplexer has been studied and developed for adding/branching an optical signal. The add/drop multiplexer can be a fixed-wavelength type for adding/ branching optical signals having fixed wavelengths; and an optional wavelength type for adding/branching optical signals having optional wavelengths.

A device of the fixed wavelength type includes, for example, a circulator and a fiber grating, and reflects one of the transmitted optical signals, which has a specific wavelength, on the fiber grating to branch it through the circulator. When an optical signal is added, the optical signal to be added is temporarily transmitted to the fiber grating through the circulator. A specific wavelength is reflected on the fiber grating, and the optical signal is multiplexed with an optical signal passing through a transmission line.

In such a device of the fixed wavelength type, the wavelengths of added/branched optical signals are determined when the system is produced. Consequently, there is the problem that a large number of requests to the light wave network cannot be completely satisfied.

On the other hand, since the wavelengths of added/ branched optical signals in a device of the optional wavelength type can be changed through a remote operation even after the system has been produced, a request to change added/branched wavelengths (channels) can be easily satisfied.

FIG. 1 shows an example of the configuration of an optical ADM device using an optical switch.

A wavelength multiplexed light having the wavelengths $\lambda 1$ through $\lambda n$ is input from the input terminal to a demultiplexer (DMUX), and is branched into optical signals having respective wavelengths. An optical signal having each wavelength is input to a 2×2 optical switch provided for each wavelength. The 2×2 optical switch passes each optical signal through, or drops it.

The optical signal dropped by the 2×2 optical switch is transmitted to a tributary station (branch station). An optical signal passing through the 2×2 optical switch is input to a multiplexer as is, multiplexed into a wavelength multiplexed light, and then output. An optical signal dropped by the 2×2 optical switch is transmitted to a tributary station. The tributary station first multiplexes the dropped optical signal through a wavelength multiplexer/demultiplexer, and then branches the multiplexed optical signal to provide an optical signal to an optical receiver OR provided for each channel. Although not shown in FIG. 1, the optical receiver OR is provided with a wavelength selection filter, selects an optical signal having a predetermined wavelength from among optical signals branched by a wavelength multiplexer/ demultiplexer, and receives the selected signal.

Thus, an optical signal having a specified wavelength can be dropped by demultiplexing, by the OADM device, the optical signal wavelength-multiplexed into signals of respective wavelengths and dropping each optical signal. At the terminal of a tributary station, an optical signal of a specified wavelength (channel) can be received by selecting a desired wavelength from among dropped optical signals and receiving an optical signal having the selected wavelength. Especially, when dropped wavelengths are different from each other, the wavelength of an optical signal received by, for example, the first optical receiver can be variable if a wavelength selection filter provided before the optical receiver OR can select variable wavelengths.

An electric signal converted from an optical signal by an optical receiver OR is processed by an electric ADM device (E ADM) for performing an add/drop multiplexing using an electric signal. A signal to be transmitted from a tributary station is output from the E ADM, and is converted into an optical signal by an optical transmitter OS for output. The wavelength of the optical signal output from each of the optical transmitters OS of the tributary station shown in FIG. 1 is one of the wavelengths dropped by the OADM device, and is output to an optical switch. An optical switch switches the optical path of an optical signal transmitted from an optical transmitter OS, and transmits an optical signal having a corresponding wavelength to a 2×2 optical switch which performs a dropping process. Each 2×2 optical switch for performing a dropping process receives an optical signal having the same wavelength as the dropped optical signal from the tributary station, and transmits the signal to a multiplexer MUX. Thus, the optical signal transmitted from the tributary station is multiplexed with the optical signal passing through the OADM device, and is output as a wavelength multiplexed optical signal.

An OADM device of an optional wavelength type can normally be the above described device using an optical switch. However, it does not operate quickly. Furthermore, when an optical network is operated by a system using a smaller number of wavelengths than the maximum number of multiplexed wavelengths, it has output/input ports of a multiplexer and a demultiplexer, which are not required, and therefore has unnecessary equipment. Additionally, when a 2×2 optical switch is equipped from the beginning, it is an unnecessary optical switch consuming the initial investment.

In the above described system, since an optical signal is branched by the multiplexer to optical signals having each wavelength, the multiplexer has the characteristic of a band pass filter for optical signals having each wavelength. If devices having such a characteristic of a band pass filter are connected in series, small differences in pass band are accumulated and cause the problem that the pass band of the entire system becomes very narrow for each wavelength. Therefore, to solve the problem, the pass bands of optical devices should strictly match each other, thereby imposing severe restrictions on the system design and mounting operations.

Furthermore, since the optical signal is AM-modulated, a side band is generated in the component of a wavelength. If such an optical signal is propagated through a system having a very narrow pass band, then the wavelength is undesirably varied, and the receiving unit may not be able to receive an optical signal. In the worst case, the system cannot propagate an optical signal.

The above described problem occurs when the system is designed such that all wavelengths are temporarily demultiplexed by a multiplexer/demultiplexer, etc. Therefore, when a fiber grating is used as in a device of a fixed wavelength type, only an optical signal having a dropped wavelength is removed and the characteristic of the fiber grating for the components of other wavelengths is flat. As a result, there is not the above described problem that the pass band is narrow for the entire system.

Therefore, the OADM device can be designed using a fiber grating. However, since the fiber grating itself is fixed to a selected wavelength, one is required for each wavelength and an optical switch is also required for each fiber grating when an OADM device of an optional wavelength type is designed, thereby generating a slow device.

Furthermore, since the OADM device must cooperate with an electric ADM device to process a signal, the system is costly when an electric ADM device is initially provided for each wavelength. Therefore, the system should be designed such that the sum of the cost of the electric ADM device to be provided and the cost of the OADM device can be as small as possible.

In response to the request to increase the number of multiplexed wavelengths, small switches may have to be combined to construct a large scale switch, since matrix switches required to process the wavelengths for 32 wavelengths are not available. In this case, however, a scale of a switch becomes very large, and it is undesirable when considering a downsizing of the equipment of an OADM system.

To solve the above described problem, an acoustooptic tunable filter (AOTF) can be used. Since the AOTF extracts only the light having a dropped wavelength in the same manner as a fiber grating, the wavelength characteristic for the optical signal is flat, thereby solving the above described problem that the pass band is narrow for the entire system. Furthermore, unlike the fiber grating, a wavelength to be dropped is optionally selected. Consequently, the OADM device of the optional wavelength type can be easily designed. Furthermore, since the AOTF can be used as a wavelength selection filter, the band pass filter of the fixed transmission wavelength type can be replaced with the AOTF as a wavelength selection filter of a tributary station. Thus, it is a device applicable in many fields, inexpensive, and appropriate for use in an OADM device.

SUMMARY OF THE INVENTION

The present invention aims at providing an optical wavelength multiplexed network and a device which are reliable using an AOTF, and excel in cost-effectiveness.

The optical transmission apparatus according to the present invention in a WDM communications system branches and adds an optical signal having an optional wavelength, and includes at least two variable wavelength selection filters, that is, a first variable wavelength selection filter for branching and adding a part of optical signals to be branched and added; and a second variable wavelength selection filter for branching and adding the optical signals which are to be branched and added, but have not been selected by the first variable wavelength selection filter. With this configuration, the optical transmission apparatus branches or adds all optical signals to be added and branched using a plurality of variable wavelength selection filters.

The optical terminal station according to the present invention receives an optical signal branched by the optical transmission apparatus for branching and adding an optical signal to be branched and added, and transmits an optical signal to be added to the optical transmission apparatus in a WDM optical communications system. The optical terminal station includes a wavelength multiplexer/demultiplexer for multiplexing a requested number of optical signals having a predetermined wavelength, and transmitting them as optical signals to be added to the optical transmission apparatus.

The optical transmission system according to the present invention includes an optical transmission apparatus for branching an optical signal having a predetermined wavelength in the wavelength multiplexed optical signals transmitted through a transmission line, and for adding an optical signal having a corresponding wavelength; and an optical terminal station for receiving an optical signal branched by the optical transmission apparatus and transmitting an optical signal to be added to the optical transmission apparatus. The optical transmission system further includes an optical amplifier for amplifying the optical signal branched by the optical transmission apparatus as necessary; an optical splitter for splitting the optical signal into a desired number of wavelengths; and an optical filter provided for each output from the optical splitter. With this configuration, the optical terminal station selects and receives a signal having a predetermined wavelength.

The optical transmission system according to another aspect of the present invention operates in an optical network containing an optical transmission apparatus for branching an optical signal from a transmission line or adding an optical signal to the transmission line; and a terminal station for receiving the optical signal branched by the optical transmission apparatus and transmitting an optical signal to be added to the optical transmission apparatus. The optical transmission system performs the following sequential process of: applying a predetermined RF frequency to a single-wave selection AOTF at a receiving terminal of the terminal station; branching a predetermined optical signal by applying the predetermined RF frequency to the branching/adding AOTF in the optical transmission apparatus after confirming that the single-wave selection AOTF enters a stable state; applying the predetermined RF frequency to the single-wave addition AOTF of the terminal station after confirming that the predetermined optical signal has been branched by an optical spectrum monitor; and driving an optical transmitting unit in the terminal station after confirming that the operation of the single-wave AOTF has become stable and the optical signal, which is monitored by the optical spectrum monitor and is to be added, has been controlled to have a predetermined optical wavelength and power.

The optical transmission system according to a further aspect of the present invention includes an optical transmission apparatus for modulating before transmission the optical intensity of a transmission signal of one or more wavelengths, and transmitting the modulated signal in an optically-amplifying multiple relay transmission; and a node, provided in a transmission line for the optical transmission apparatus, having the function of branching and adding a transmission signal light. With this configuration, the optical transmission system further includes a unit for modulating an optical phase or an optical frequency of a transmitted light in a transmitting unit; a transmitter having a positive sign for a chirping parameter of the modulation unit; and a dispersion compensation unit, provided between the transmitter and the transmission line and between the transmission line and a receiver, for compensating for the wavelength dispersion characteristic of a transmission line.

The AOTF control device according to the present invention is provided on the surface of the substrate on which an AOTF is formed. The AOTF selects an optical signal having a predetermined wavelength from a wavelength multiplexed optical signal and adds or branches the selected signal using the function of a surface acoustic wave. The AOTF control device has a resonator near the AOTF and detects a change in the resonant frequency of the resonator so that the surface temperature of the AOTF can be measured, the RF signal can be controlled based on the measurement result, and the operation of the AOTF can be stabilized.

According to the present invention, the operation of the circuit forming part of the system can be quickly performed, and an inexpensive and reliable OADM system can be realized by an AOTF, provided in an add/drop system, capable of selecting an optional optical signal by changing the frequency of an electric signal which is applied for selecting an optional wavelength.

BRIEF DESCRIPTION OF THE DRAWINGS

FIGS. 4A and 4B are block diagrams showing examples of the configuration of the OADM device for broadcast using AOTFs;

FIGS. 34A and 34B show examples (2) of dispersion compensation units provided at the adding and dropping terminals of an OADM device, a transmitting unit and a receiving unit;

DESCRIPTION OF THE PREFERRED EMBODIMENTS

Figure 1:
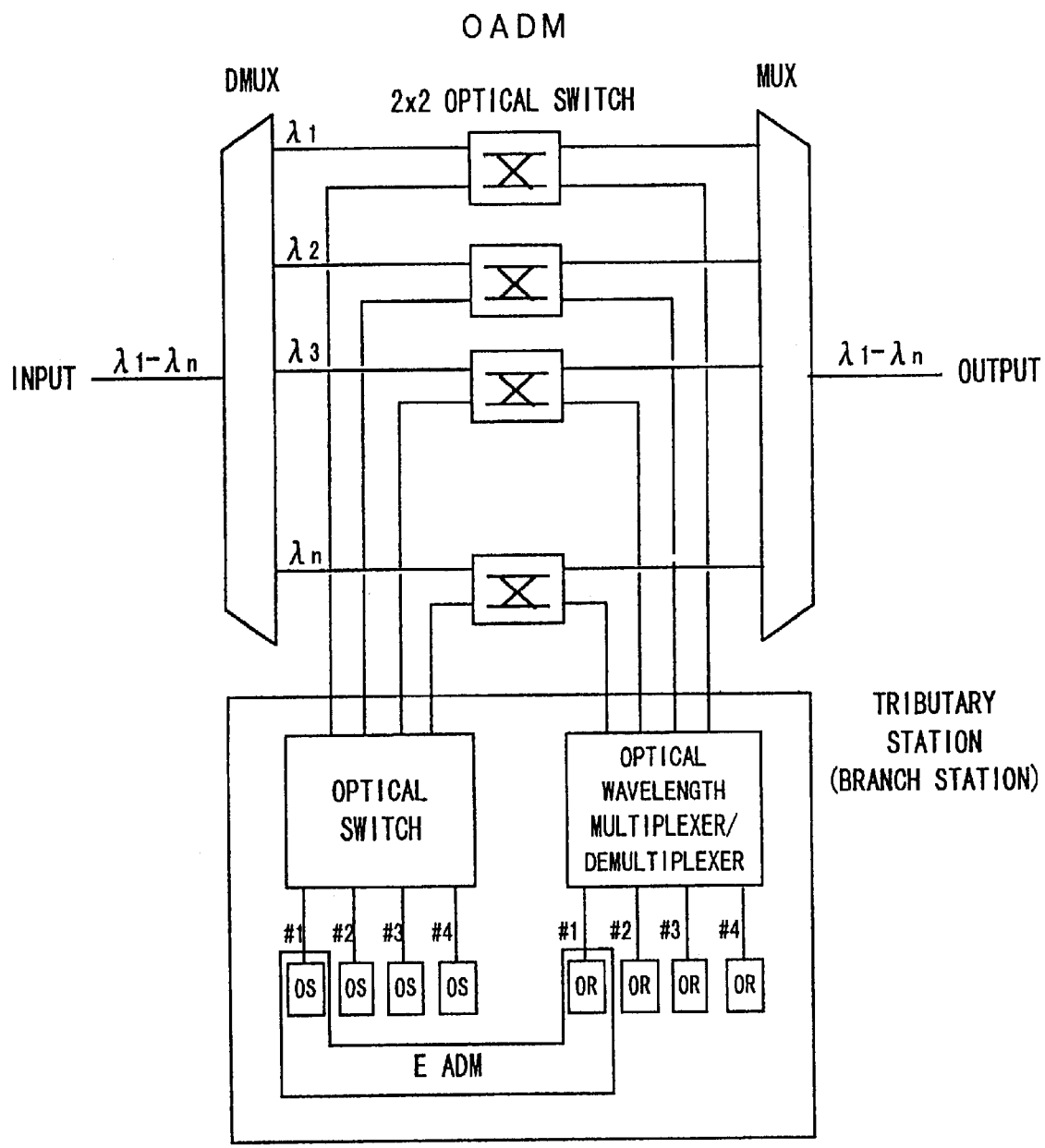
FIG. 1 shows an example of the configuration of the optical ADM (OADM) device using an optical switch.
Figure 2:
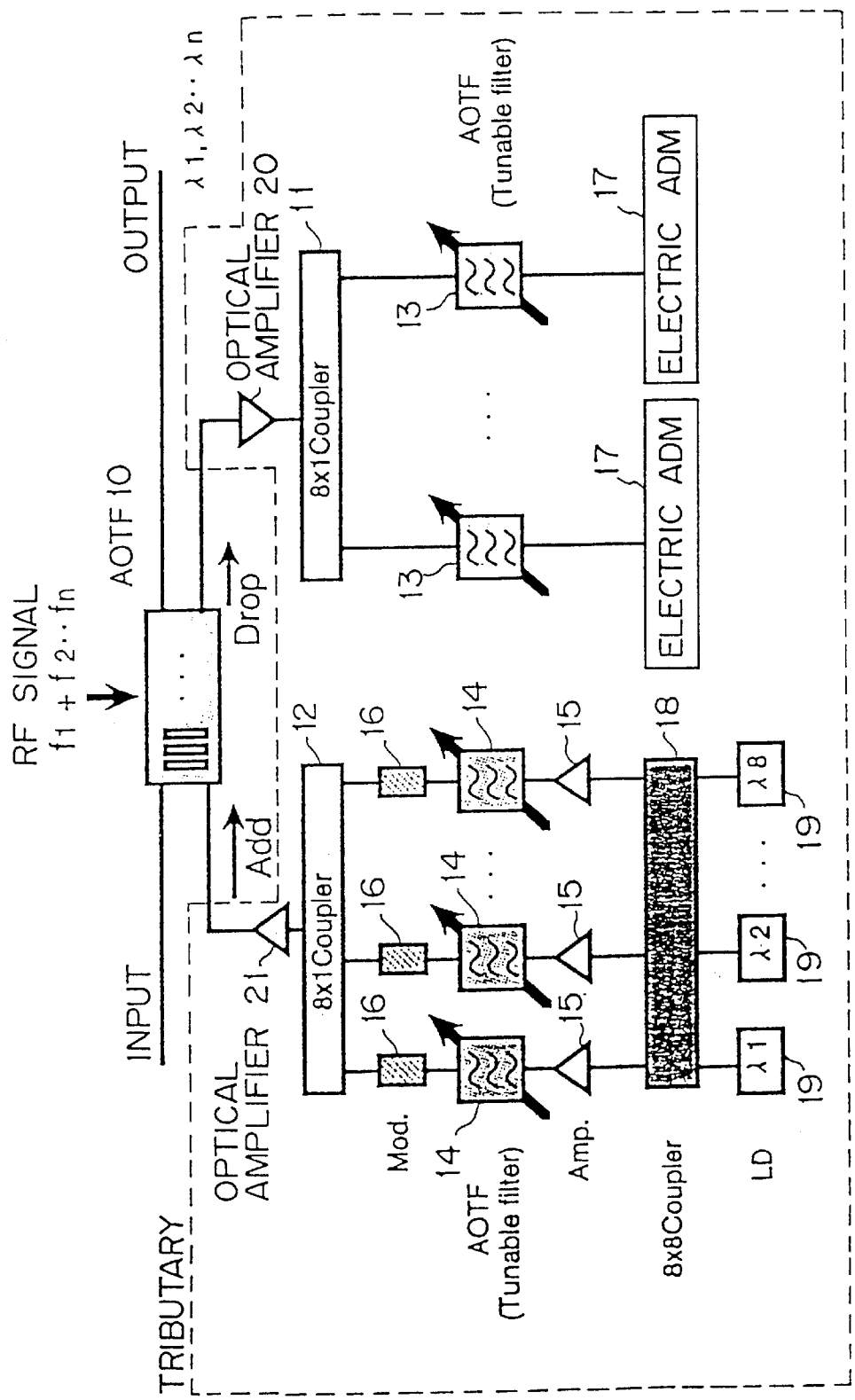
FIG. 2 shows the basic principle of the OADM device using the AOTF.

FIG. 2 shows the basic principle of the OADM device using an AOTF.

In FIG. 2, a wavelength multiplexed optical signal having the wavelength of $\lambda 1$ through $\lambda n$ is input to an AOTF 10, and eight waves are added/dropped. It is obvious that the number of added or dropped wavelengths is not limited to this value.

An optical wavelength is selected by the AOTF 10 by applying a corresponding RF signal (electric signal) to a wavelength to be dropped. In FIG. 2, a wavelength multiplexed optical signal having the wavelength of $\lambda 1$ through $\lambda n$ is input to the AOTF 10. Eight RF signals having the frequencies of f1 through fn corresponding to the wavelengths $\lambda 1$ through $\lambda n$ are applied to the AOTF 10.

The optical signal having the wavelength corresponding to the frequency of the RF signal applied to the AOTF 10 is output to the drop port of the AOTF 10, amplified by an optical amplifier 20, and is then input to an 8×1 coupler 11.

The coupler is designed as an 8×1 coupler because the number of the dropped wavelengths is eight. The 8×1 coupler 11 branches the dropped optical signals of the number of the wavelengths. The branched optical signals are the same optical signals, and contain all optical signals having the dropped wavelengths. Additionally, an AOTF 13 is provided as a wavelength selection filter, and an optical signal having each wavelength is transmitted to an electric ADM (optical signal receiver) 17.

On the other hand, the AOTF 10 not only drops an optical signal having a predetermined wavelength, but also adds an optical signal having the same wavelength as the dropped signal, because the AOTF 10 has the function of dropping an optical signal having a certain wavelength and simultaneously adding an optical signal having the same wavelength as the dropped signal. Therefore, it is necessary only to apply to the AOTF 10 an RF signal having the frequency corresponding to an optical signal having the wavelength to be dropped or added.

An optical signal to be added is generated by the configuration shown on the left in FIG. 2. A laser diode LD 19 is a light source, and the LDs 19 having the wavelengths of the signals to be added are provided for the number of optical signals to be added. The lights having the wavelengths of $\lambda 1$ through $\lambda 8$ output from the laser diode LD 19 are temporarily multiplexed by a 8×8 coupler 18, and are then demultiplexed. The demultiplexed lights are amplified by an optical amplifier 15, and are input to an AOTF 14 functioning as a wavelength selection filter. The AOTF 14 extracts a light having a wavelength to be used in transmitting an optical signal from a light in which the wavelengths $\lambda 1$ through $\lambda 8$ are multiplexed. The light having the wavelength extracted by the AOTF 14 is modulated by a modulator 16 into an optical signal. Thus, the generated optical signals having respective wavelengths are multiplexed by an 8×1 coupler 12, amplified by an optical amplifier 21, and input to the AOTF 10. The AOTF 10 multiplexes an add optical signal with a through light, and is output to an output terminal.

As described above, only one AOTF 10 can, in principle, realize the function of the OADM device. However, since the actual characteristics of an AOTF cannot be exactly those explained above, various devices are practically required. For example, an add optical signal input from an add port of the AOTF 10 is slightly output to the drop port as a result of the cross talk of the AOTF 10. Since an add light has the same wavelength as a drop light, there arises a cross talk referred to as a coherent cross talk, thereby greatly deteriorating an optical signal. Therefore, when an OADM device is designed actually using an AOTF, the coherent cross talk should be avoided.

When the AOTF 10 does not add/drop a wavelength, the optical amplifier 21 is stopped or the selected band of the AOTF 10 is set off. If the optical amplifier is operating, an ASE (amplified spontaneous emission) light is added as a noise to the through optical signal even if an optical signal is not added, thereby deteriorating the SN ratio. If the selected band of the AOTF 10 is set off, then the ASE is added outside the band of the through optical signal. As a result, the deterioration of the SN ratio of the through optical signal can be avoided.

Figure 3:
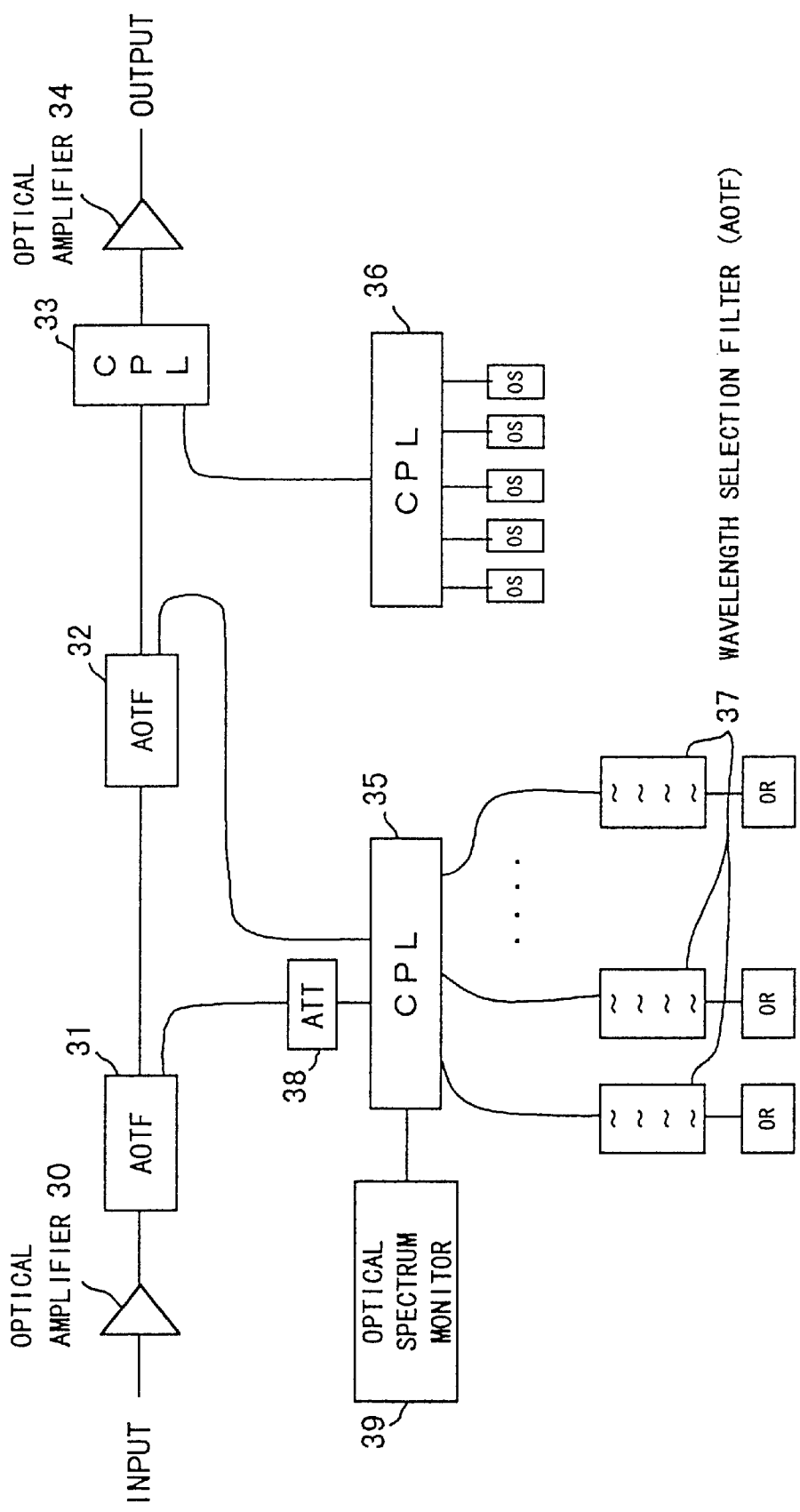
FIG. 3 is a block diagram showing an example of the basic configuration for the OADM device designed using an actual AOTF.

FIG. 3 is a block diagram showing an example of the basic configuration for the OADM device designed using an actual AOTF.

FIG. 3 shows the configuration in which an AOTF is used to drop an optical signal. An optical signal input from an input terminal is amplified by an optical amplifier 30 to compensate for a loss in the transmission line, and input to an AOTF 31 at the first stage. The first-stage AOTF 31 drops only a part of the optical signals having the wavelength to be dropped. The optical signal which has passed through the first-stage AOTF 31 is input to an AOTF 32 at the second stage, and optical signals having the other wavelengths to be dropped are dropped. Thus, the dropped optical signals are multiplexed by a coupler 35, and branched for the number of receivers OR. At this time, an optical attenuator 38 is provided at the terminal of the drop port of the AOTF 31. The optical signal dropped by the AOTF 32 and the optical signal dropped by the AOTF 31 are set to approximately the same level and input to the coupler 35 because there is a considerable loss in the AOTF, and there is a large difference in level between an optical signal passing through one AOTF and an optical signal passing through two AOTFs. If dropped signals are transmitted with a difference in level between them, a lower-level optical signal cannot be successfully amplified even if the optical amplifier tries to amplify it at the receiving terminal or before reaching the receiving terminal, thereby failing to correctly receive the signal. Thus, the requested wavelength of a dropped signal is selected by a wavelength selection filter 37 of an AOTF, etc. and is received by the receiver OR.

Another output port is added to the coupler 35 for temporarily multiplexing optical signals dropped by the AOTFs 31 and 32, and an optical signal from this output port is input to an optical spectrum monitor 39 to monitor the existence of a dropped optical signal, the wavelength and power of each optical signal, etc.

The optical signal which has passed through the first and second AOTFs 31 and 32 contains only the optical signal having the wavelength not to be dropped, and is input to a coupler 33 as a through light of the OADM device. From the optical transmitter OS, an optical signal having an AM-modulated wavelength (wavelength of a dropped optical signal) is multiplexed by a coupler 36, and input to the coupler 33 as an add optical signal. Thus, the through light and the add light input to the coupler 33 are multiplexed with each other, amplified by an optical amplifier 34, and output through a transmission line.

In a configuration example shown in FIG. 3, all optical signals to be dropped are dropped by the first-stage AOTF 31 and the second-stage AOTF 32 according to the wavelength selection characteristic of the AOTF. That is, the AOTF 31 has a broad wavelength selection characteristic when an RF signal is applied. Therefore, when adjacent optical signals set at a 0.8 nm interval, which is regulated in the Recommendation Draft of ITU-T G.692, are being dropped, a cross talk occurs and interrupts the reception at the receiving terminal. Therefore, the AOTF 31 or 32 actually indicated by a single block is designed as a three-stage monolithic AOTF mounted in series on one substrate. With this configuration, the wavelength selection characteristic can be narrowed, but not sufficiently. Therefore, two stages of AOTFs are provided. At the first stage, for example, the wavelengths of an optical signal are numbered sequentially from one end to the other to drop only the wavelengths having odd or even ordinal numbers. At the second stage, the optical signals having wavelengths of odd or even ordinal numbers not dropped at the first stage are dropped. With this configuration, two adjacent optical signals can be dropped at the interval of wavelengths of 1.6 nm, thereby sufficiently reducing the cross talk even with the wavelength selection characteristic of an AOTF.

Furthermore, with the configuration shown in FIG. 3, an add optical signal can be multiplexed directly by the coupler 33 without using an AOTF. As described above, the AOTF has the function of adding an optical signal having the same wavelength as a dropped optical signal. However, if the AOTF has the function of both adding and dropping signals, then the lights on the adding side are mixed with the lights on the dropping side to generate a cross talk. At this time, since the wavelengths of the add light and the drop light generate the same coherent cross talk, the beat component generated by a cross talk becomes large, and the optical signal cannot be correctly received at the dropping terminal. When a corresponding wavelength is extracted from a through light, an add light can be multiplexed to the available grid (position of the wavelength of an optical signal). As shown in FIG. 3, the add light is multiplexed to the through light.

In FIG. 3, two AOTFs are used to branch all optical signals to be dropped. However, the number of AOTFs is not limited to two, and more than two AOTFs can be incorporated. Thus, when a number of AOTF are incorporated, the interval of wavelengths between optical signals having the closest values of wavelengths among optical signals to be dropped by one AOTF can be enlarged, thereby reducing cross talk.

FIGS. 4A and 4B are block diagrams showing examples of the configuration of the OADM device for broadcast using AOTFs.

As shown in FIG. 4A, the wavelengths of $\lambda 1$ through $\lambda n$ are wavelength-multiplexed and transmitted from the input terminal, amplified by an optical amplifier 40, and input to a coupler 41. The coupler 41 branches the input optical signal into two portions one of which is input to an AOTF 42, and the other of which is dropped and input to a coupler 46 of a tributary station. The optical signal input to the coupler 46 is branched by the coupler 46. The number of branches can be the number of wavelengths of the lights used as dropped lights or can be the total number of wavelengths. Since the optical signals branched by the coupler 46 contain the optical signals having the wavelengths of $\lambda 1$ through $\lambda n$ from which a wavelength selection filter 48 selects and extracts a light having the wavelength to be used as a drop light.

On the other hand, the wavelength selected by the wavelength selection filter 48 from the optical signal transmitted to the AOTF 42 is further selected by the AOTF 42, and is output to a selection port. The selection port is not connected to any unit, and the selected optical signal is discarded. An AOTF 43 is also provided after the AOTF 42 so that, as described above by referring to FIG. 2, one AOTF can drop a portion of the optical signal having the wavelength to be dropped and the other AOTF can drop the remaining wavelengths of the optical signal, thereby reducing the cross talk when a wavelength is selected.

The through light which has passed through the two AOTFs 42 and 43 is input to a coupler 44, and multiplexed with an add light. As described by referring to FIG. 2, a requested wavelength is selected from among the lights from the light source by a wavelength selection filter 49 as an add light, modulated by a modulator 50, and input to a coupler 47. The add light multiplexed by the coupler 47 is input to the coupler 44, multiplexed with the through light, amplified by an optical amplifier 45, and then transmitted through a transmission line.

In this example, the add optical signal is obtained by selecting a light from a light source by the wavelength selection filter 49 and then modulating it by a modulator 50. Furthermore, an add optical signal can be generated by modulating a light from a light source and then selecting a wavelength from the light.

FIG. 4B shows a broadcasting function.

Assume that the optical signal having the wavelength of $\lambda 1$ is to be broadcast by OADMs 1 through 3 when the OADM device shown in FIG. 4A is connected through a transmission line as shown in FIG. 4B. The OADM 1 drops the wavelength of $\lambda 1$. However, the AOTF does not select the wavelength of $\lambda 1$, or add an optical signal to the grid of the wavelength of $\lambda 1$. Then, the optical signal having the wavelength of $\lambda 1$ passes through the OADM 1 and is input to the OADM 2. The OADM 2 also drops the optical signal having the wavelength of $\lambda 1$, and the AOTF does not select the wavelength of $\lambda 1$. Then, the optical signal having the wavelength of $\lambda 1$ is transmitted to the OADM 3. The OADM 3 drops the wavelength of $\lambda 1$. The AOTF selects the wavelength of $\lambda 1$, and discards the optical signal having the wavelength of $\lambda 1$. As a result, the optical signal output from the OADM 3 is a signal in which the wavelengths of $\lambda 2$ through $\lambda n$ are multiplexed as long as a new optical signal having the wavelength of $\lambda 1$ is not added.

Thus, with the configuration shown in FIG. 4A, since the OADMs 1 through 3 can drop the same optical signals having the wavelength of $\lambda 1$, the broadcast communications can be easily realized.

Figure 5A:
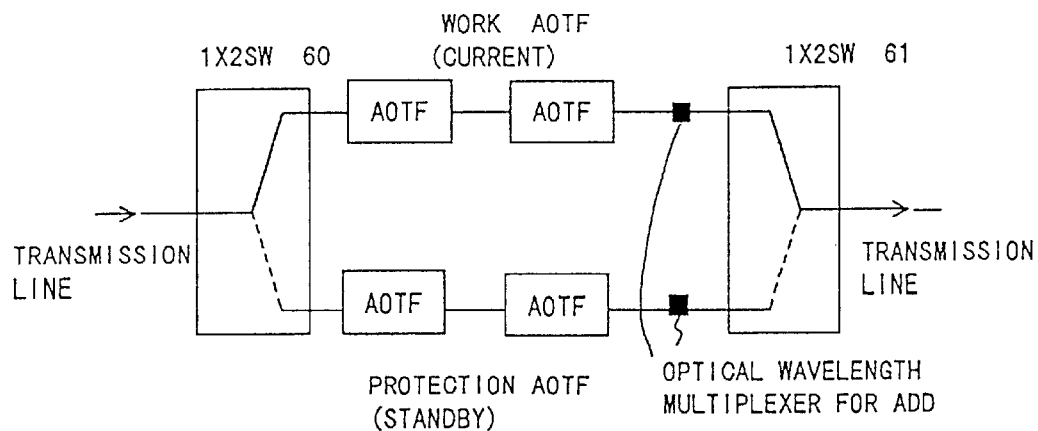
FIGS. 5A and 5B are block diagrams showing the principle of the redundant configuration of an AOTF and a transmission line in the OADM device.
Figure 5B:
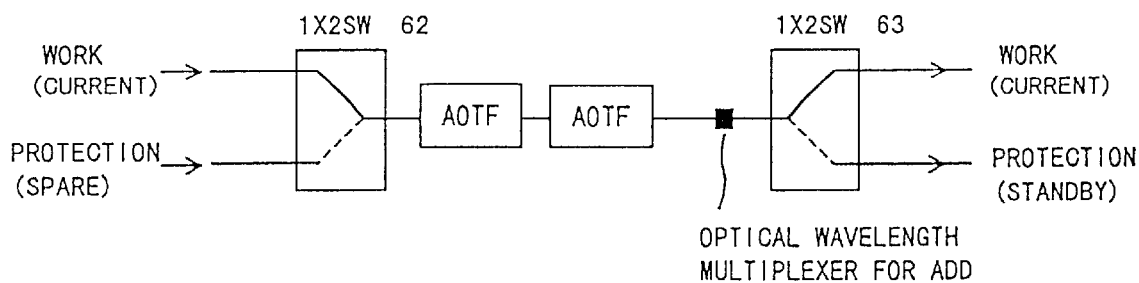

FIGS. 5A and 5B are block diagrams showing the principle of the redundant configuration of an AOTF and a transmission line in the OADM device.

FIG. 5A shows the redundant configuration of the AOTF in the OADM device.

A 1×2 switch 60 is provided at the input terminal of the OADM and two paths are provided for the input optical signal and can be switched from each other. The work AOTF and a protection AOTF are connected to the two output ports of the 1×2 switch 60. After each of the AOTF, a wavelength multiplexer for multiplexing an add light is provided. That is, in FIG. 5A, the upper configuration is for current use, and the lower configuration is for standby use. They are connected to the two input ports of a 1×2 switch 61. The 1×2 switch 61 switches from the optical signal from the work AOTF to the optical signal from the protection AOTF and vice versa so that either of them can be output through the transmission line. The 1×2 switch 61 is provided at the output terminal of the OADM device.

FIG. 5B shows the redundant configuration of the transmission line other than the OADM device.

The transmission line has a duplex configuration, that is, work and protection configurations, and is provided with a 1×2 switch 62 at the input terminal of the OADM. The 1×2 switch 62 selects the work transmission line or the protection transmission line, and transmits an optical signal to the AOTF. After the AOTF, a wavelength multiplexer for multiplexing an ADD optical signal is provided and connected to a 1×2 switch 63. The output ports of the 1×2 switch 63 are connected to the work and the protection transmission lines so that the 1×2 switch 63 can select either of the transmission lines to transmit an optical signal.

In FIGS. 5A and 5B, only the AOTF or the transmission line is duplex. However, both the transmission line and the AOTF can be duplex. In this case, the 1×2 switches at the input and output terminals of the OADM device are replaced with the 2×2 switch, and the work and protection transmission lines and the work and protection AOTFs are connected to the input/output ports of the 2×2 switches. In this case, since there are no actions to be taken when the 2×2 switches are out of order, the 2×2 switches should also be duplex to produce a more reliable system. That is, a 1×2 switch is provided for each of the work and protection transmission lines so that either the work 2×2 switch or the protection 2×2 switch can be selected to receive an optical signal. The 1×2 switch is also provided after the 2×2 switch so that either the work or the protection 2×2 switch can be selected to receive an optical signal. This configuration can be applied to either the input or output terminal of the OADM device, and the duplex configuration is applied not only to the AOTF and the transmission line but also to the switch for switching from the work configuration to the protection configuration or vice versa. That is, a 1×2 switch is provided for each of the work and protection transmission lines so that either the work 2×2 switch or the protection 2×2 switch can be selected to receive an optical signal. The 1×2 switch is also provided after the 2×2 switch so that either the work or the protection 2×2 switch can be selected to receive an optical signal. This configuration can be applied to either the input or output terminal of the OADM device, and the duplex configuration is applied not only to the AOTF and the transmission line but also to the switch for switching from the work configuration to the protection configuration or vice versa.

Figure 6:
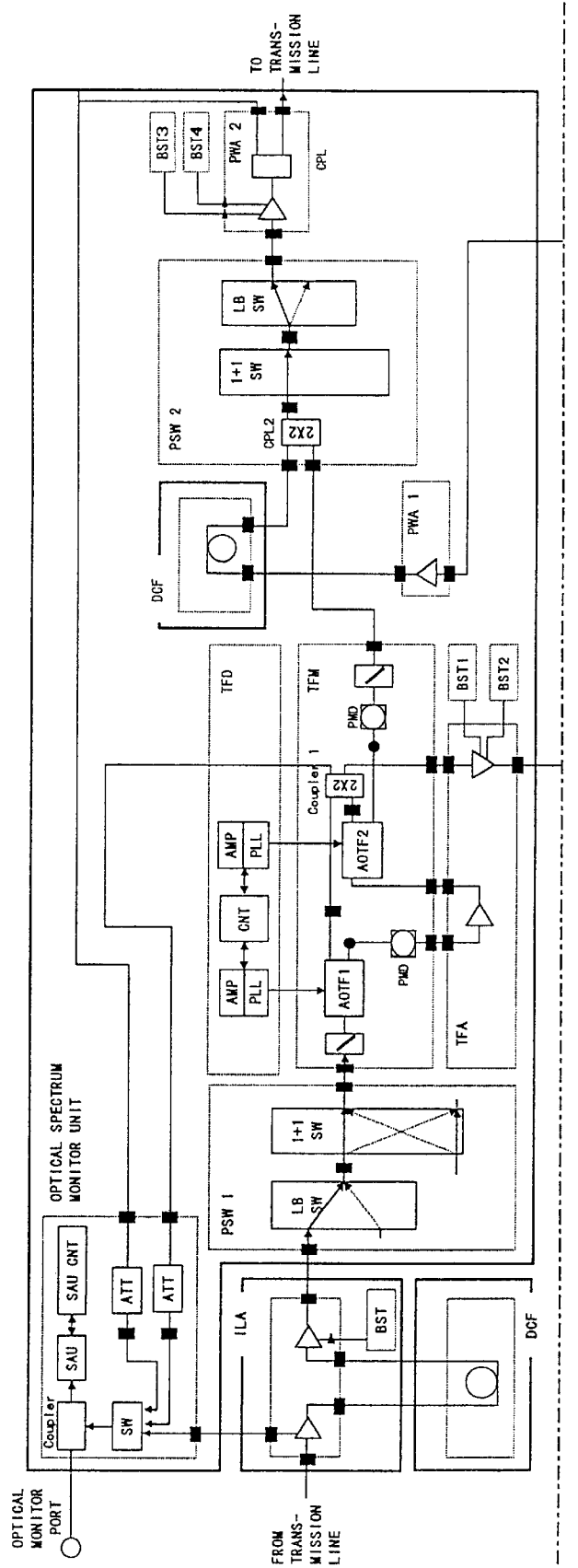
FIG. 6 shows the first example (1) of the practical configuration of the OADM device using an AOTF.
Figure 7:
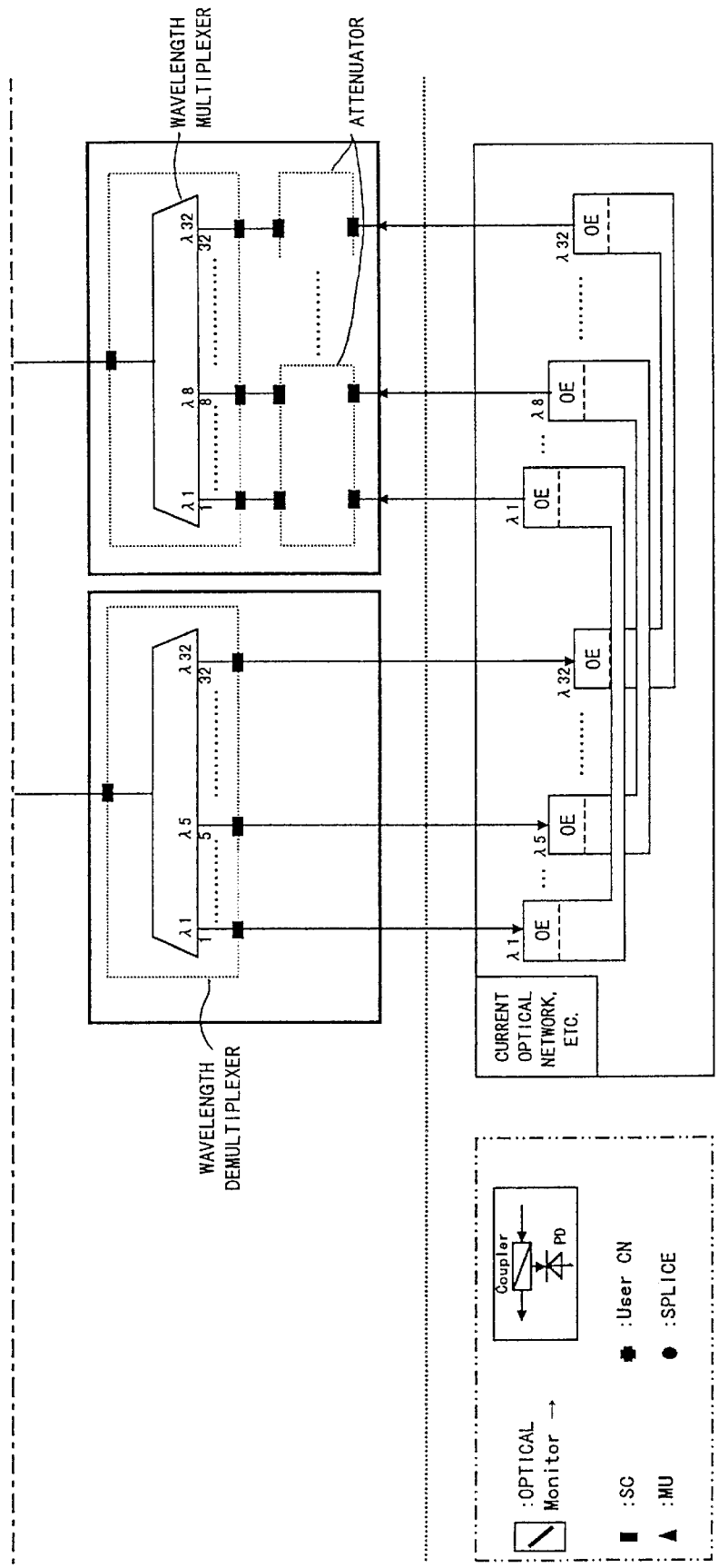
FIG. 7 shows the first example (2) of the practical configuration of the OADM device using an AOTF.

FIGS. 6 and 7 show the first example (1) of the practical configuration of the OADM device using an AOTF.

The optical signal input through the transmission line is first input to an optical amplifier (in-line amplifier: ILA). The optical amplifier has two amplification media (indicated by triangles). Before an optical signal is amplified by a first amplification medium, a part of the optical signal is branched and input to a switch of an optical spectrum monitor unit. The switch of the optical spectrum monitor unit sequentially switches input optical signals, transmits an optical signal to a spectrum analyzer SAU, and analyzes and monitors the state of the optical spectrum at each point. The spectrum analyzer SAU is controlled by a spectrum analyzer controller SAU CNT. The spectrum analyzer SAU analyzes sequentially switched and input optical signals, concurrently outputs the data of the analysis result, and is controlled by the spectrum analyzer controller SAU CNT. A control signal is transmitted such that the spectrum state can be optimum at each point through the control line not shown in FIG. 6 or 7. Otherwise, an operator can go to directly monitor the state of the spectrum.

The optical signal amplified by the first amplification medium of the optical amplification unit ILA is input to the dispersion compensation fiber DCF to suppress the dispersion in the transmission line. Then, the optical signal is input to the second amplification medium, and the powered optical signal is input to the OADM device. The BST connected to the second amplification medium of the optical amplification unit is referred to as a booster, and provides a pump light for use in optical amplification to an amplification medium, for example, an erbium-doped fiber.

The optical signal amplified by the optical amplification unit ILA is input to a switch unit PSW 1 for the above described redundancy. The switch unit PSW 1 is described later in detail. The optical signal which has passed through the switch unit PSW 1 is input to a tunable filter module TFM. An optical monitor is provided at the input terminal of the tunable filter module TFM to monitor whether or not modules are appropriately connected to each other, detect the power of the input optical signal, and notifies the control unit (not shown in the attached drawings) of the monitor and detection results. The control unit analyzes the monitor result, and determines whether or not the modules are correctly connected and the optical signals are normally transmitted. For example, when a module is not correctly connected and a strong light leaks, it is harmful to a person near by. Therefore, the optical switch must be turned off, or any other actions should be taken for safety. Such an optical monitor is also provided at the output terminal of the tunable filter module TFM, and basically has the same function as the monitor provided at the input terminal of the tunable filter module TFM.

The optical signal which has passed the optical monitor is input to an AOTF 1. The AOTF 1 is controlled by the control signal from the controller CNT of a tunable filter driver TFD. That is, the control signal from the controller CNT is applied to the circuit (in FIG. 6, it comprises an amplifier and a PLL circuit) for generating an RF signal, and the thus generated RF signal is applied to the AOTF 1 and an AOTF 2. In the AOTF 1, for example as described above, optical signals having the wavelengths of even ordinal numbers are selected and output to the upper port shown in FIG. 6. The optical signal which has passed through the AOTF 1 is input to the polarization mode dispersion compensator PMD.

As described later, the AOTF converts only the mode of the optical signal having a predetermined wavelength by the cooperation of the TE mode light and the TM mode light of the input optical signal with the surface acoustic wave (SAW), and switches output ports. The AOTF is normally made of a material of birefringence such as lithium niobate, and there arises a difference in transmission speed between the TE mode and the TM mode of the optical signal which passes through without receiving any processing. At this time, the time difference is approximately 50 ps when one device of the AOTF has a 3-stage configuration (described later). It is requested that the OAE)M device according to the present embodiment be used in a system having the transmission speed of 10 Gbps. However, at a speed of 10 Gbps, the time slot assigned to one bit is about 100 ps. Therefore, since the polarization mode dispersion generated by passing through the AOTF causes the two modes an approximately 50% difference in time slot, the optical signal cannot be normally received as is. As a result, a polarization mode dispersion compensating process is performed each time one AOTF is passed through. A typical method of compensating for polarization mode dispersion is to connect the axis of a PANDA fiber, etc. also having polarization mode dispersion normally to the axis of the AOTF. With this connection, the fast mode in the AOTF is slowly propagated through the PANDA fiber while the slow mode in the AOTF is propagated fast through the PANDA fiber. The length of the PANDA fiber required to compensate for the polarization mode dispersion of the AOTF is approximately 20 m depending on the characteristics of the AOTF, the, PANDA fiber, etc.

On the other hand, a wavelength-selected optical signal, that is, the optical signal at the dropping terminal is propagated after being converted into the TM mode when the optical signal is input in the TE mode and into the TE mode when the optical signal is input in the TM mode in the AOTF in the cooperation with the SAW. Therefore, the time in which the dispersion occurs in the TE mode becomes equal to the time in which the dispersion occurs in the TM mode. Therefore, the lights first input in the TE and TM modes are converted into the lights in the TM and TE modes respectively while being propagated in the AOTF, thereby generating no polarization mode dispersion.

The optical signal which has passed through the polarization mode dispersion compensator PMD is input to an optical amplification unit TFA, and the optical signal is amplified by the amplification medium. The optical signal which has passed through the AOTF 1 has become lower in intensity because of the loss in the AOTF. As a result, there is a difference between the optical signal input to the AOTF 2 and dropped therein and the optical signal dropped in the AOTF 1, thereby requiring the compensation for the difference. For example, the loss in one AOTF is approximately 10 dB. In the optical signals amplified by the optical amplification unit TFA, the optical signals having the wavelengths assigned the odd numbers are branched, and the remaining optical signals are passed through in the AOTF 2.

The optical signals to be dropped and branched in the AOTFs 1 and 2 are multiplexed by the 2×2 coupler, amplified again by the optical amplification unit TFA, and transmitted to the tributary station. On the other hand, the optical signal output from the other port of the 2×2 coupler 1 is input to a spectrum analyzer SAU of the optical spectrum monitor unit through an optical attenuator, and it is determined whether or not the wavelength or the power of the dropped signal satisfies a predetermined standard.

The optical signal which has passed through the AOTF 2 is input to the polarization mode dispersion compensator PMD as described above, and is then input to the 2×2 coupler CPL 2 of the switch unit PSW 2 through the optical monitor unit after the polarization mode dispersion has been compensated for. Also, an add optical signal is input to the 2×2 coupler CPL 2 of the switch unit PSW 2. The add optical signal is amplified by an optical amplifier PW; 1 to compensate for the loss generated during the transmission from the tributary station. Furthermore, the dispersion is compensated for by the dispersion compensation fiber DCF, and then the optical signal is input to the 2×2 coupler CPL 2. The through optical signal and the add optical signal are input to the optical amplifier PWA 2 through a switch for redundancy, amplified by the excited light from boosters BST 3 and 4, and branched by a coupler. Most optical signals are output from the coupler to the transmission line, but a part of the signals is transmitted to an optical spectrum monitor unit for analyzing the wavelength displacement and the power of the optical signal having each wavelength. An optical signal is amplified by the optical amplifier PWA 2 to compensate for the loss generated by passing through the entire OADM device.

FIG. 7 shows an example of the configuration of the tributary station in the system using the OADM device shown in FIG. 6.

An optical signal dropped by the tunable filter module TFM is wavelength-demultiplexed by the wavelength demultiplexer of the tributary station. In the case shown in FIG. 7, the optical signal is wavelength-demultiplexed into 32 waves having the wavelengths of $\lambda 1$ through $\lambda 32$. The optical signal having each of these wavelengths is received by an opto-electrical conversion unit OE of the existing optical network, converted into an electric signal, and further converted into a signal for use in the network, for example, an optical signal having the wavelength available in the network if it is a 1-wave optical network. On the other hand, in the signal output unit of the existing optical network, etc., the electric signal is converted by the electro-optical conversion unit EO into the wavelengths of $\lambda 1$ through $\lambda 32$ of the optical signal dropped as shown in FIG. 6. These optical signals are adjusted in relative levels by an attenuator, wavelength-multiplexed by a wavelength multiplexer, and transmitted by the OADM device shown in FIG. 6 as add optical signals.

FIG. 6 shows a drop optical signal having 32 wavelengths, and as if all of these 32 wavelengths were being used. However, when the system is started, it is not necessary to use all of these wavelengths, that is, only a part of them can be used. In this case, the number of wavelengths dropped by the tunable filter module TFM shown in FIG. 6 is smaller than 32.

If the wavelength demultiplexer has branched the optical signal into optical signals having respective wavelengths as shown in FIG. 6, then it is difficult to appropriately change the wavelength to be received. For example, when it is requested that an optical signal having the same wavelength is to be received at the receiving terminal, a signal must be branched from one port of the wavelength demultiplexer. However, if the original configuration does not allow such a process, a coupler, etc. for branching an optical signal from one port must be newly provided.

Figure 8:
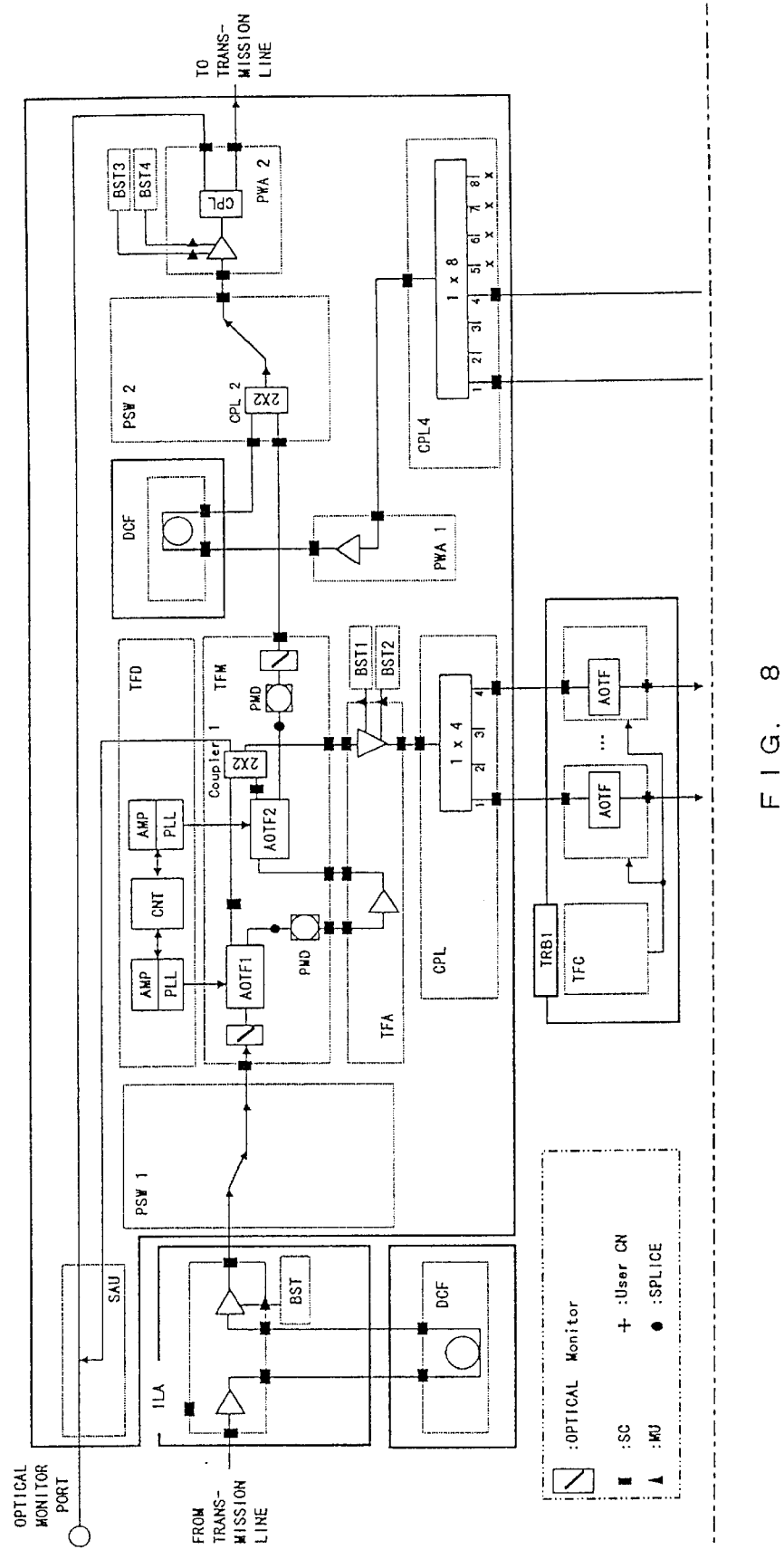
FIG. 8 shows the second example (1) of the practical configuration of the OADM device using an AOTF.
Figure 9:
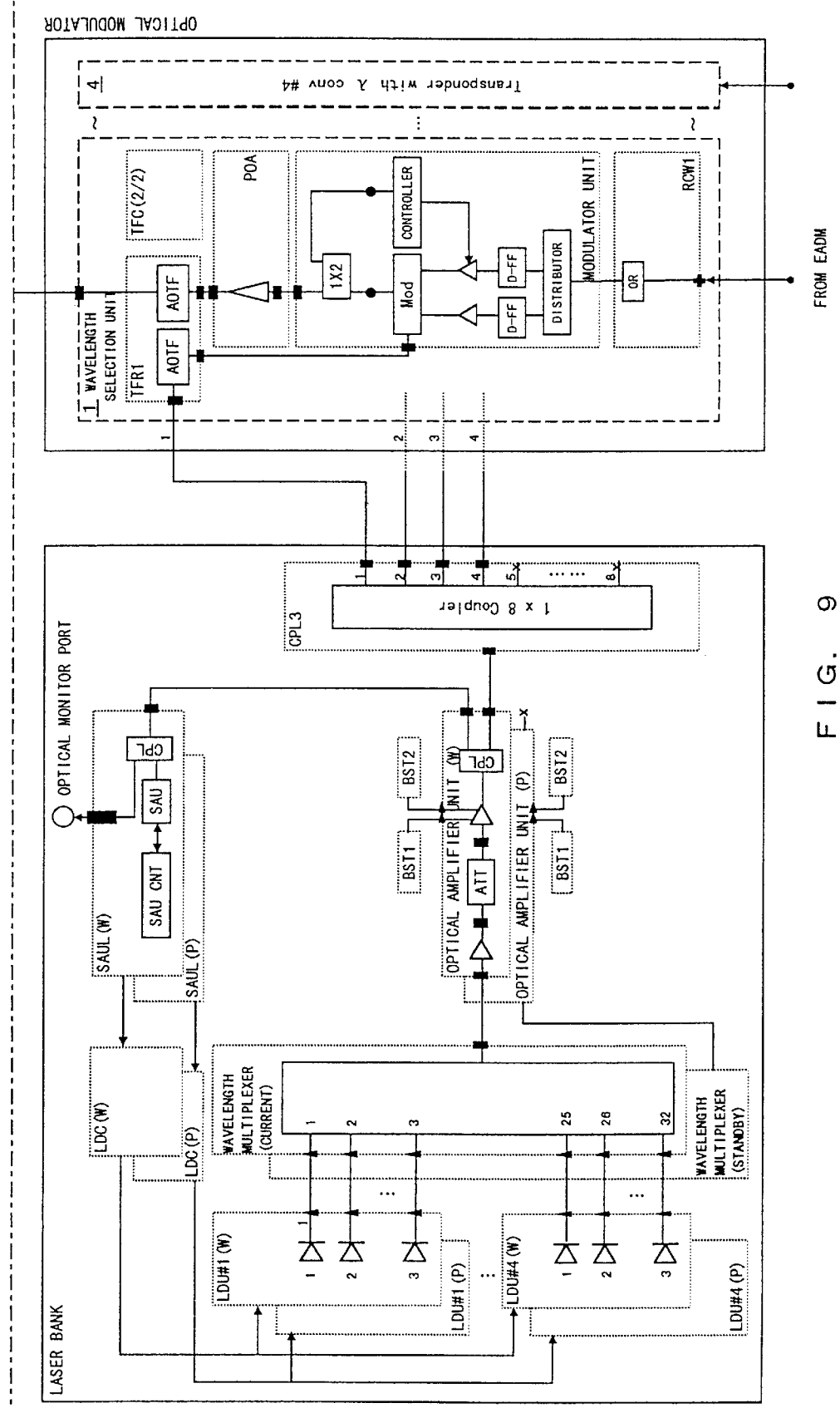
FIG. 9 shows the second example (2) of the practical configuration of the OADM device using an AOTF.

FIGS. 8 and 9 show the second example of the practical configuration of the OADM device using an AOTF.

The configuration shown in FIG. 8 is the same as that shown in FIG. 6, and the detailed explanation is omitted here.

An optical signal input through a transmission line is amplified by an optical amplification unit ILA. The dispersion compensation fiber compensates for the dispersion, and the optical signal is input to the switch unit PSW 1. The switch unit PSW 1 is designed to provide work and protection configurations for redundancy. The optical signal output from the switch unit PSW 1 passes through the optical monitor unit of the tunable filter module TFM. The drop optical signal is dropped by the AOTFs 1 and 2, and input to the 2×2 coupler 1.

A part of the output from the 2×2 coupler 1 is input to the spectrum analyzer SAU, and the spectrum is analyzed. The drop optical signal multiplexed by the 2×2 coupler 1 is first amplified by the optical amplifier, and then branched by the 1×4 coupler. In FIG. 8, the number of wavelengths is 4, but is not limited to 4. The optical signal branched by the 1×4 coupler contains all drop wavelengths, and the AOTF of the receiving unit TRB 1 in the tributary station extracts each wavelength. This AOTF has the function of extracting a predetermined wavelength from the optical signals received from the 1×4 coupler. When it is not necessary to change the wavelength of the optical signal to be dropped, a common band pass filter can be used. An AOTF is used to flexibly answer a request from the user of this system. The user normally requests to change the wavelength of an optical signal to be added/dropped during the operation of the system. The AOTF of the tributary station, which is a wavelength selection filter, is controlled by the tunable filter controller TFC now shown in FIG. 8. In FIG. 8, only two AOTFs are provided, but there can be four AOTFs provided when four waves are used for drop optical signals.

A through light not dropped by the AOTF 1 is input to an optical amplifier after being processed in a polarization mode dispersion compensating process by the polarization mode dispersion compensator PMD, and is then input to the AOTF 2. Thus, as described above, two stages of AOTFs are provided to drop a part of wavelengths by one AOTF, for example, optical signals having wavelengths of even ordinal numbers, and to drop the remaining wavelengths, for example, of odd ordinal numbers by another AOTF. With this configuration, the cross talk generated by a relatively large half-width of the wavelength selection characteristic of the AOTF can be minimized.

After the optical signal has passed through the AOTF 2, the polarization mode dispersion compensator PMD compensates for the polarization mode dispersion, and the optical signal passes through the optical monitor, and is then input to the 2×2 coupler CPL 2 of the switch unit PSW 2 and multiplexed with an add optical signal. In the case shown in FIG. 8, since there are four wavelengths of drop lights, there should also be four wavelengths of add lights. A 1×8 coupler is provided in the coupler CPL 4 for future upgraded configuration. However, only the ports 1 through 4 are currently used. The add optical signal having each wavelength multiplexed by the coupler CPL 4 is amplified by the optical amplifier PWA 1. After the dispersion compensation fiber DCF has compensated for the dispersion, the optical signal is input to the 2×2 coupler CPL 2 in the switch unit PSW 2. The through light and the add light are multiplexed with each other, and is input to the optical amplifier PWA 2 at the output terminal of the OADM device after passing through the protection switch (for switching current and standby configurations). After being input to the optical amplifier PWA 2, the optical signal is powered by pump light sources BST 3 and 4 to be amplified in power, and is then output to the transmission line through the coupler CPL. A part of the optical signal branched by the coupler CPL is transmitted to the spectrum analyzer unit SAU for analyzing the status of the optical spectrum output from the OADM device, and is used in monitoring whether or not: the OADM device is normally operating.

FIG. 9 shows the configuration of the add light transmitting terminal of the tributary station.

The add optical signal transmission unit comprises a laser bank, an optical modulation unit, and an electric ADM device (E ADM) not shown in FIG. 9. The data to be transmitted is transmitted from the electric ADM device as an electric signal, and is used as a drive signal for use in modulating a light from the laser bank.

The laser bank comprises a plurality of laser diodes for outputting lights having different wavelengths. They are stored in the laser diode units LDUS #1 through #4. There is another configuration for redundancy for use when a fault occurs. There is a current configuration (work) and a standby configuration (protection) for the laser diode unit LDU. Furthermore, 32 laser diodes are provided to output different wavelengths so that the wavelength of the optical signal to be added can be converted into any of the 32 wavelengths. The lights output from these laser diodes are multiplexed by a wavelength multiplexer to generate a light in which 1 through 32 wavelengths are multiplexed. With the redundant laser diode unit, there are current and standby configurations for the wavelength multiplexer.

After being output from the wavelength multiplexer, the light is amplified by an optical amplification unit. The optical amplification unit is also redundantly designed. That is, the optical amplification unit has two amplification media between which an attenuator is inserted. The attenuator adjusts the intensity of an incident light to the amplification medium at the second stage. After the optical signal has been amplified by the amplification medium, a part of the signal is branched by a coupler CPL and input to a coupler unit CPL 3. The branched optical signal is input to the spectrum analyzer unit SAUL. The spectrum analyzer unit SAUL comprises a spectrum analyzer controller SAU CNT and a spectrum analyzer SAU controlled by the spectrum analyzer controller. The coupler CPL outputs to an optical monitor port an output light required when the system operator manually checks the output light from the laser bank. The analysis result from the spectrum analyzer unit is transmitted to the laser diode controller LDC not shown in FIG. 9, and is used to control the laser diodes. As shown in FIG. 9, both the spectrum analyzer unit SAUL and the laser diode control unit LDC are redundantly designed.

Thus, a plurality of laser diodes having different wavelengths are provided and the lights are used with their wavelength multiplexed because the laser which is able to modify an oscillated wavelength is very unstable and inefficiently functions in the optical communications in which the oscillated wavelength should be completely stable.

After the lights output from a plurality of laser diodes are multiplexed, they are amplified by an optical amplifier and input to a 1×8 coupler of the coupler unit CPL 3. The 1×8 coupler branches only the input light having the wavelength to be used for an add optical signal, and transmits the light to the optical modulation unit. In this case, since there are only four wavelengths of the optical signal to be added/ dropped, only four ports of the 1×8 coupler are actually connected. The remaining points are used to provide a light for an optical modulator (not shown in FIG. 9) provided for the communications line in the opposite direction.

The fiber connected to the output port of the 1×8 coupler is transmitted to the optical modulation unit having a modulator provided for each of the wavelength of the optical signal to be added. In FIG. 9, the configuration of only one modulator is shown, but there are actually four modulation devices of the same configuration. From the light transmitted from the laser bank, a light having the wavelength to be used for an add light is selected by the AOTF at the first stage of a wavelength selection unit TFR 1. The selected light having the wavelength is input to a modulator Mod of the modulator unit. On the other hand, data is transmitted as an optical signal having a predetermined wavelength from the electric ADM device, received by the receiver OR, and converted into an electric signal. The electric signal is branched by a distributor, and applied to the modulator Mod through a digital flipflop D-FF and an electric amplifier. The modulator Mod receives the electric signal, modulates for output the optical signal having the wavelength selected by the AOTF at the first stage of the wavelength selection unit. The modulated optical signal is branched by the 1×2 couplers one of which is detected by the controller to check whether or not the optical signal has been correctly modulated. The detection result is fed back to the electric amplifier, and an adjustment is made such that the modulator Mod can stably operate.

Thus, the optical signal modulated by the modulator Mod is amplified by an optical amplifier POA, input to the AOTF at the second stage of the wavelength selection unit, and transmitted as an add optical signal. After the signal is amplified by the optical amplifier POA, it is then passed through the AOTF again to remove the noise generated in the optical amplifier POA. This AOTF is designed to select the same wavelength as in the AOTFs in the former stage of the wavelength selection unit.

When the wavelength of the light to be added is selected from the light provided by the laser bank, an AOTF is used, not a filter for selecting a wavelength of a fixed type, because the AOTF can easily change a wavelength to be selected when the wavelength of an optical signal to be added/ dropped should be changed.

The optical amplifier POA in the latter stage of the modulator Mod can be a 1-wave amplifier by first selecting only one wave to be used for an add optical signal by the AOTF in the former stage of the wavelength selection unit, thereby realizing a small amplifier. As described above, an optical signal can be first modulated, and a wavelength can be selected later. However, in this case, the amplifier in the latter stage of the modulator must be an optical amplifier for a wavelength-multiplexed light. Therefore, a larger amplifier is more costly.

Figure 10:
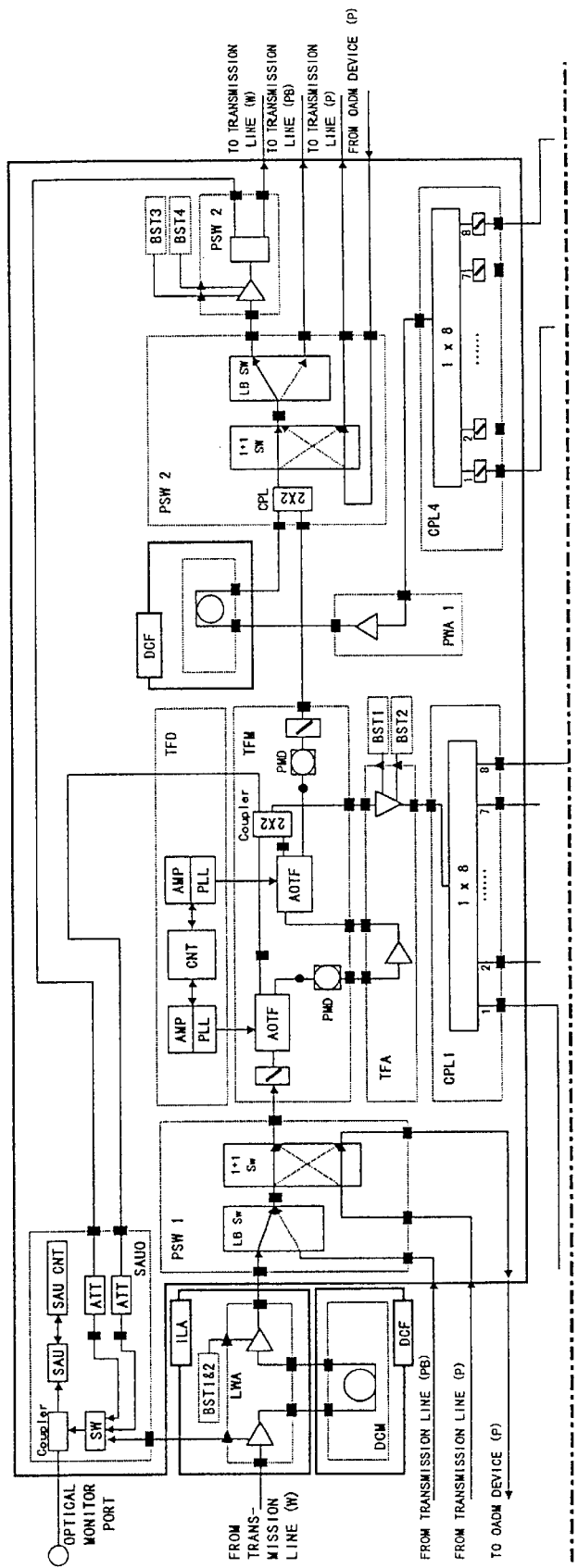
FIG. 10 shows the third example (1) of the practical configuration of the OADM device using an AOTF.
Figure 11:
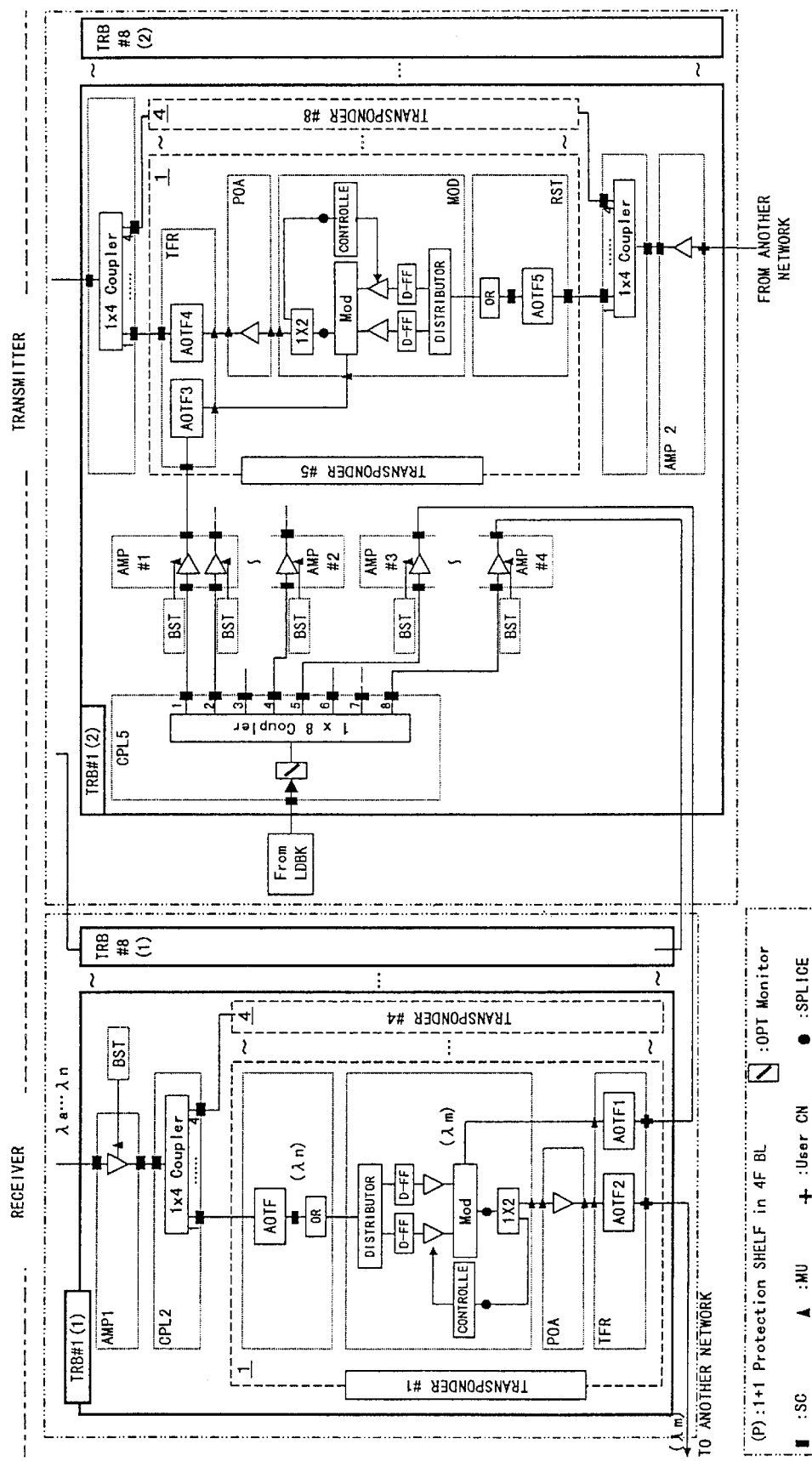
FIG. 11 shows the third example (2) of the practical configuration of the OADM device using an AOTF.

FIGS. 10 and 11 show the third example of the practical configuration of the OADM device using an AOTF.

FIG. 10 shows a transmission line redundantly designed as work and protection configurations. As described later, a transmission line can be redundantly designed in several ways. For example, a UPSR (uni-directional path switch ring), a 2-fiber or 4-fiber BLSR (bi-directional line switch ring), etc. can be adopted. FIG. 10 shows a 4-fiber BLSR where the transmission line (PB) refers to a transmission cable to the LB switch provided in the OADM device in the transmission line in the opposite direction of the 4-fiber BLSR. The transmission line (P) refers to a transmission cable to the optical 1+1 protection switch (1+1SW) provided in the OADM device in the transmission line in the opposite direction of the 4-fiber BLSR. They are provided for the redundant transmission line and OADM device. The redundant system is described later.

The optical signal input through the current transmission line is amplified by an optical amplification unit ILA, and the dispersion is compensated for by the dispersion compensation fiber DCF. Then, the signal is input to the switch unit PSW 1. The switch unit PSW 1 comprises an LB switch and a 1+1 switch. Actually, one of them can be provided depending on which is used in the network, a 2-fiber BLSR or a 4-fiber BLSR.

After the optical signal has passed through the switch unit PSW 1, a drop light is dropped by the above described function of the tunable filter module, and the signal is input to the coupler unit CPL 1 having a 1×8 coupler. The 1×8 coupler branches a wavelength multiplexed optical signal containing all dropped wavelengths into 8 portions, and transmits them to the receiving unit of the tributary station. After passing through the tunable filter module, the optical signal is input to the 2×2 coupler of the switch unit PSW 2. The add optical signal transmitted from the tributary station is multiplexed by the 1×8 coupler of the coupler unit CPL 4, and amplified by the optical amplifier PWA 1. The dispersion of the amplified optical signal is compensated for by the dispersion compensation fiber DCF, and is wavelength multiplexed with a through light by the 2×2 coupler of the switch unit PSW 2.

An optical monitor is provided for each add optical signal having each wavelength before the 1×8 coupler of the coupler unit CPL 4. The monitor is provided to check whether the coupler unit CPL 4 is correctly mounted.

The through light and the add light multiplexed by the 2×2 coupler pass through the 1+1 switch provided for redundancy and the LB switch, and are then amplified by the optical amplifier PWA 2 for transmission through the transmission line.

FIG. 11 shows the configuration on the tributary station side in the practical example shown in FIG. 10.

On the receiving side, receivers TRB #1 through #8 (1) are provided for the number of optical signals dropped and branched from the OADM device. The configuration of only the receiver TRB #1 is shown in FIG. 11 for detail description here.

First, the dropped optical signal contains eight waves. When the optical signal is input to the receiver TRB #1 (1), it is amplified by an optical amplifier AMP 1. The optical amplifier AMP 1 receives a pump light from the pump light source BST. The amplified optical signal is branched into the number of wavelengths of the optical signals dropped by the 1×4 coupler of the coupler unit CPL 2. In this example, it is branched into four portions. Then, they are input to the transponder #1 for converting the wavelength of an optical signal. Although the detailed configuration is omitted here, there are four transponder #1 through #4, and each of them receives an optical signal output from the 1×4 coupler.

When the optical signal is input to the transponder #1, an optical signal having one wavelength is selected by the AOTF functioning as a wavelength selection filter, and is converted into an electric signal by the optical receiver OR. The electric signal is branched into two by the distributor, and is applied to the modulator Mod through the digital flip-flop D-FF and the amplifier. The modulator Mod receives lights from the laser bank LDBK on the transmitting side. An appropriate wavelength is selected by the AOTF 1 from among the wavelengths transmitted from the laser bank LDBK, and is then output. The output optical signal is amplified by the optical amplifier POA, and the noise components of the amplifier are removed by the AOTF 2. Then, the optical signal is transmitted to another network, etc. Thus, when data is transmitted to another network, a dropped optical signal cannot be transmitted as is. As a result, a transponder is provided to convert the wavelength of an optical signal into an optional wavelength. The output from the modulator Mod is branched by a 1×2 coupler, detected by the controller, and fed back to stabilize the operation of the modulator Mod.

Thus, the operation of the transponder on the receiving side is basically the same as that of the optical modulation unit shown in FIG. 9.

On the transmitting side, a light for use in modulation is transmitted from the laser bank LDBK not shown in FIG. 11. The light is transmitted to the coupler unit CPL 5 of the transmitters #1 through #8 (2). When the light is input, it first passes through the optical monitor for monitoring whether or not the coupler unit CPL 5 is successfully connected. Then, it is branched into eight lights, and amplified by the optical amplifiers AMP #1 through #4. Among the eight lights, only four lights are used to generate an add light signal, and the other four lights are transmitted to the transponder on the receiving side as the wavelength conversion lights for the optical signal.

Among the lights from the laser bank, the four lights used for generation of an add optical signal are input to the AOTF 3 of the transponder #5, and the wavelength for generation of an add optical signal is selected and transmitted to the modulator Mod. The data which is transmitted as an optical signal from another network, and whose add light should be modulated is amplified by the optical amplifier AMP 2. Then, it is branched by the 1×4 coupler. The wavelength is selected by the AOTF 5, and the optical signal is converted by the optical receiver OR into an electric signal. Since the operations after this step are the same as the operations for the transponder on the receiving side, the detailed description is omitted here. The add optical signal output from the AOTF 4 is multiplexed by the 1×4 coupler with the similarly generated optical signals of the transponders #6 through #8, and then transmitted to the OADM device as an add optical signal.

Figure 12:
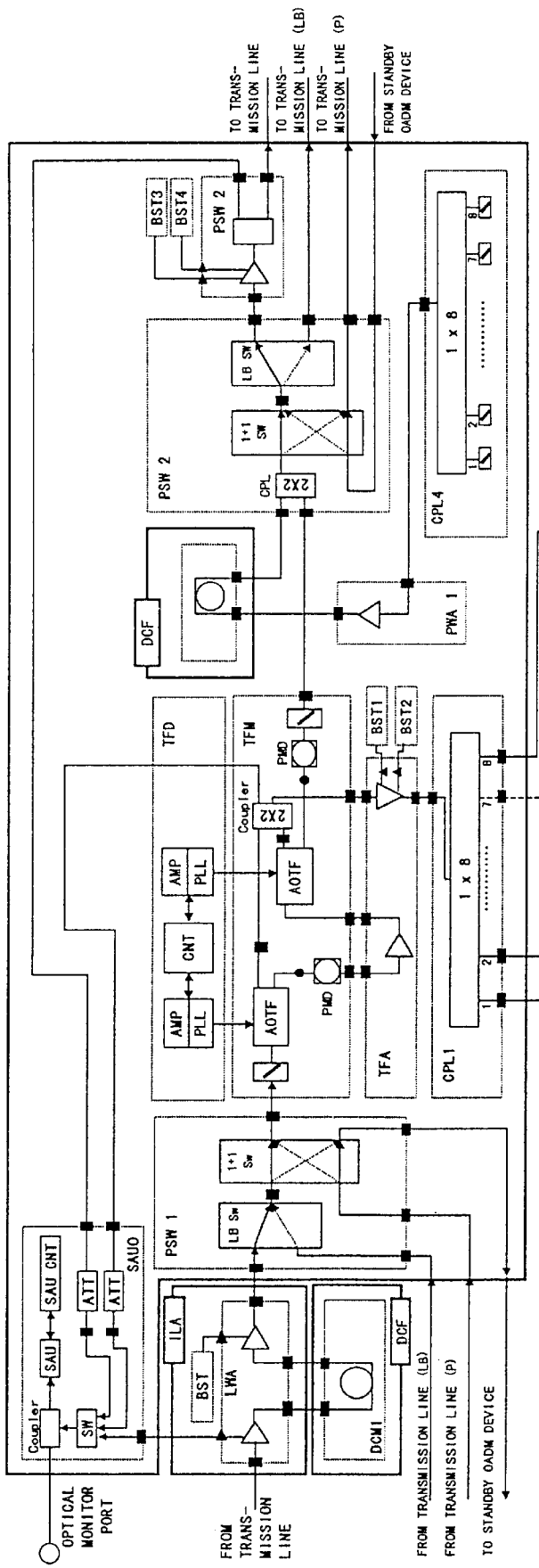
FIG. 12 shows the fourth example (1) of the practical configuration of the OADM device using an AOTF.
Figure 13:
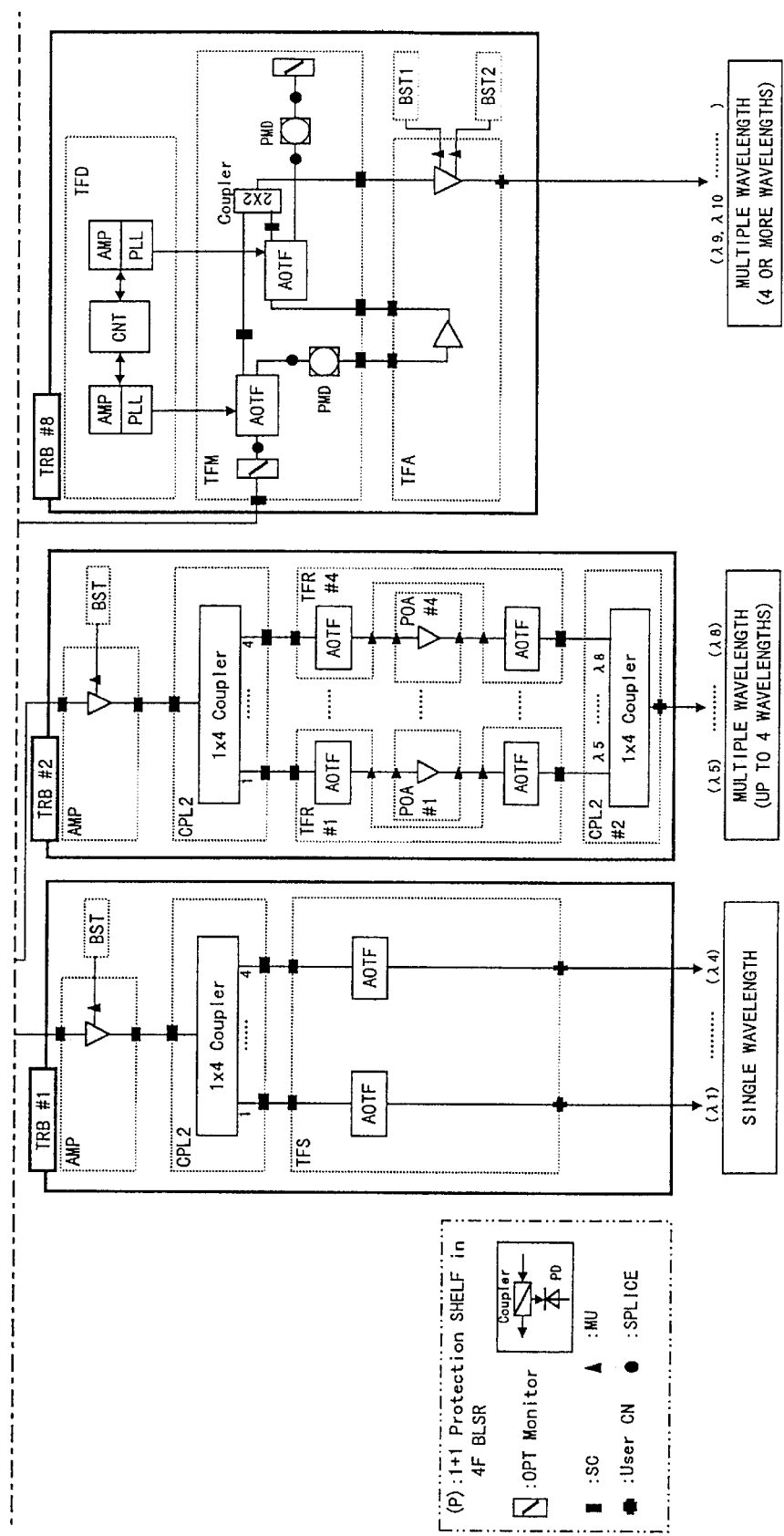
FIG. 13 shows the fourth example (2) of the practical configuration of the OADM device using an AOTF.

FIGS. 12 and 13 show the fourth example of the practical configuration of the OADM device using an AOTF.

Since the configuration shown in FIG. 12 is generally the same as the configuration shown in FIG. 10, the detailed explanation is omitted here. In FIG. 12, the line connection is not made at the adding terminal. However, it is only omitted in FIG. 12. Actually, an add optical signal transmitting terminal of the tributary station should be connected.

The optical signal input through the transmission line is amplified by the optical amplifier. The dispersion in the transmission line is compensated for by the dispersion compensation fiber. Then, the optical signal is input to the switch unit PSW 1 for switching the work and protection units. The switching operation depends on the redundant configuration of the network. In this example, a 4-fiber BLSR is used. After the optical signal has passed through the switch unit PSW 1, a drop light is dropped by the tunable filter module. The drop optical signal is transmitted to the receiving terminal of the tributary station by the 1×8 coupler. The through optical signal is input as is to the 2×2 coupler of the switch unit PSW 2. The add optical signal is first multiplexed by the 2×8 coupler, and is amplified by the optical amplifier PWA 1. The dispersion is compensated for by the dispersion compensation fiber DCF. Then, the optical signal is multiplexed by the 2×2 coupler with the through light. The 2×2 coupler and the 2×8 coupler can be a 1×2 coupler and a 1×8 coupler respectively. A coupler having one more output port is used in this example for convenience when the state of the multiplexed optical signal is to be monitored. Therefore, it is not always necessary to use a 2×2 coupler and a 2×8 coupler.

The optical signal obtained by multiplexing an add optical signal with a through optical signal passes through a switch (1+1 switch and LB switch) for switching work and protection configurations. Then, it is amplified by the optical amplifier PWA 2, and transmitted through the transmission line.

FIG. 13 shows an example of a variation of the configuration of the receiving side of the tributary station.

The receiving unit TRB #1 refers to the configuration when the network connected after the tributary station is a single-wavelength network. After a drop optical signal dropped from the OADM device is amplified by the optical amplifier AMP, the signal is branched into four portions by the 1×4 coupler of the coupler unit CPL 2. The number of the branched portions is 4 because the number of the wavelengths to be dropped by the OADM device is defined as 4. The optical signal branched by the 1×4 coupler is transmitted to each AOTF, and the optical signal of each wavelength is selected. When the optical signals having the respective wavelengths of $\lambda 1$ through $\lambda 4$ are selected, they are transmitted as is to the single-wavelength network. If the wavelength of the optical signal supported by the single-wavelength network is not the dropped wavelength of the optical signal, a transponder for converting a wavelength is provided before the connection of the single-wavelength network so that the optical signal having the supported wavelength can be transmitted.

In the receiving unit TRB #2, the network connected after the tributary station is a multiple-wavelength network. However, it is a wavelength-multiplexed system of up to four waves. The drop optical signal dropped from the OADM device is amplified by the optical amplifier AMP, branched into four portions by the 1×4 coupler, and then input to the wavelength selection units TFR #1 through #4 provided for each output port of the 1×4 coupler. In the AOTF, only one wave is extracted from the drop optical signal. The extracted optical signal is amplified by the optical amplifier POA for a single wavelength, and is input to the AOTF again. The AOTF at the later stage is, as described above, provided to remove the noises from the optical amplifier POA. Thus, the drop optical signals extracted by the wavelength selection unit TFR #1 through #4 are multiplexed by the 2×4 coupler, and transmitted to the wavelength multiplexing network. If the dropped wavelength is not supported by the next wavelength multiplexing network, the wavelength is converted for connection through a transponder.

The receiving unit TRB #8 refers to the configuration of a tributary station when connected to a network supporting a wavelength multiplexed optical signal having four or more waves. When four or more wavelengths of a drop optical signal are selected, the wavelengths are selected with two stages of AOTFs used as in the OADM device. The AOTF is driven by a tunable filter driver TFD. The optical signals dropped by the OADM device are all selected by a two-stage AOTF. Therefore, no optical signals other than noises are output to the through port of the second-stage AOTF. Therefore, a light output from the through port of the second-stage AOTF is discarded. Other configurations and operations are the same as those for dropping the optical signal through the AOTF of the OADM device. Therefore, the detailed explanation is omitted here.

Thus, the drop optical signal having the selected wavelength is multiplexed by the 2×2 coupler, amplified, and then transmitted to the next wavelength multiplexing network. As described above, if the next network does not support the dropped wavelength of the optical signal, or is using another optical signal, then the wavelength of the optical signal is converted and transmitted to the network at the next stage.

Figure 14:
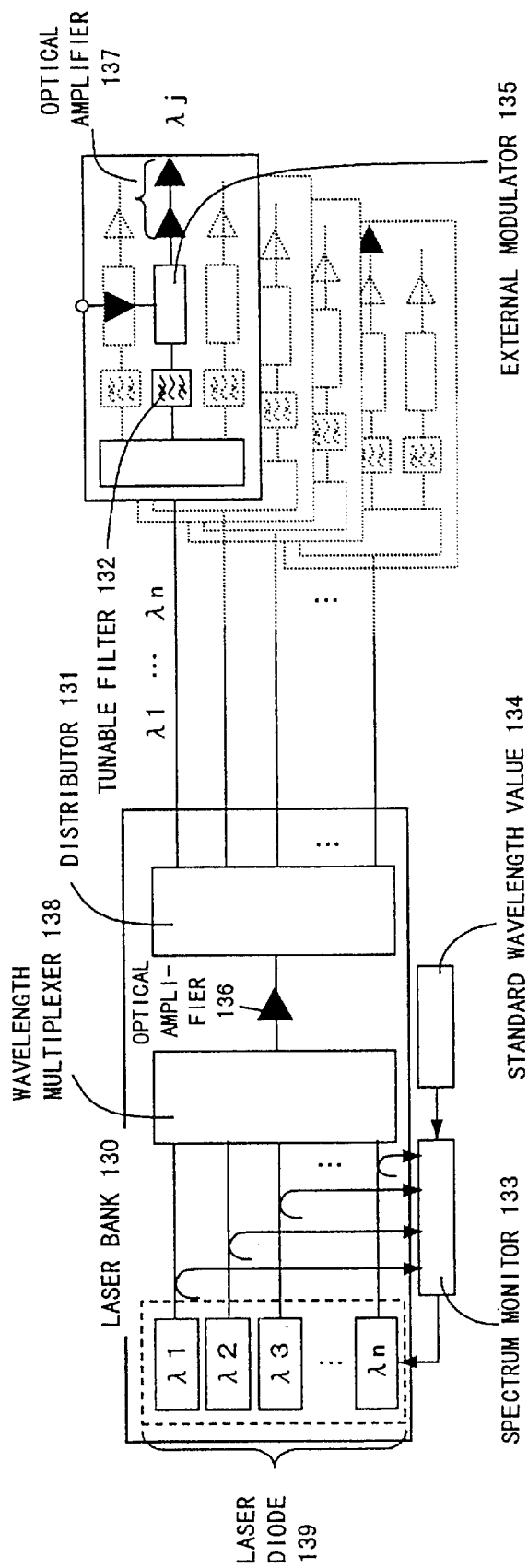
FIG. 14 shows the configuration and the concept of a laser bank used to provide a light to generate an add optical signal.

FIG. 14 shows the configuration and the concept of the laser bank used to provide a light for use in generating an add optical signal.

To produce an OADM system of an optional wavelength type, an optical signal having an optional wavelength should be dropped, and simultaneously an optical signal having a corresponding optional wavelength should be added. To attain this, an optical signal having an optional wavelength should be generated on the tributary station side. Therefore, a light source capable of optionally changing an wavelength is required. However, it is very difficult for a laser diode widely used as a light source to change a wavelength because the laser is originally designed to emit a strong light when the light is transmitted between reflecting mirrors with an emission medium inserted between them. The oscillated wavelength depends on the characteristic of the emission medium and the optical distance between the reflecting mirrors. Particularly, when different wavelengths are to be oscillated from the same laser, the optical distance between the reflecting mirror must be variable. However, there are no appropriate methods to attain this. Currently, the optical distance can be changed by mechanically changing the positions of the reflecting mirrors, or changing the temperature to adjust the refractive index of the emission medium. Mechanically moving the reflecting mirrors requires a movable unit of the laser. This is subject to displacement of the reflecting mirrors, and a laser light cannot be stably emitted. Changing the temperature to vary the wavelength allows a laser light to be stably emitted because the laser has no movable units. However, since only a small change can be made to the wavelength by raising the temperature, the entire grid of the wavelength multiplexing system cannot be covered.

Therefore, the present embodiment includes a plurality of laser diodes each of which can oscillate all possible wavelengths to be used, and the laser lights oscillated by the laser diodes are collectively processed as a laser light for various uses.

The configuration of the laser bank is shown in FIG. 14. The laser bank comprises a plurality of laser diodes 139 for oscillating the wavelengths having the respective wavelengths of $\lambda 1$ through $\lambda n$. The wavelength oscillated by each of the laser diodes is monitored by a spectrum monitor 133 and compared with a predetermined reference wavelength value. When there is a difference between the reference value and the actual value, the drive current or the temperature of the laser diode 139 which generates an error in oscillated wavelength is adjusted to output a predetermined oscillated wavelength.

The optical signals oscillated by the respective laser diodes 139 are wavelength-multiplexed by a wavelength multiplexer 138 into a single light. Then, it is amplified by an optical amplifier 136, and a distributor 131 branches only the required number of optical signals.

When the light is used, a required wavelength is extracted from the light received from the laser bank using a tunable filter 132 such as an AOTF, etc. or a band pass filter, etc. for generating a fixed selected wavelength if a fixed wavelength is to be used. Then, an external modulator 135 modulates the extracted wavelength, and an optical amplifier 137 amplifies and transmits the modulated wavelength.

Thus, a plurality of lights from a light source outputting a plurality of wavelengths can be multiplexed for use. The lights having any wavelengths output from the light source can be used after extracted through a filter. Especially, in an wavelength division multiplexing communications system, the wavelength of an optical signal of each channel is regulated by the ITU-T Recommendation, and the wavelength out of the regulation cannot be used. As a result, the laser bank is applicable.

FIGS. 15 through 21 show the method of controlling the dropping AOTF in the OADM device.

Although FIGS. 15 through 21 show only one AOTF, it is obvious that two of the above described AOTFs can be used.

Figure 15:
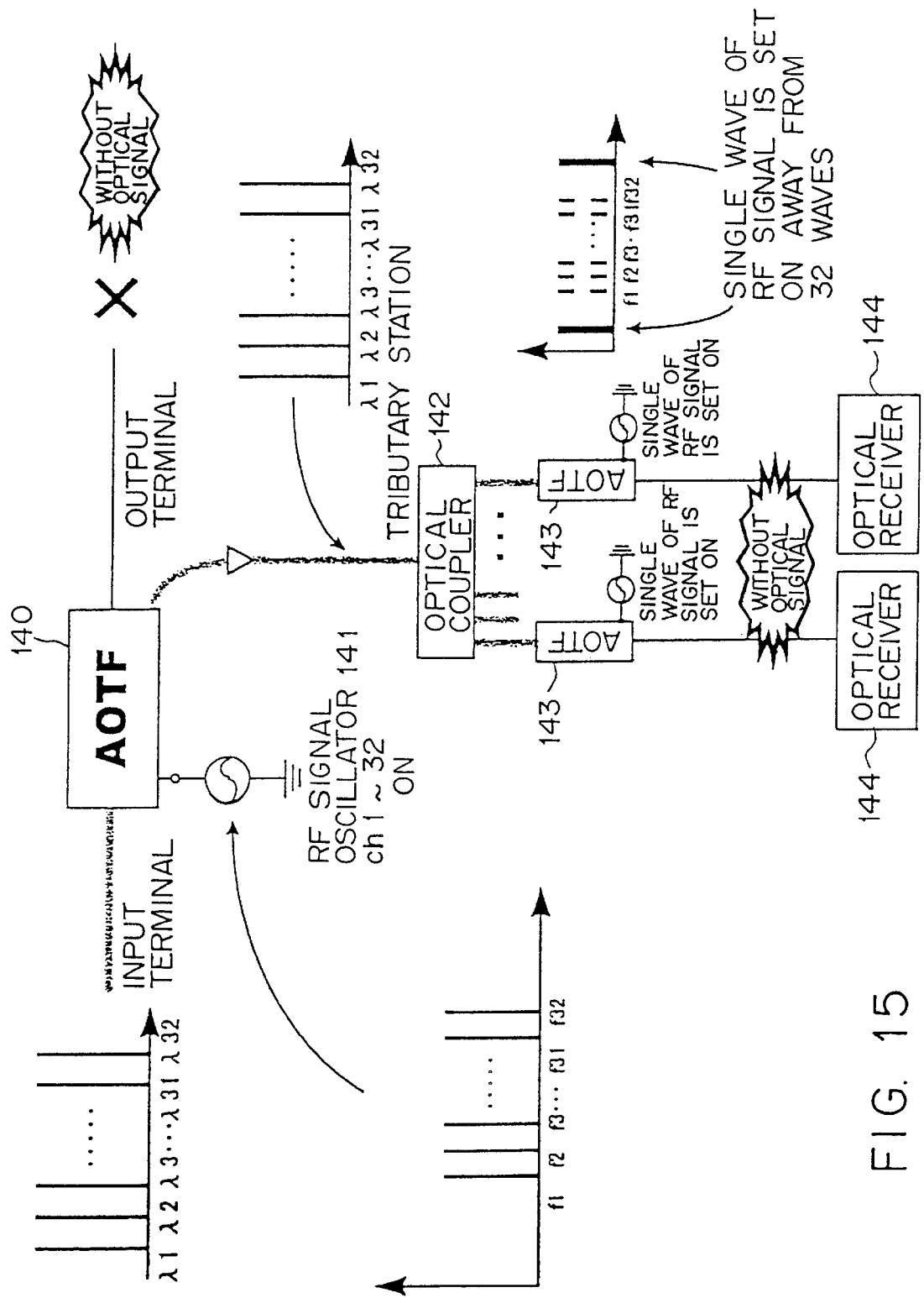
FIG. 15 is a chart (1) showing the method of controlling the dropping AOTF in the OADM device.

FIG. 15 shows the initial state of the OADM system including the OADM device. When a wavelength-multiplexed optical signal having, for example, 32 waves is transmitted from the input terminal, it is desired that the optical signal is not output anywhere before the operation of the system. At this time, an RF signal oscillator applies an RF signal to an AOTF 140 so that any wavelength of the 32 waves can be selected by the AOTF 140. Then, the wavelengths of all the 32 waves input from the input terminal are dropped, and no optical signals are output to the through terminal (output terminal). Therefore, the optical signals of all the 32 waves are transmitted to the tributary station. The tributary station branches the transmitted optical signal by an optical coupler 142, and transmits it to an AOTF 143 for selecting an optical signal having each wavelength. During the normal operation, the AOTF 143 selects a wavelength to be dropped. However, in the initial state, an RF signal is input. The RF signal has a selected wavelength sufficiently away from the optical signals having the 32 waves transmitted from the input terminal to the AOTF 143 so that there are no light leakage, etc. As a result, there are no wavelengths to be selected by the AOTF 143 from among the 32 waves, and no optical signals are transmitted to an optical receiver 144. Thus, in the initial state of the system, all paths are closed, and no optical signals are received.

An RF signal is applied to the AOTF 143 to constantly select one wavelength. Therefore, even if no optical signals are selected, the RF signal should be applied such that one position other than the positions of the 32 waves can be selected. As a result, the power of the RF signal applied to the AOTF 143 can be constant regardless of whether an optical signal is selected or not selected, thereby stabilizing the operations of the AOTF 143.

Figure 16:
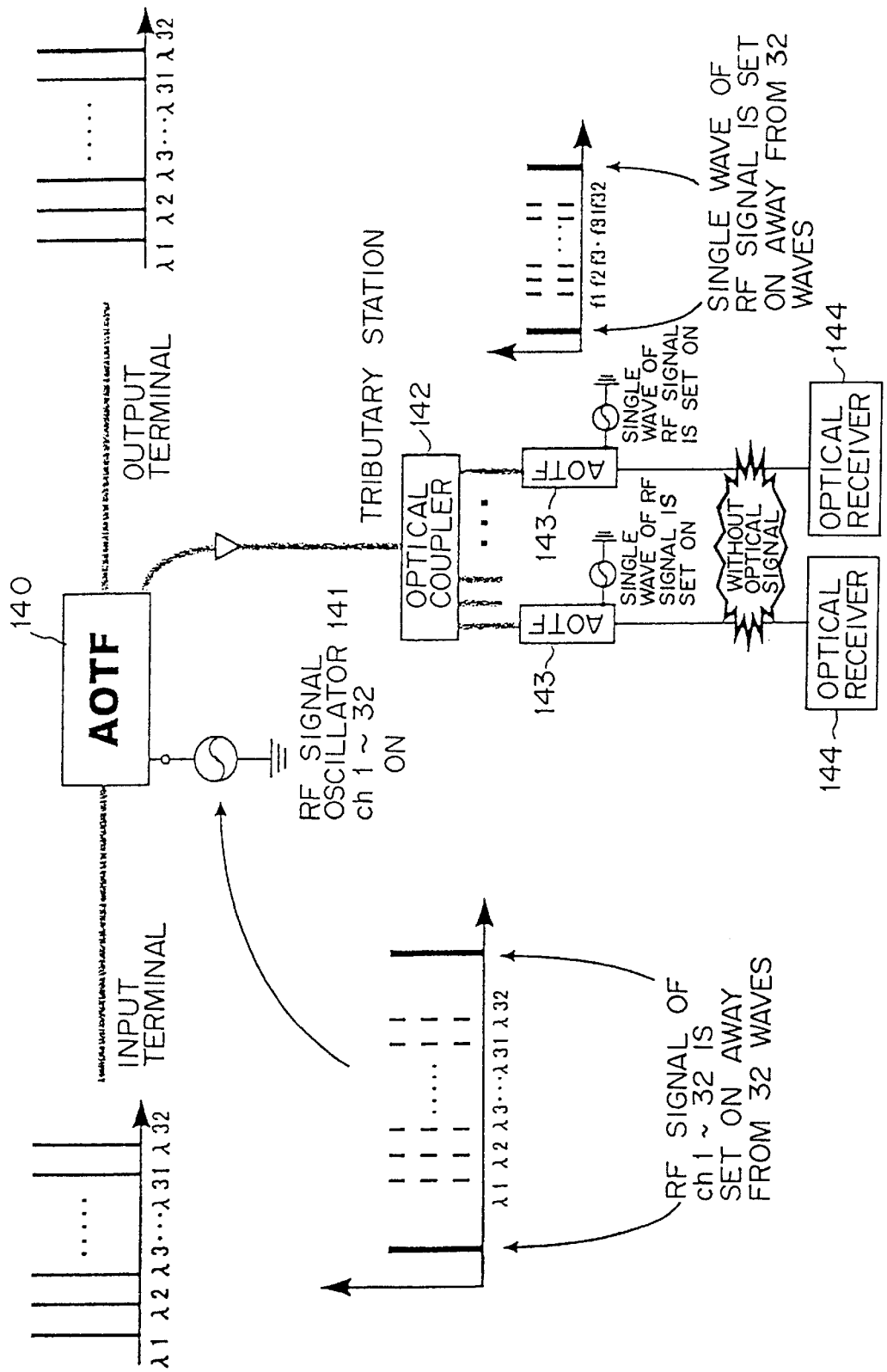
FIG. 16 is a chart (2) showing the method of controlling the dropping AOTF in the OADM device.

FIG. 16 shows the method of controlling the AOTF when no signals are dropped by the OADM device.

When an optical signal passes through, an RF signal oscillator 141 generates an RF signal for application such that the selected wavelength is set at the position other than the positions of the wavelengths of the 32 waves in the AOTF 140. Although the RF signal does not select an optical signal, it contains 32 frequencies for selection of 32 wavelengths. Since an RF signal for 32 waves is applied to the AOTF 140 in FIG. 14, the RF signal having 32 frequencies is applied not to make a large change to the characteristic of the AOTF 140.

Thus, the optical signals having 32 waves are transmitted to the through terminal (output terminal). No optical signals are dropped on the tributary station side. Therefore, an optical signal is not input to the optical coupler 142. However, an RF signal is applied such that a wavelength position other than the positions of the 32 waves can be selected. The RF signal has one frequency for selection of only one wave. Thus, as described above, the operation of the AOTF 143 can be controlled not to be changed with the power of the RF signal. Consequently, the optical receiver 144 does not detect an optical signal.

Figure 17:
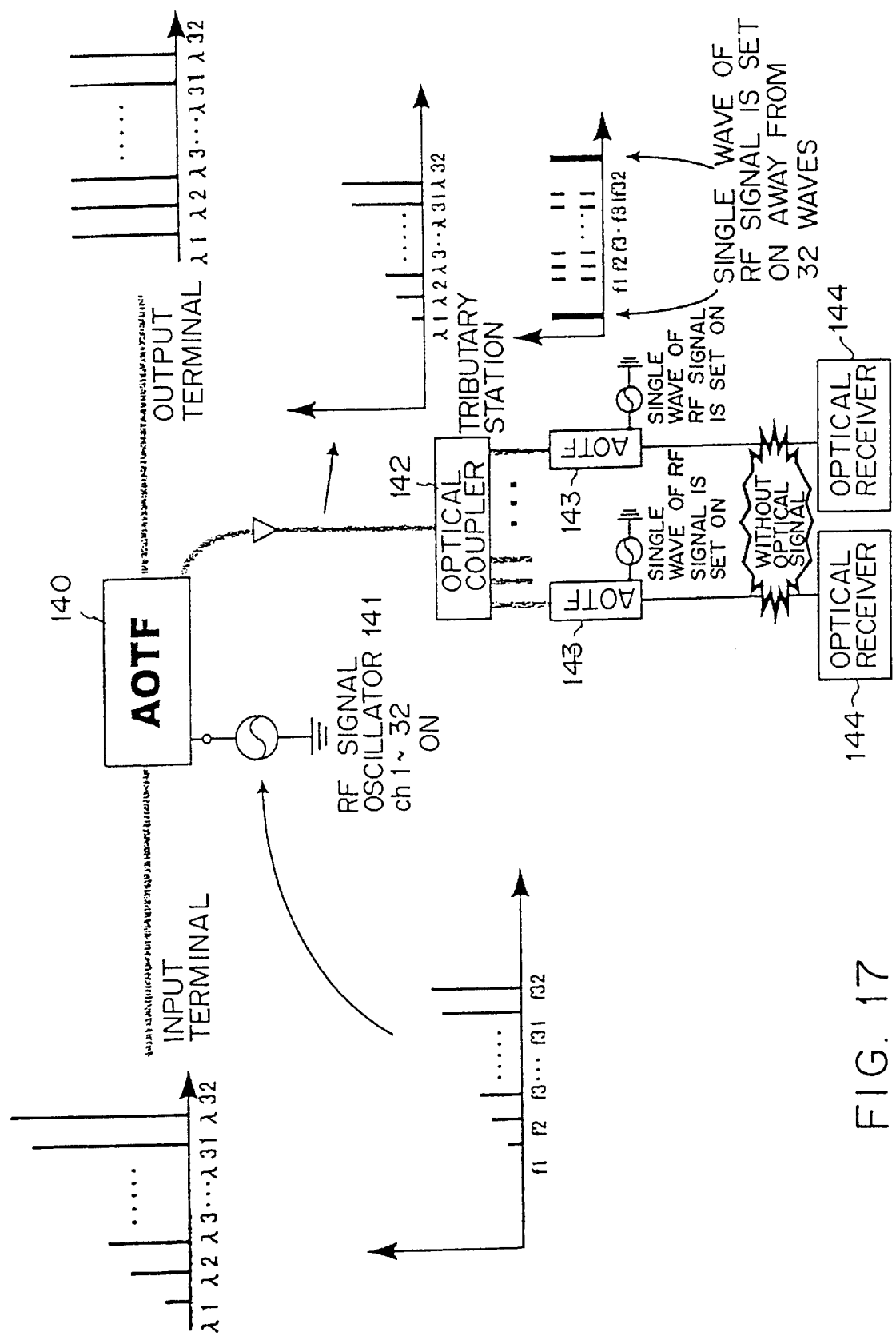
FIG. 17 is a chart (3) showing the method of controlling the dropping AOTF in the OADM device.

FIG. 17 shows the method of controlling the AOTF when the OADM device drops no optical signals, but an input optical signal has a different power for each wavelength.

In FIG. 17, the power of the wavelength becomes larger in order from $\lambda 1$ to $\lambda 32$ when a tilt arises. However, the identical function can be realized when the power of each wavelength is quite different from the power of each other.

That is, since the power of a dropped optical signal depends on the power of the RF signal applied to the AOTF 140, it is desired that the RF signal oscillator 141 drops more optical signals having wavelengths of larger powers, and drops less or no optical signals having wavelengths of smaller powers. As a result, the optical signals output to the through terminal (output terminal) are almost the same in power. On the other hand, on the tributary station side, the number of drop lights depends on the power detected when input to the AOTF 140. The drop light is amplified by the optical amplifier or branched by the optical coupler 142. However, no optical signals are output from the AOTF 143 by setting the selected wavelength of the AOTF 143 away from the bands of the wavelengths of the 32 waves. Therefore, the optical receiver 144 receives no optical signals and performs no dropping operations.

Thus, the AOTF 140 is used not only to drop a wavelength but also to adjust the differences in power between wavelengths, thereby improving the quality of the transmission in a system.

The AOTF 140 can also be designed to receive an RF signal of 32 frequencies for use in constantly selecting 32 wavelengths. The AOTF 143 is designed to receive an RF signal having one frequency for selection of only one wave. With this configuration, the operations of the AOTFs 140 and 143 can be stabilized regardless of the number of wavelengths to be selected, or whether or not a wavelength is selected.

The operation of compensating for the difference in power of wavelengths can be performed through software by providing a control CPU.

Figure 18:
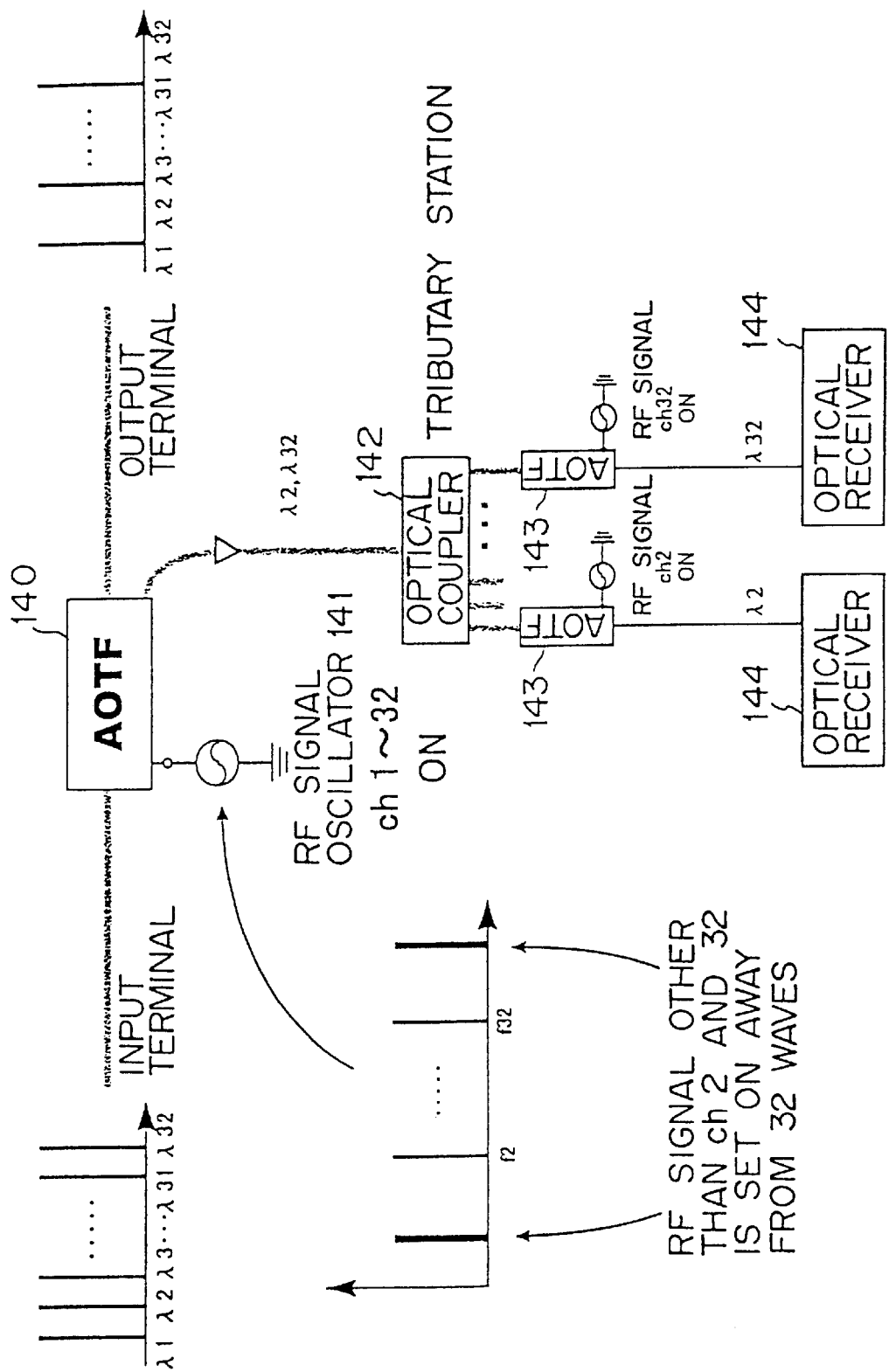
FIG. 18 is a chart (4) showing the method of controlling the dropping AOTF in the OADM device.

FIG. 18 shows the method of controlling each AOTF when the OADM device drops an optical signal.

In this example, only $\lambda 2$ and $\lambda 32$ are dropped from among the wavelengths of $\lambda 1$ through $\lambda 32$. When an optical signal having 32 waves is input from the input terminal, an RF signal for selecting the wavelengths of $\lambda 2$ and $\lambda 32$ is applied to the AOTF 140. Simultaneously, an RF signal having 30 frequencies for selection of 30 waves is generated by the RF signal oscillator 141 at the position away from the wavelengths of the optical signal having 32 waves so that the operation of the AOTF 140 can be stabilized. As a result, the RF signal applied to the AOTF 140 can select 32 waves, but actually dropped optical signals have the wavelengths of only $\lambda 2$ and $\lambda 32$. All the other optical signals are transmitted to the through terminal (output terminal).

The dropped wavelengths $\lambda 2$ and $\lambda 32$ are transmitted to the tributary station side, branched by the optical coupler 142, and input to the AOTF 143. An RF signal having a frequency for selection of only one wave is applied to the AOTF 143. One of the AOTFs 143 selects the wavelength of $\lambda 2$, and the other selects the wavelength of $\lambda 32$. Thus, one of the optical receiver 144 receives an optical signal having the wavelength of $\lambda 2$ while the other receives an optical signal having the wavelength of $\lambda 32$.

As described above, RF signals of the same power are applied to the AOTFs 140 and 143 to stabilize the operation of the AOTF. Additionally, the difference in power between wavelength-multiplexed optical signals can be suppressed.

Figure 19:
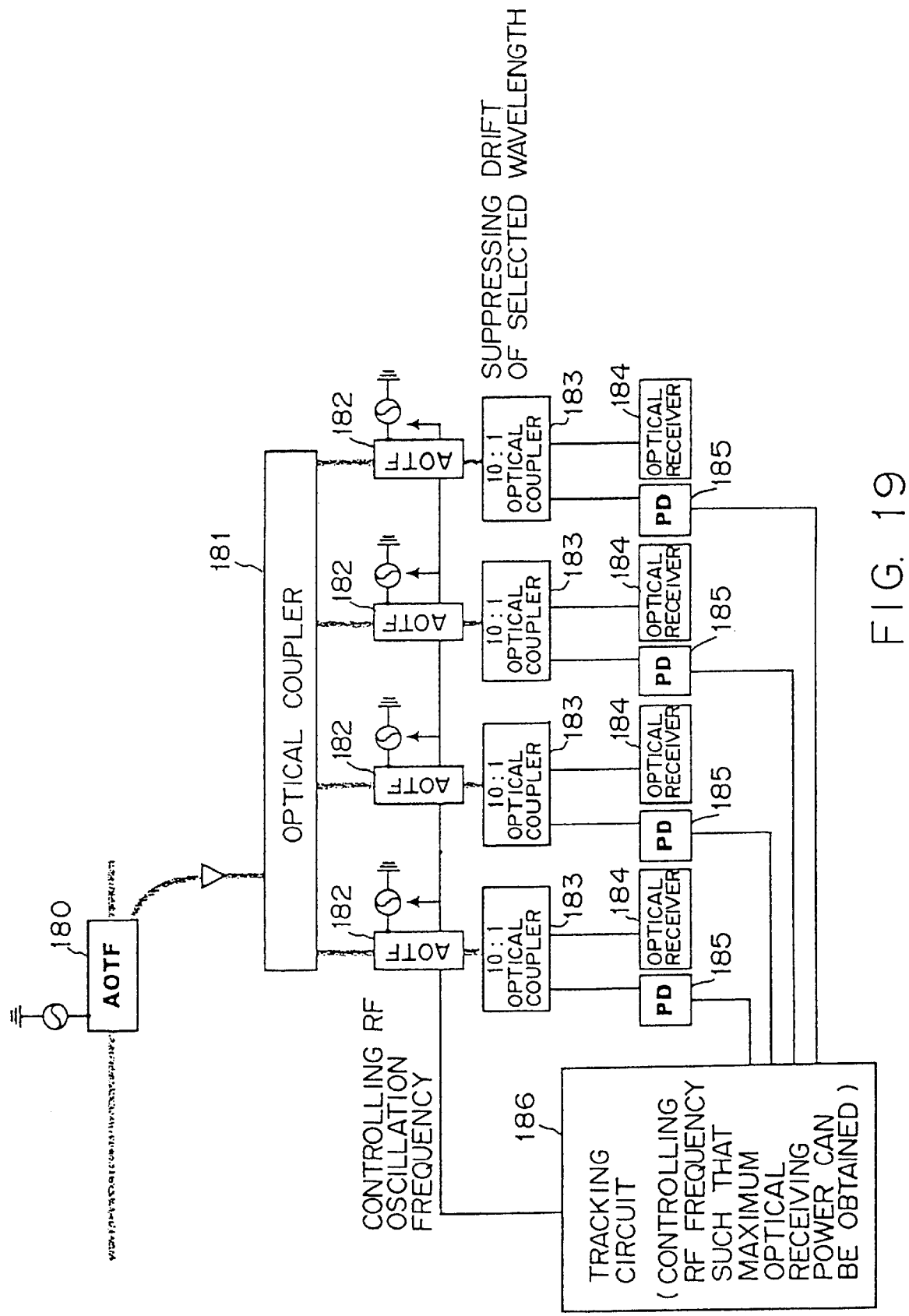
FIG. 19 is a chart (5) showing the method of controlling the dropping AOTF in the OADM device.

FIG. 19 shows the tracking of a selected wavelength on the tributary station side.

The optical signal dropped by an AOTF 180 of the OADM device is branched into the number (4 waves in FIG. 19) of wavelengths dropped by an optical coupler 181, and an AOTF 182 selects each wavelength. However, there can be a difference between the wavelength of a dropped optical signal and the selected wavelength of the AOTF 182 due to a change in temperature or the difference in frequency of the RF signal. Therefore, the optical signal selected by the AOTF 182 should be monitored, and the wavelength of the optical signal should match the selected wavelength of the AOTF 182. To attain this, for example, a 10:1 optical coupler 183 is provided after the AOTF 182 to receive most of the optical signals by an optical receiver and detect the power of a part of them by a photodiode PD 185. The result is transmitted to a tracking circuit 186. The tracking circuit 186 slightly changes the frequency of the RF signal to be applied to the AOTF 182, or superposes a low frequency component to the base frequency of the RF signal to be applied to the AOTF 182, and detects the change in power of the optical signal received by the photodiode PD 185. Thus, the power of the optical signal received by the photodiode PD 185 is controlled to be the largest. It is confirmed that the reception power of the optical signal, indicated by the central frequency, is the largest when the frequency of the RF signal is slightly shifted to change between a higher frequency and a smaller frequency, and the power of the optical signal received by the photodiode PD 185 becomes small on both sides of the larger frequency and the smaller frequency. The tracking circuit 186 adjusts the RF signal such that the above described state can be detected, thereby successfully performing the tracking operation.

Figure 20:
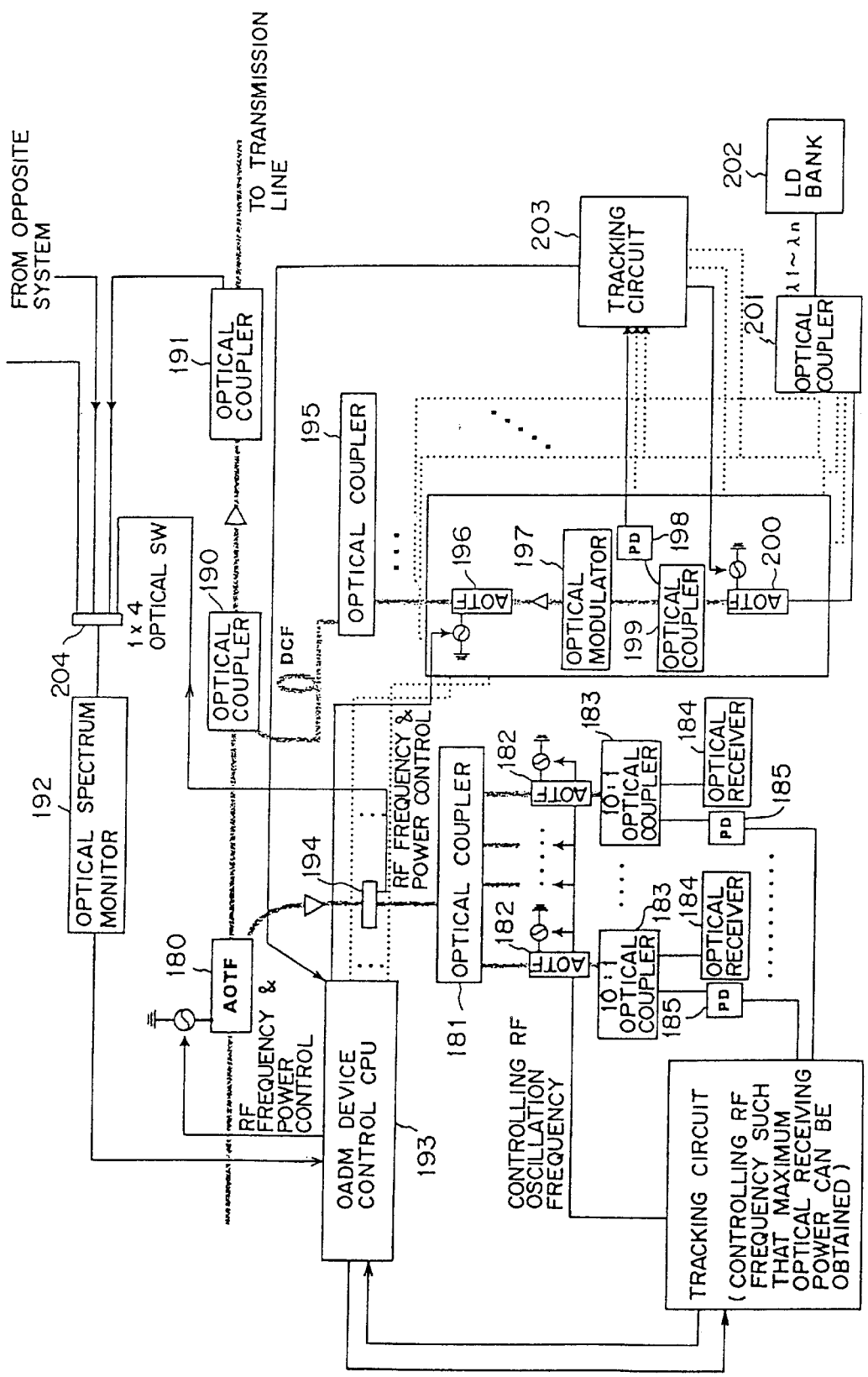
FIG. 20 is a chart (6) showing the method of controlling the dropping AOTF in the OADM device.

FIG. 20 shows the control of the entire AOTF of the OADM system.

In FIG. 20, the units assigned the same numbers as those shown in FIG. 19 are identical to each other. Therefore, the detailed explanation about the identical units are omitted here.

The optical signal dropped by the AOTF 180 of the OADM device is branched by an optical coupler 194, and is input to an optical spectrum monitor 192 through a 1×4 switch so that it can be checked whether or not an appropriate operation is being performed for the wavelength of an optical signal to be dropped when the AOTF 180 of the OADM device selects the wavelength of the optical signal.

That is, when the wavelength of the optical signal to be dropped does not match the selected wavelength characteristic of the AOTF 180, the spectrum of the optical signal to be dropped cannot be completely dropped, thereby causing the optical signal to have undesired wavelength deterioration. Consequently, the frequency and power of the RF signal to be applied to the AOTF 180 should be appropriately controlled. The analysis result of the optical spectrum monitor 192 is input to an OADM device control CPU 193, and a control signal of the RF signal is output so that the AOTF 180 can properly operate.

The tracking circuit 186 described above by referring to FIG. 19 also exchanges information with the OADM device control CPU 193 to control the AOTF 182 to properly operate.

At the add optical signal generation terminal of the tributary station, a light output from an LD bank 202 is branched by an optical coupler 201, and its wavelength is selected by an AOTF 200. It is also monitored whether or not the wavelength selection is appropriately performed. To control the AOTF 200, the light is branched by an optical coupler 199, received by a PD 198, and the result is input to a tracking circuit 203. The tracking circuit 203 exchanges information with the OADM device control CPU 193, and performs the tracking operation on the AOTF 200 in the process as described above by referring to FIG. 19. The light output from the optical coupler 199 is modulated by an optical modulator 197, amplified at the next stage, and its wavelength is selected by an AOTF 196. Since the AOTF 196 is required to have the same selected wavelength as the AOTF 200, the OADM device control CPU 193 obtains the information obtained by the tracking circuit 203, and controls the RF signal applied to the AOTF 196. As a result, the AOTF 196 has the same wavelength selection characteristic as the AOTF 200, thereby successfully selecting an optical signal having the same wavelength. After passing through the AOTF 196, the optical signal is multiplexed by an optical coupler 195 as an add optical signal. The dispersion is compensated for through the dispersion compensation fiber, and the optical signal is multiplexed by the optical coupler 190 with the optical signal passing through the AOTF 180.

The optical signal multiplexed with the add optical signal is amplified, and then branched by an optical coupler 191 to check whether or not the add optical signal is correctly added. Then, the optical signal is analyzed by the optical spectrum monitor 192 through a 1×4 optical switch 204. The result is used by the OADM device control CPU 193 to generate a control signal, and control the AOTF 180, the AOTF 196, or the AOTF 200 through the tracking circuit 203.

An optical signal from the OADM device for transmission in the opposite direction or from the tributary station is applied to the 1×4 optical switch 204, and also to the optical spectrum monitor 192 after sequential switching because the optical spectrum monitor 192 is large and expensive, and it is not desired in cost and size to provide it at necessary points. Instead, the optical spectrum monitor 192 is designed to concurrently perform the optical spectrum analysis and the data transmission, and to finish the analysis of one optical signal and simultaneously start the analysis of the next spectrum without waiting for the transmission of data. Normally, since the optical spectrum monitor 192 requires the same length of time for the spectrum analysis of an optical signal and the data transmission, it is not efficient to prolong the process time by starting the analysis of the next optical signal after completion of the data transmission. Therefore, the 1×4 optical switch 204 is controlled to switch to the next optical signal as soon as the spectrum analysis of the optical signal is completed.

The OADM device control CPU 193 contains a ROM to store the application states of a plurality of RF signals such as the data of the RF signal applied to the AOTF 180 when the AOTF 180 drops an optical signal, the RF signal data when it passes through, etc. A predetermined RF frequency and the power can be immediately applied using the data in the ROM by changing the set value of the oscillation frequency of the RF signal applied to the AOTF 180.

An entire AOTF is controlled in the following sequence. That is, the AOTF 182 is first driven. When the operation becomes stable, the AOTF 180 is driven next. When the operation of the AOTF 180 becomes stable, an optical receiver 184 receives a drop optical signal. Then, the AOTFs 196 and 200 are driven. When their operations become stable, the optical modulator 197 is driven and an add optical signal is transmitted.

Figure 21:
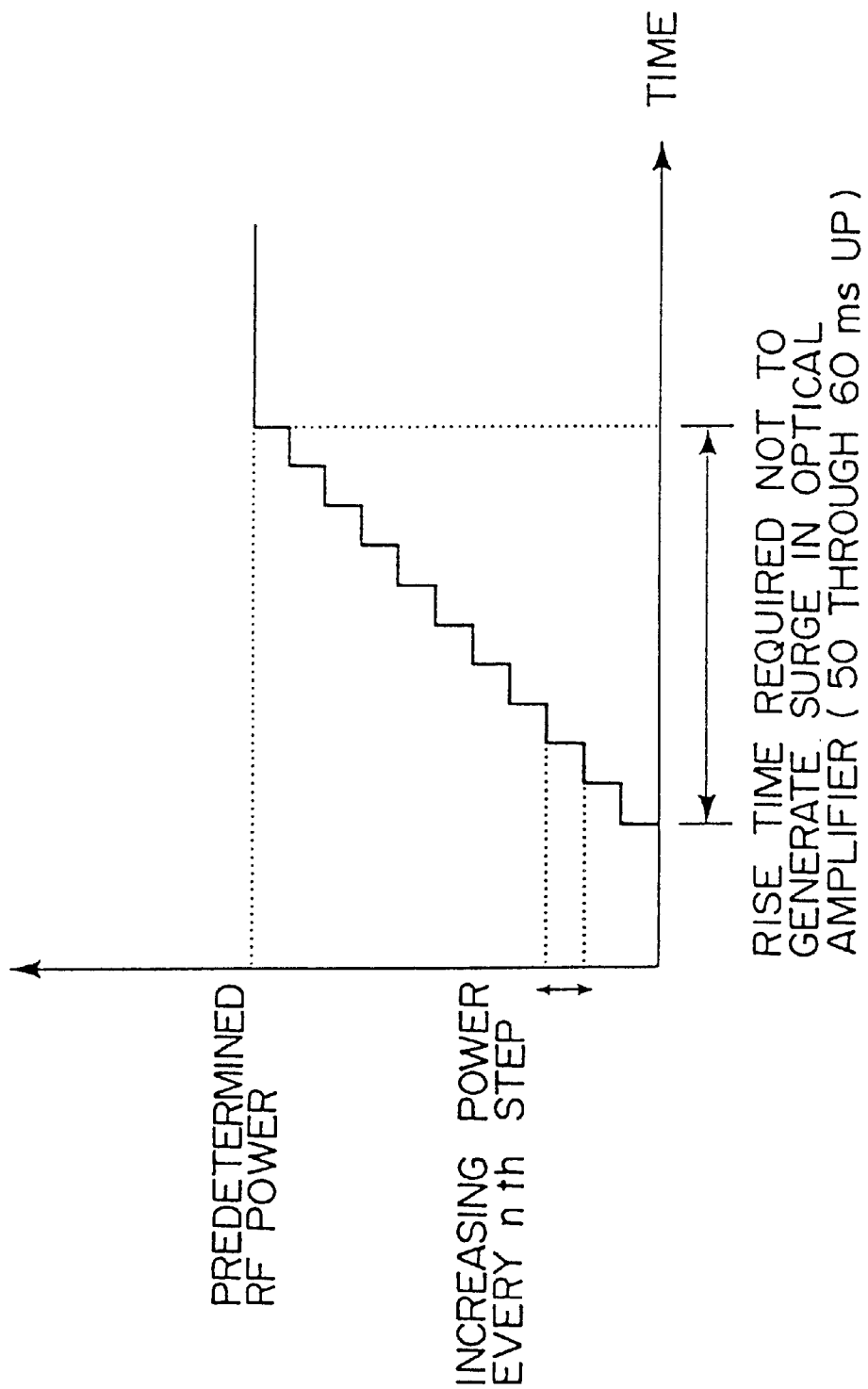
FIG. 21 is a chart (7) showing the method of controlling the dropping AOTF in the OADM device.

FIG. 21 shows the method of applying an RF signal to an AOTF.

When an RF signal is suddenly applied to an AOTF, a corresponding optical signal is immediately selected and output. Since there is a large loss in the AOTF, an optical amplifier is normally inserted after the AOTF. With this configuration, when the AOTF suddenly selects an optical signal, and a strong light is suddenly input to the optical amplifier, an optical surge phenomenon occurs. To avoid this, a light input to the optical amplifier should take 50–60 ms as a rising time. Then, the power of the RF signal is gradually increased up to the full level within 50–60 ms. Then, since the power of the light selected by the AOTF corresponds one-to-one to the power of the RF signal, the light is also raised within 50–60 ms. The method of raising an RF signal can be to smoothly raise the signal in an analog system. However, considering digital control, the 50–60 ms is divided into n (n is a natural number) steps to raise the RF signal. The value n is set so that the simplest possible circuit can be designed to obtain the optimum effect.

In an OADM using an AOTF, as described above, the following upgrade can be expected.

That is, when an OADM is initially mounted, a channel (wavelength)to be added and a channel (wavelength) to be dropped are fixed to operate it as an OADM of a channel-fixed type. This application can be realized by fixing the RF signal frequency f1, f2, . . . , fn to be added to the AOTF 10. Since the added/dropped channel is fixed, there is no need of changing the RF signal frequency in principle. Therefore, the OADM can be easily controlled.

Next, when an OADM of an optional wavelength type capable of adding/dropping an optional channel (wavelength) is requested, it can be realized by only providing the function of varying the RF signal frequency f1, f2, . . . , fn to be applied to the AOTF 10. For example, when a channel to be dropped is changed in FIG. 2, the RF signal frequency to be added to the AOTF 10 can be changed according to the channel (wavelength) to be changed. Furthermore, when a channel to be added is changed, a laser bank comprising a laser diode LD 19 and an 8×8 coupler is provided. Then, the wavelength selected from the WDM light (wavelength-multiplexed light) output from the 8×8 coupler can be tuned by the AOTF 14. In this case, the RF signal frequency applied to the AOTF 14 can be changed according to the selected wavelength.

Thus, the upgrade from the fixed wavelength type to the optional wavelength type can be realized using an AOTF and a laser bank almost without changing the hardware of the OADM.

Figure 22:
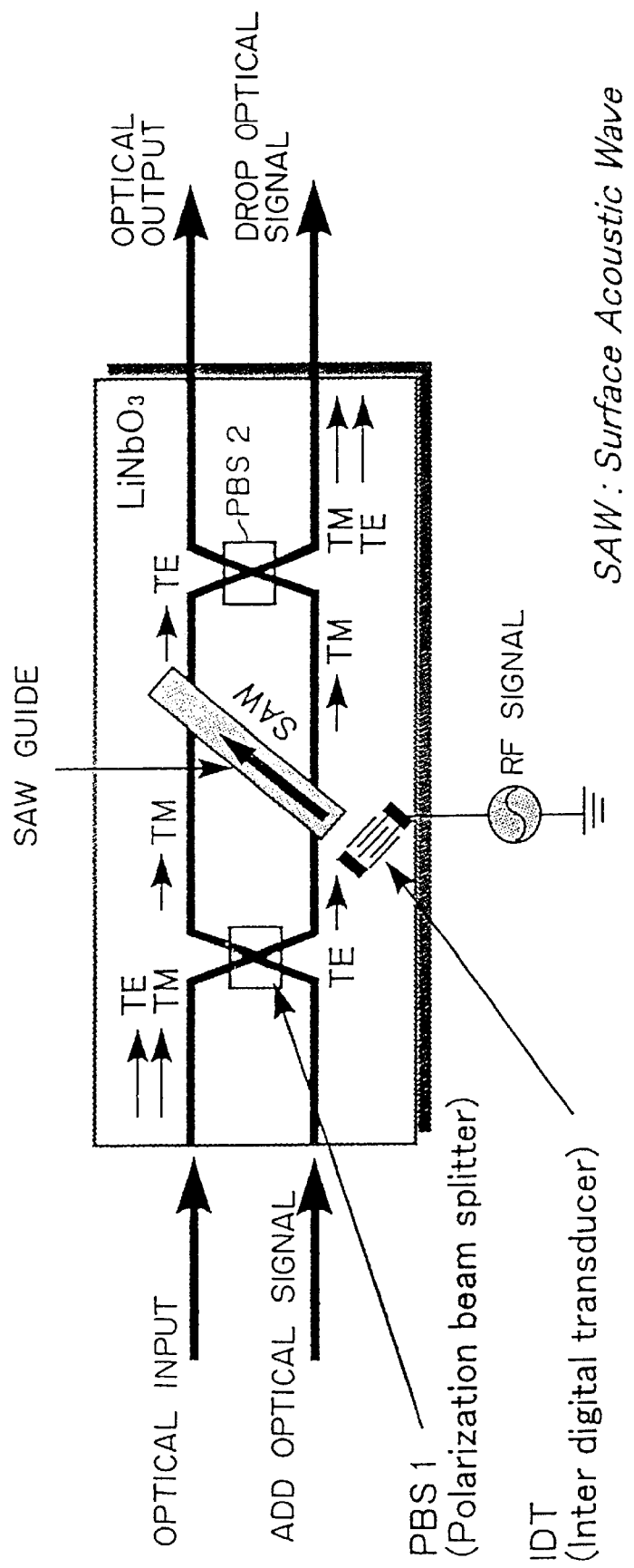
FIG. 22 shows the configuration of the AOTF.

FIG. 22 shows the configuration of an AOTF.

The AOTF has an optical waveguide as indicated by the solid lines shown in FIG. 22 on the substrate of lithium niobate. A polarization beam splitter PBS is provided at the crossing of the waveguides. The RF signal is applied to the electrode referred to as an IDT (inter-digital transducer) formed like combined combs. When an RF signal having a predetermined frequency is applied to the IDT, a surface acoustic wave (SAW) is generated and propagated on the surface of the substrate. The influence of the propagation of the SAW reaches the optical waveguide in the substrate, periodically changes the refractive index, and forms a structure like a thin wave plate in the substrate. The SAW guide is a metallic film applied onto the surface of the substrate. The SAW propagates along the guide.

The optical signal input from the optical input terminal contains a combination of a TE mode and a TM mode. It is divided by a PBS 1 into the TM mode and the TE mode, and propagates through respective waveguides. If there is a light having the wavelength and interacting with the SAW in the input optical signals, then the TE mode interchanges with the TM mode by the operation of the above described thin wave plate. Therefore, the forward direction of the wavelength in the PBS 2 changes, and the signal is output an a drop optical signal. On the other hand, the light having the wavelength other than the wavelength interacting with the SAW is influenced at random by the SAW. Consequently, the TE mode does not interchange with the TM mode, and the lights having such wavelengths are output as through lights to the optical output terminal.

Similarly, when an add optical signal shown in FIG. 22 is input, it is branched into the TE mode and the TM mode and transmitted in the PBS 1. Since the add optical signal has the same wavelength as the drop optical signal, it interacts with the SAW. The TE mode interchanges with the TM mode, and the signal is output as an optical output. Thus, the optical signal adding operation is performed.

Since the lithium niobate has the characteristic of birefringence, the transmission speed in the TE mode is different from the transmission speed in the TM mode in the waveguide. Therefore, the light having the wavelength causing no mode interchange is transmitted as an optical output with the polarization mode dispersion. On the other hand, a light having the wavelength causing mode interchange is transmitted in the TE mode for approximately the same time length as in the TM mode. Therefore, the optical length of the propagation is the same in both modes, and the polarization mode dispersion is compensated for when the light is output.

In the above described AOTF, an optical loss can be reduced or the wavelength width of selection characteristic can be narrowed by appropriately selecting the parameter (length, etc.) of the waveguide. The cross talk can be reduced by narrowing the wavelength of the selection characteristic. The side lobe of the wavelength selection characteristic can be reduced and a smaller power of an RF signal is required by diagonally arranging the SAW guide. Furthermore, the polarization dependency of a loss can be eliminated by devising the PBS.

Figure 23:
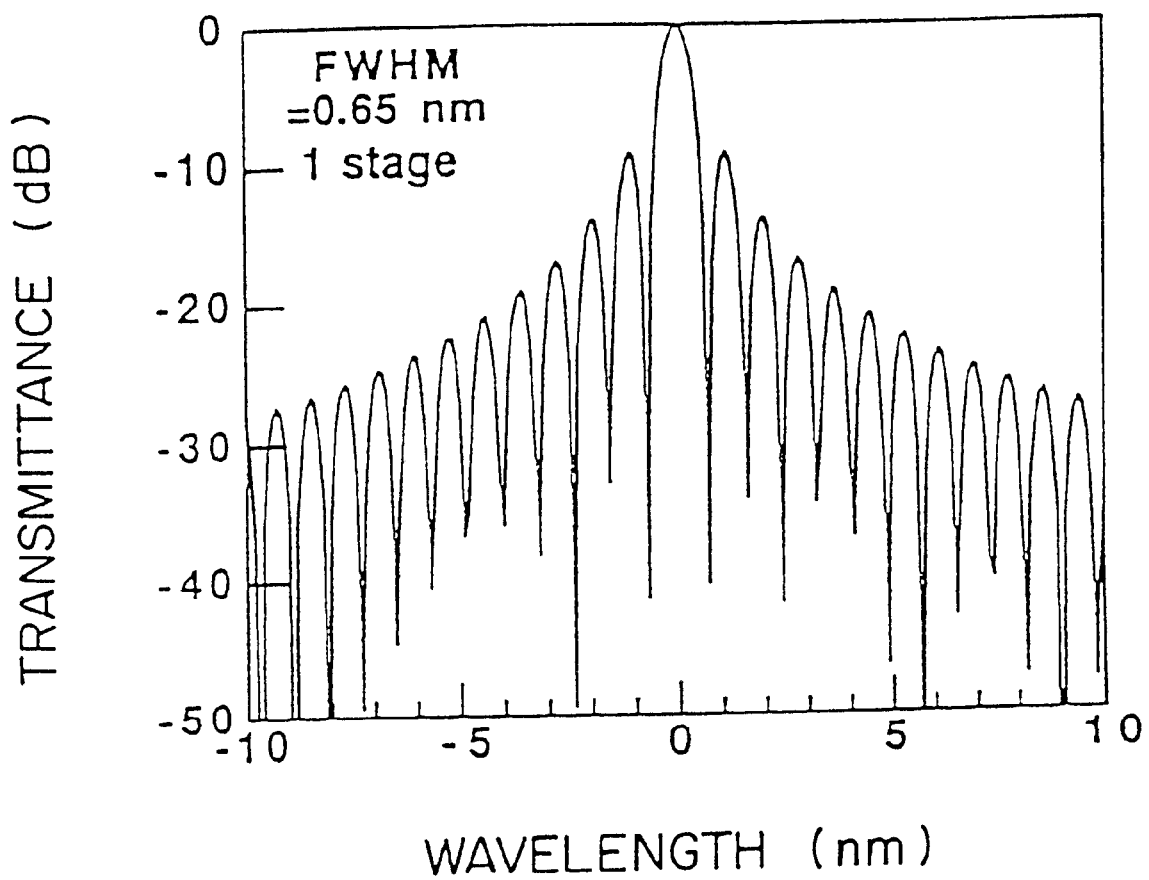
FIG. 23 shows the transmission characteristic of the AOTF shown in FIG. 22.

FIG. 23 shows the transmission characteristic of the AOTF shown in FIG. 22.

FIG. 23 shows the wavelength selection characteristic or the transmission characteristic of a drop port. As shown in FIG. 23, a number of side lobes are generated, and the half-width (FWHM) is 0.65 nm. Therefore, with the configuration shown in FIG. 22, it is difficult to select a wavelength with a smaller cross talk of the wavelength arranged on the 0.8 nm spaced grid regulated by the ITU-T G. 692.

Figure 24A:
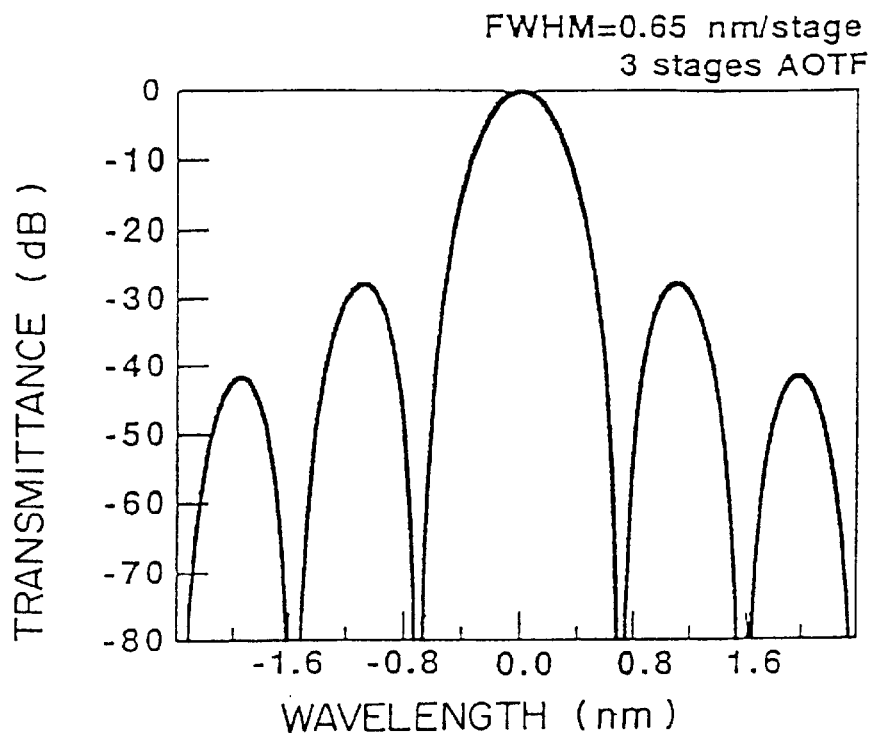
FIGS. 24A and 24B show the wavelength selection characteristic when the AOTF shown in FIG. 22 is designed as a 3-stage monolithic AOTF on the substrate, and the wavelength is selected using the SAW having the same frequency.
Figure 24B:
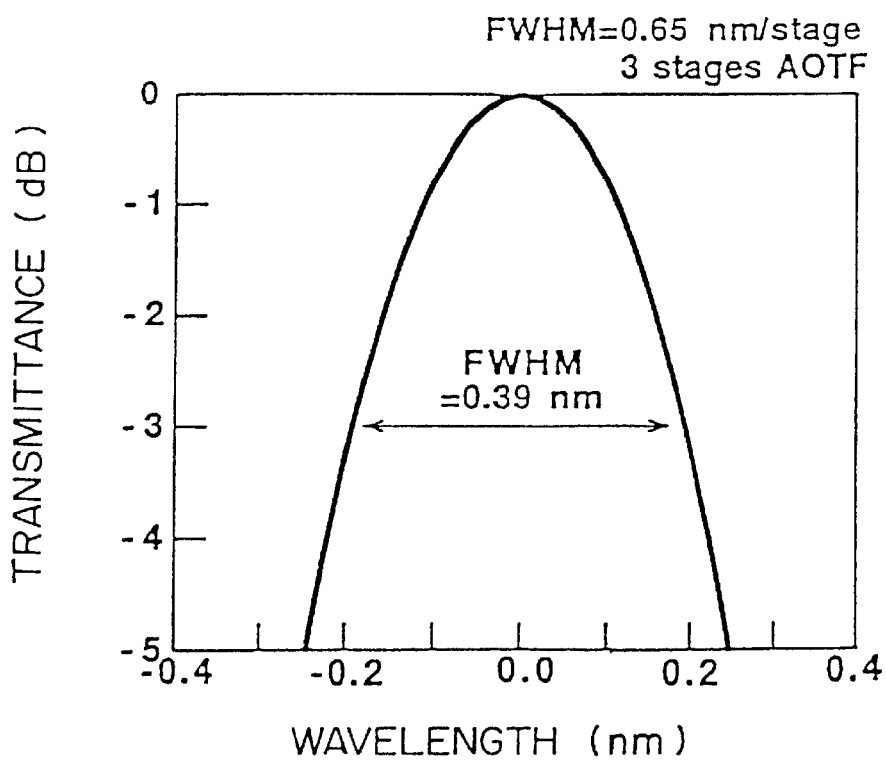

FIGS. 24A and 24B show the wavelength selection characteristic when the AOTF shown in FIG. 22 is designed as a 3-stage monolithic AOTF on the substrate, and the wavelength is selected using the SAW having the same frequency.

FIG. 24A shows the widened wavelength selection characteristic when a 1-stage AOTF having a half-width of 0.65 is connected as a 3-stage cascade. FIG. 24B is obtained by enlarging FIG. 24A, and shows the half-width of 0.39 nm. According to FIG. 24B, the optical signal arranged on the 0.8 nm spaced grid can be selected with high precision, and an appropriate cross talk can be set by adjusting the position of a side lobe.

Therefore, the AOTFs used in the OADM devices shown in FIGS. 6 through 13 are all 3-stage monolithic AOTFs, and are based on the configuration for performing a wavelength selecting operation using the SAWs having the same frequency.

Figure 25:
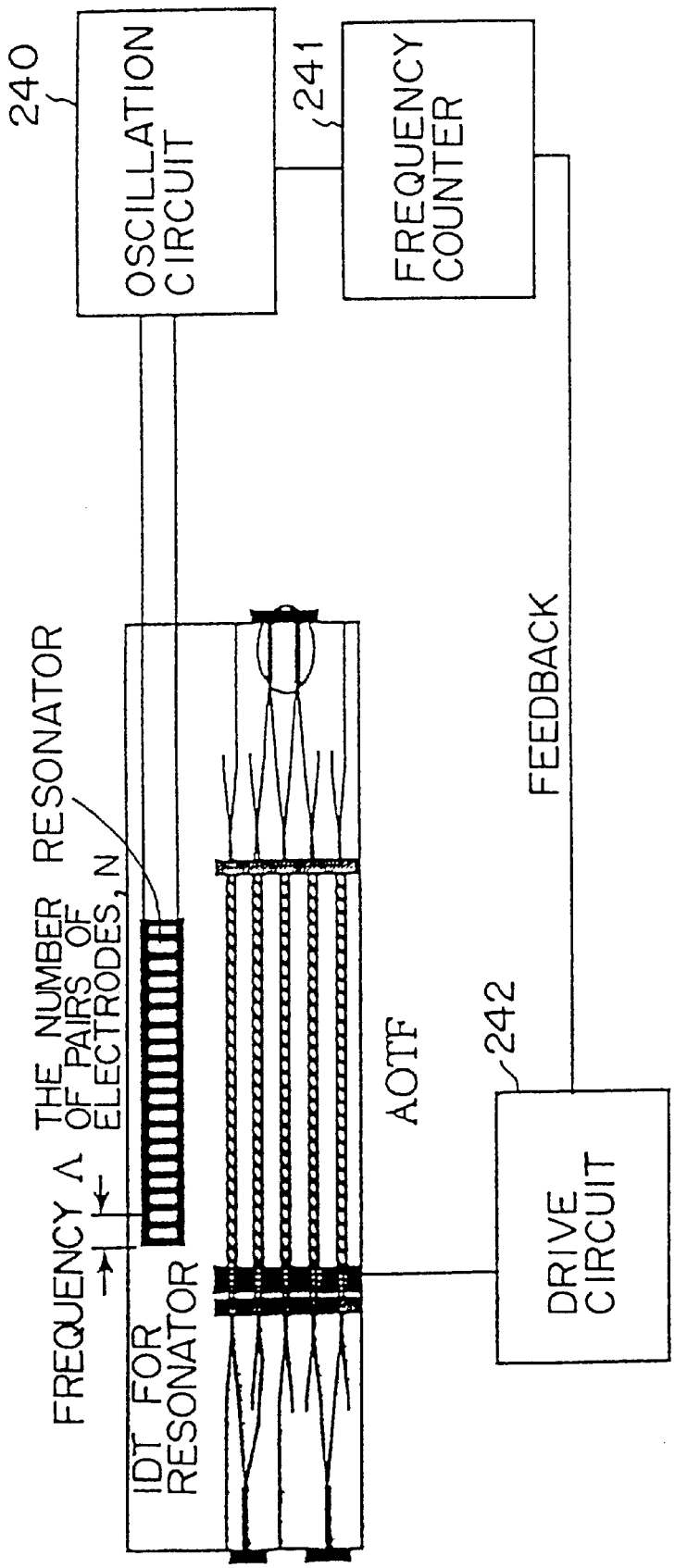
FIG. 25 shows the application technology for the temperature dependency of the AOTF.

FIG. 25 shows the application technology for the temperature dependency of the AOTF.

An AOTF is sensitive to the temperature, and the selected wavelength is displaced by 0.73 nm when the temperature rises by 1° C. In the WDM system, optical signals of adjacent channels are arranged at 0.8 nm intervals, and the AOTF selects the wavelength of the adjacent grid when the temperature rises by 1° C. Therefore, when the AOTF is used in the OADM device of an WDM system, a temperature change should be fed back to the RF signal or the temperature control device. Even if the temperature control device is provided to keep the AOTF at a constant temperature, it is hard to keep the surface of the AOTF exactly at a constant temperature because of the temperature gradient generated by applying the Peltier element, etc. to anywhere other than the surface of the AOTF. The temperature of the surface can be directly controlled. However, it is difficult to provide on the surface of the AOTF an element such as a Peltier element, etc. for raising or falling the temperature. Furthermore, since the temperature sensor has to exactly measure the temperature of the surface of the AOTF, it is difficult to appropriately mount the conventional temperature sensor. However, since the SAW propagates on the surface of the AOTF and is greatly affected by a surface temperature change, it is necessary to exactly detect the surface temperature by any method and to apply an appropriate feedback corresponding to the surface temperature.

Thus, according to the present embodiment, a resonator is generated on the surface of the AOTF to measure the temperature of the surface by considering that the oscillation frequency of the resonator is more sensitive to a temperature change. FIG. 25 shows the configuration to attain this.

The resonator can be provided with an IDT having the cycle of Λ and the number of pairs of the electrodes, N on the surface of the substrate beside the 3-stage AOTF. An oscillation circuit 240 transmits a signal such that the IDT for the resonator can be oscillated, and makes the resonator resonate. A frequency counter 241 counts the frequency at which the resonator resonates in the frequencies of the signals oscillated from the oscillation circuit 240, and obtains the surface temperature of the AOTF from the frequency. The information about the surface temperature is transmitted as a feedback to a drive circuit 242 for transmitting an RF signal to the IDT of the AOTF. The drive circuit 242 computes the displacement of the selected wavelength by a temperature change, controls the frequency of the RF signal to be applied to the AOTF, and adjusts it such that the AOTF can correctly select the optical signal having a desired wavelength.

Figure 26:
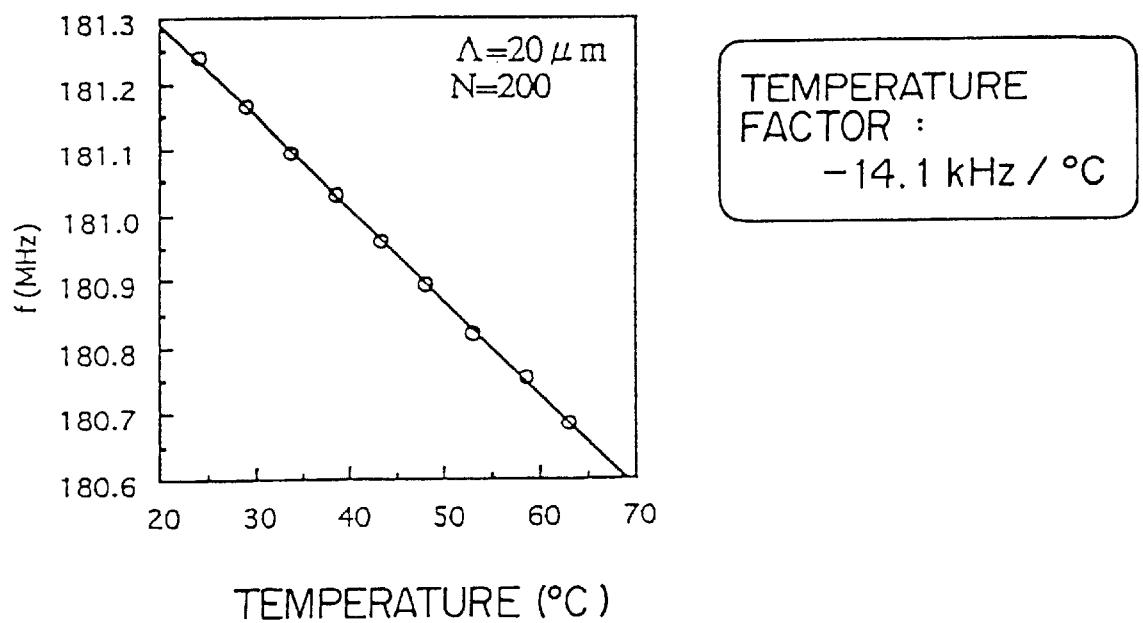
FIG. 26 shows the temperature dependency of the resonator.

FIG. 26 shows the temperature dependency of the resonator.

In FIG. 26, the change of the frequency is linearly represented in the wide range from 20° C. through 70° C. when the cycle of the IDT is 20 μm, and the number of pairs of electrodes is 200. In FIG. 26, the temperature factor of the resonator is −14.1 kHz/° C. The frequency of the resonator can be detected in an electric circuit. Assuming that the resonant frequency of a normal resonator is 180 MHz and the resonant frequency of the resonator is measured using a 1-second gate, the temperature can be measured with the precision of $1/10,000$.

Therefore, according to the above described technology, the surface temperature of the AOTF can be measured with high precision. As a result, the transmittance characteristic can be controlled with high precision if the frequency of the RF signal is adjusted based on the measured resonant frequency.

The change of the selected wavelength with the change of the temperature of the AOTF is compensated for by changing the frequency of the RF signal as described above. It is also possible to control the selected wavelength by controlling the temperature of the AOTF. In this case, the Peltier element is arranged near the surface of the AOTF and is changed in temperature so that the selected wavelength can be controlled. In this case, unlike the control using the RF signal, the wavelength can be shifted by sliding all selected wavelengths. Therefore, the technology is effective when the entire selected wavelength is displaced due to the aging deterioration.

FIGS. 27A, 27B, 28A, and 28B show the fluctuation of the selection characteristic of the AOTF and the countermeasure against the fluctuation.

In FIGS. 27A, 27B, 28A, and 28B, the selected wavelength of the AOTF is set to 4, and the SAWs having the same frequency component are generated at each stage of the 3-stage AOTF for wavelength selection. Since the SAW generated in the AOTF is not an ideal sine wave, it generates a fluctuation. Therefore, a side lobe occurs in the frequency component which generates a cross talk of the selected wavelength. When the wavelengths selected by the AOTF are positioned away from each other, the side lobe is very small, and the generated cross talk is ignorable. However, when the wavelengths are close to each other, the power of an output optical signal generates a beat through a cross talk. Furthermore, the SAW of the AOTF is not a standing wave, but is transmitted as a progressive wave through the AOTF. Therefore, an optical signal generates a wave shift by the Doppler effect. According to the present embodiment, the phase of the RF signal applied to the AOTF is controlled to eliminate the beat, etc.

Figures 27A, 27B:
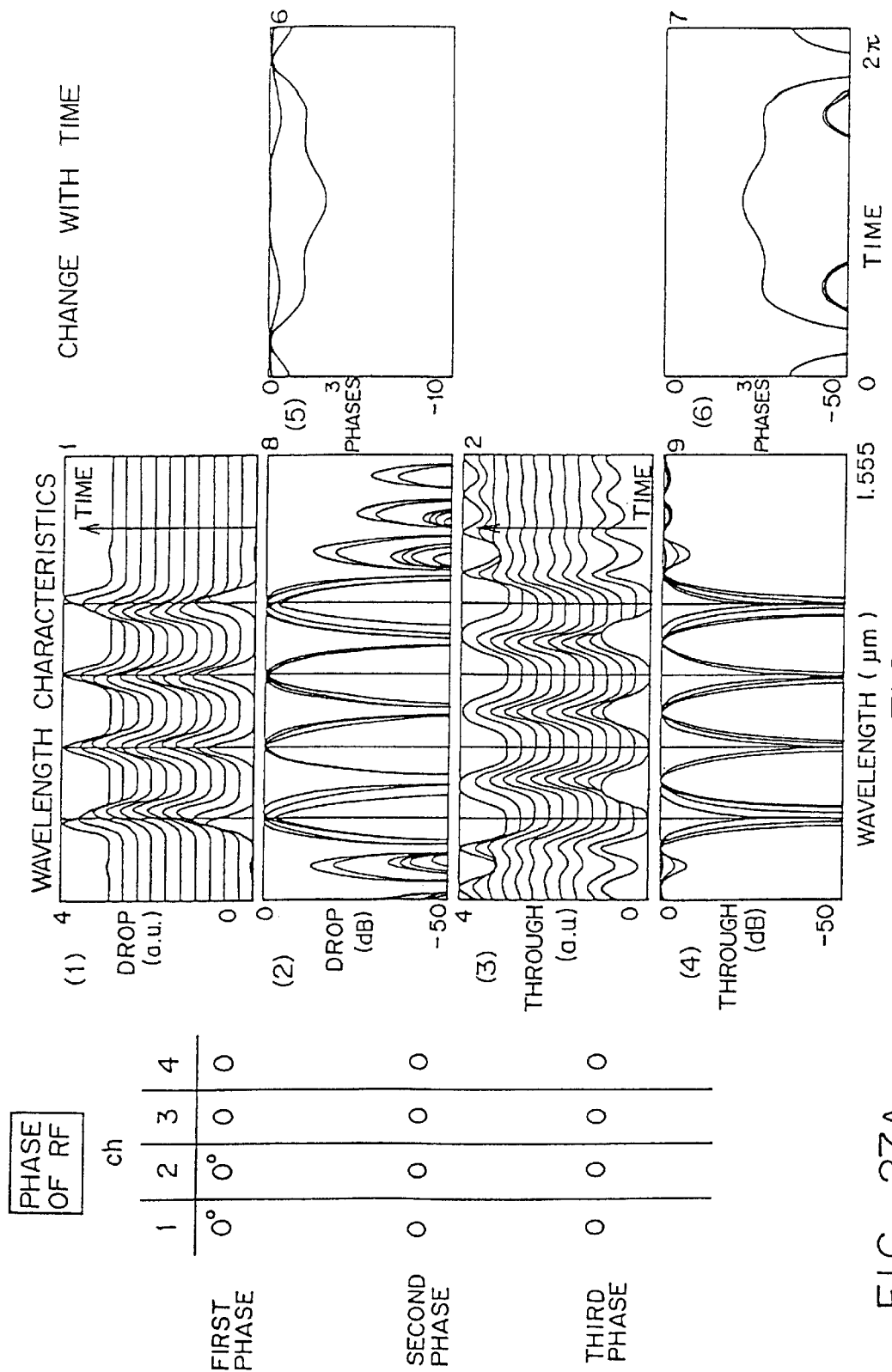
FIGS. 27A and 27B are charts (1) showing the fluctuation of the selection characteristic of the 3-stage AOTF and the countermeasure against the fluctuation.

FIGS. 27A and 27B show the case in which there is no phase difference about the SAW generated at each stage of the 3-stage AOTF. FIG. 27A shows that the SAWs generated to select the four channels have phase differences of 0° to each other.

FIG. 27B(1) shows how the selected wavelength characteristics of the AOTF change with time, and the vertical axis of the wavelength characteristics indicates a linear scale. FIG. 27B(2) shows the vertical axis in FIG. 27B(l) in decibels. The horizontal axis indicates wavelength. FIGS. 27B(3) and 27B(4) show the wavelength selection characteristics on the through port side in linear and decibel scales.

As clearly shown in FIGS. 27B(1) through 27B(4), the wavelength selection characteristic generates a fluctuation with time. The fluctuation generates the fluctuation of the power of the optical signal having a selected wavelength when an optical signal having a corresponding wavelength is being dropped. FIG. 27B(5) shows the state of the fluctuation of the selected wavelength generated with time. FIG. 27B(6) shows the leakage of the dropped optical wavelength on the through port to the through terminal.

As shown in FIG. 27B, when an SAW is generated for wavelength selection in the 3-stage AOTF, the power of a selected wavelength generates a fluctuation. If the fluctuation grows, the data of the intensity-modulated optical signal cannot be normally received at the receiving terminal.

Figures 28A, 28B:
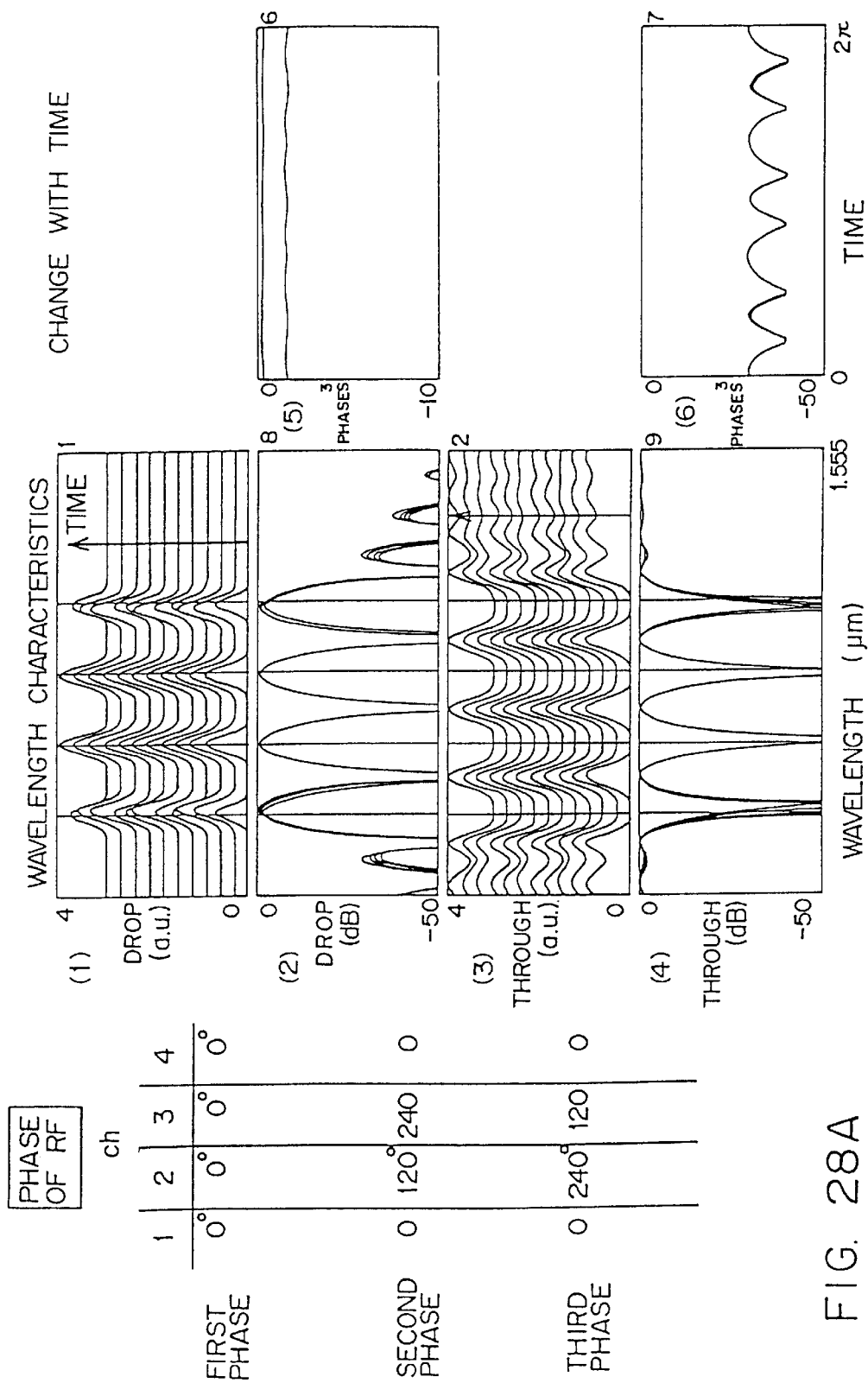
FIGS. 28A and 28B are charts (2) showing the fluctuation of the selection characteristic of the 3-stage AOTF and the countermeasure against the fluctuation.

FIGS. 28A and 28B show the method of preventing the fluctuation of the selection characteristics of the AOTF.

As shown in FIG. 28A, when four channels are selected in the 3-stage AOTF, the phase of the SAW for selection of each channel is cyclically changed. FIG. 28B shows the wavelength selection characteristic when the SAW is phase-controlled. As shown in FIGS. 28B(1) through 28B(4), the fluctuation of the wavelength selection characteristic with time is suppressed. As in FIGS. 27A and 27B, FIGS. 27B(1) and 27B(3) shows the wavelength selection characteristic with the vertical axis indicating the linear scale. FIGS. 27B(2) and 27B(4) show the overwritten changes with time using the vertical axis as representing the wavelength selection characteristics in decibel scale.

FIG. 28B(5) shows the change in power level of the selected wavelength output to the drop port. FIG. 28B(5) shows that the fluctuation of the power is suppressed as clearly indicated when it is compared with FIG. 27B(5). The power level shows a slight decay from 0 decibels. This indicates a loss generated by suppressing the level change of the optical signal output to the drop port by the phase control. FIG. 28B(6) shows the leakage of the optical signal having the selected wavelength at the through port.

Thus, when the SAW is applied to the AOTF, the beat arising in the power of a dropped optical signal can be suppressed by controlling the phase of the SAW generated at each stage of the 3-stage AOTF. Additionally, a large amount of light leakage can be prevented at the through port, thereby improving the wavelength selection characteristic.

As described above, the wavelength selection characteristic of the AOTF can be simple not only by designing a 3-stage AOTF, but also changing the phase of the SAW generated at each stage by controlling the phase of the RF signal. Therefore, an intensity-modified optical signal can be correctly received by suppressing the beat generated when the wavelength is selected by the AOTF.

Figure 29:
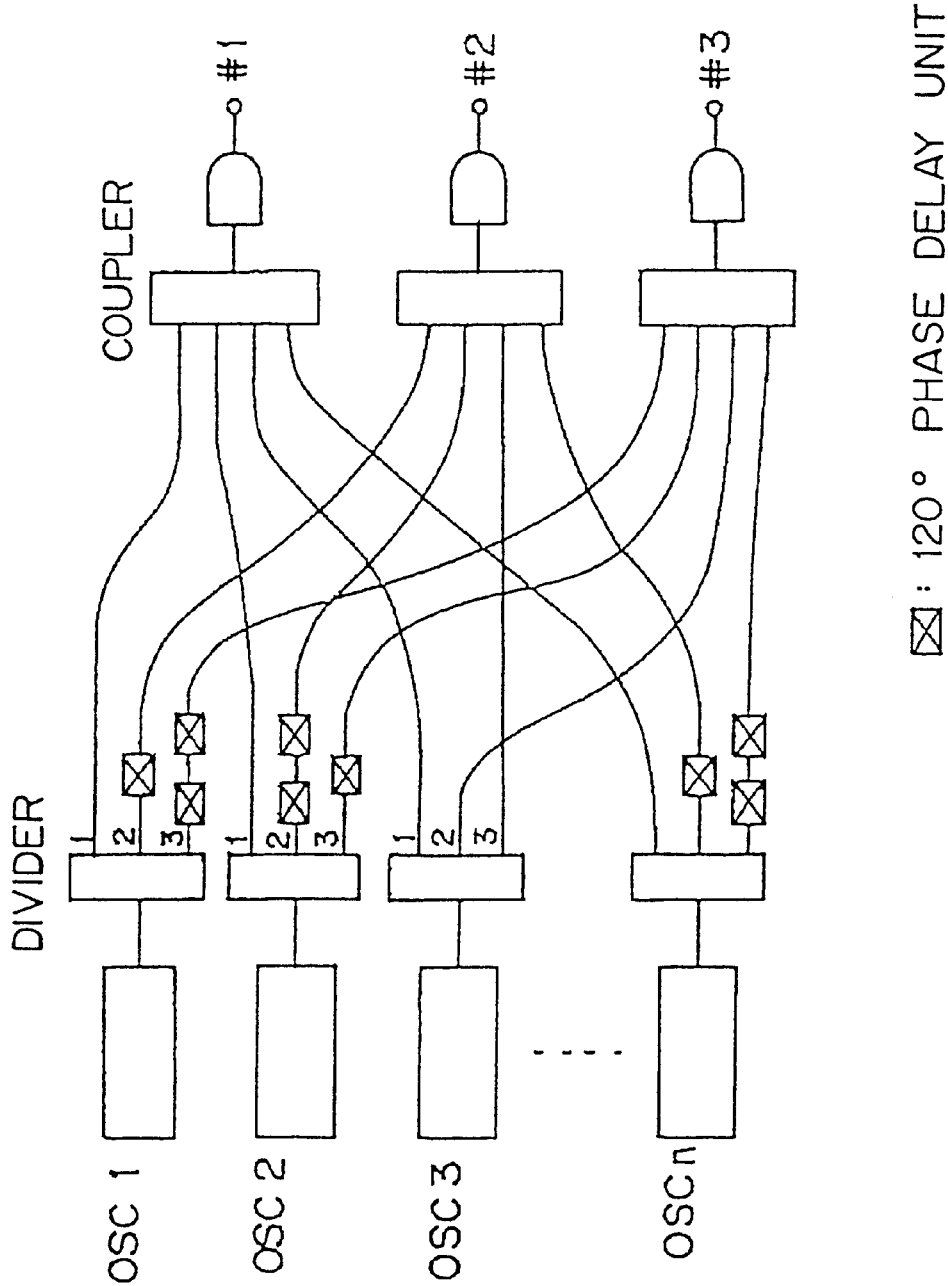
FIG. 29 shows the first example of the general configuration of an AOTF drive circuit.

FIG. 29 shows the first example of the general configuration of the AOFT drive circuit.

When an AOTF drive circuit is designed, the required number of oscillators of a fixed oscillation frequency corresponding to the oscillation frequency of an RF signal are provided. The oscillated RF signal is appropriately selected and applied to the AOTF in order to drive the AOTF 1. This is a method of designing a drive circuit.

In FIG. 29, an oscillator OSC 1 is provided for a channel 1, an oscillator OSC 2 is provided for a channel 2, and an oscillator OSC 3 is provided for a channel 3. Thus, oscillators OSC 1 through n are provided for all channels used in the wavelength division-multiplexing system.

These oscillators OSC 1 through n are fixed frequency oscillators. The signals oscillated by these oscillators are divided into three portions by a divider (the AOTF is a 3-stage device, and in an AOTF, there are three IDTs to which an RF signal is applied). One of them is input to a coupler without a phase delay. Another is provided with a phase delay unit for delaying the phase of an RF signal. In FIG. 29, the phase delay by one phase delay unit is 120°.

The RF signal from the oscillator OSC 1 is branched by the divider. The RF signal output from the port 1 is transmitted to the coupler without a phase delay, and provided for the AOTF #1 at the first stage. The RF signal output from the port 2 is phase-delayed by 120°, input to the coupler, and then applied to the AOTF #2 at the second stage. The RF signal output from the port 3 is twice delayed by 120°, that is, phase-delayed by 240°, then input to the coupler, and applied to the AOTF #3 at the third stage.

Similarly, the RF signal output from the oscillator OSC 2 for selecting the channel 2 is divided by the divider. The signal output from the port 1 is input to the coupler without any phase delay, and then applied to the AOTF #1. The RF signal output from the port 2 is phase-delayed by 240°, input to the coupler, and applied to the AOTF #2.

The RF signal from the oscillator OSC 3 for the channel 3 is branched by the divider, and then applied to the AOTFs #1 through #3 at the first through the third stages without phase delay on any of the signals at the ports 1 through 3.

Similarly, the phase delay is repeatedly performed on the oscillators OSC 1 through 3, the oscillators OSC 1 through n are connected to the coupler, and then the RF signal is applied to each of the AOTFs #1 through #3 at the first through the third stages.

The phase delay unit can have a longer cable, can be provided with a transducer to change the position from which a signal is retrieved, or can be provided with a delay line. However, when a transducer is used, the impedance depends on the position from which a signal is retrieved. Therefore, it is not a recommendable method. Furthermore, the delay line can deteriorate the wavelength of the RF signal. As a result, according to the present embodiment, a phase delay is realized using a longer cable. When a cable is applied, it only has to be 35 cm longer to delay the signal by 120° when the RF signal is 170 MHz, and 70 cm longer to delay the signal by 240°. Any other methods can be adopted after solving the respective problems.

Figure 30:
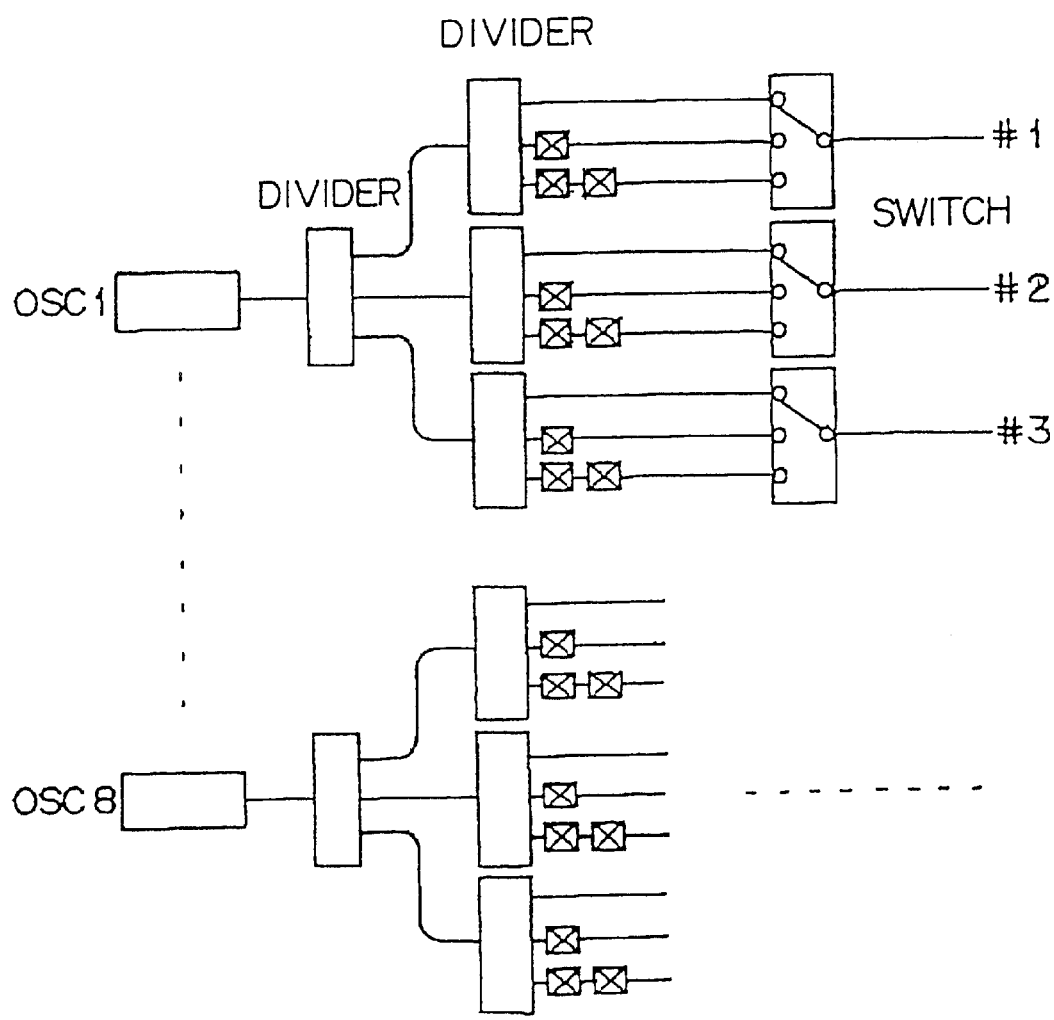
FIG. 30 shows the second example of the general configuration of an AOTF drive circuit.

FIG. 30 shows the second example of the general configuration of the drive circuit of the AOTF.

In FIG. 29, an oscillator is provided for each channel so that any wavelength of an optical signal can be dropped. Therefore, if an oscillator has a wavelength not corresponding to the wavelength of a dropped optical signal, it is not used. Thus, this configuration includes wasteful oscillators.

Since the oscillator of an electric signal is normally designed to change the oscillation frequency, an oscillator can be provided for each wavelength to be dropped, and the oscillation frequency of the oscillator can be changed when the wavelength of the optical signal to be dropped is changed. FIG. 30 shows the general configuration of such an application.

Assume that, in this example, the number of wavelengths of the optical signal to be dropped is eight, In this case, only the oscillators OSC 1 through 8 are provided. The RF signal output from each of the oscillators OSC 1 through 8 is divided into three portions to be applied to one of the AOTFs at three stages. The 3-branched RF signal is further branched into three portions by the subsequent divider. Thus, the RF signal divided into three portions by the subsequent divider are processed as a no-phase-delay signal, a 120° delayed signal, and a 240° delayed signal, and then input to a switch. The switch selects a phase to be applied by the oscillator OSC 1 to each stage of the AOTFs #1 through #3 based on the number of wavelengths to be selected by the AOTF, etc.

FIG. 30 shows only the configuration for the oscillator OSC 1. The configuration of any of the oscillators OSC 2 through 8 is all the same. By thus designing the configuration, the RF signal oscillated by each of the oscillators OSC 1 through 8 can be applied to the AOTFs #1 through #3 at each stage. Therefore, even when the oscillation frequency is changed, an appropriately phase-controlled RF signal can be applied to the AOTF, thereby smoothing the beat in the power of the optical signal having a selected wavelength.

In the description above, the phase delay is set in 120° units, but the most recommendable phase delay should be set, and is not limited to 120°.

Figure 31A:
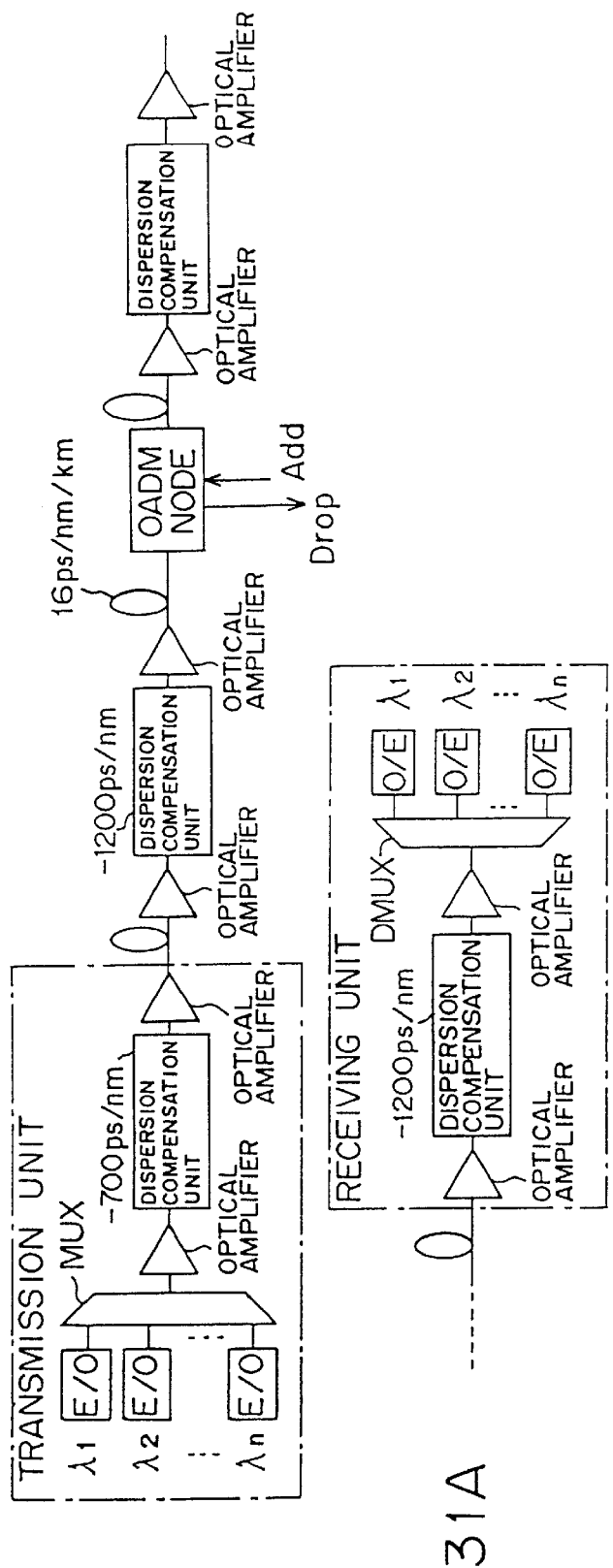
FIGS. 31A and 31B show the design of the OADM system containing the OADM device.
Figure 31B:
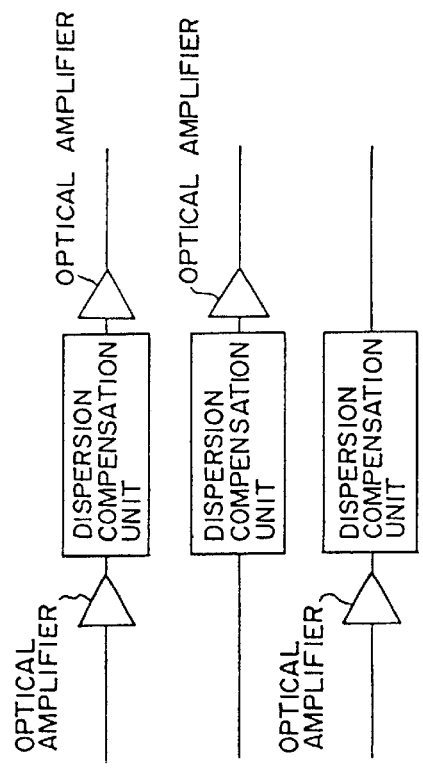

FIGS. 31A and 31B show the design of the OADM system including an OADM device.

An optical amplifier applied for the WDM transmission system can be an erbium-doped fiber amplifier (EDFA) which has been put for practical use and has a broad gain band on the 1.5 $\mu$m band. However, when a 1.5 $\mu$m band signal is transmitted at a high speed through an existing 1.3 $\mu$m band zero-dispersion single mode fiber (SMF) transmission line, which is the most popular in the world, or when a non-zero-dispersion shifted fiber (NZ-DSF) transmission line is used in an available wavelength band, the transmission waveform is distorted by the interaction between the wavelength dispersion characteristic of the transmission line or the dispersion characteristic and the nonlinear effect generated on the optical fiber. The nonlinear effect causing the waveform deterioration by the interaction with the dispersion characteristic in the WDM transmission system can be: the self-phase-modulation effect (SPM) which is generated even if there is only one transmission wavelength; and the cross phase modulation effect (XPM) generated when there are multiple wavelengths. Both SPM and XPM invite a wavelength chirping to a transmission optical signal.

The influence from the dispersion characteristic of the optical fiber is a serious factor which limits the transmission speed and the transmission distance. Therefore, the influence should be suppressed by any means.

A suppressing method can be realized by inserting a dispersion compensator of which the dispersion is the inverse of the dispersion generated in a transmission line, into the transmission line to reduce the dispersion in the entire transmission line. The dispersion compensator can be designed using a fiber grating, an optical interferometer, an optical fiber having the dispersion characteristic opposite to the characteristic of the transmission line, etc. Further methods can be realized by applying a pre-chirping at a transmitting unit (intentionally applying an optical phase or optical frequency modulation to suppress the expansion by the wavelength dispersion in addition to the optical intensity modulation component of a base band signal), and by combining the pre-chirping and the above described dispersion compensator.

In an actual system, there arises a fluctuation in the dispersion value of the transmission line, the nonlinear factor, the power of input light having each wavelength in the transmission line which greatly affects the efficiency of the nonlinear effect. Even if the fluctuation arises, it is necessary not to affect the transmission characteristic. In the light wave network, since each wavelength is branched and inserted in an optional node, the transmission route depends on each wavelength. In this case, the transmission quality has to be maintained.

Therefore, according to the present embodiment, the pre-chirping and the dispersion compensator are combined to solve the problems by optimizing the insertion position of the dispersion compensator, the amount of dispersion compensation, and the amount of the pre-chirping ($\alpha$ parameter) in the transmitting unit.

Described below are practical examples.

As shown in FIG. 31A, the OADM system connects a transmitting unit and a receiving unit through a transmission line, and an optical amplifier, a dispersion compensation unit, and an OADM node are connected to the transmission line. The transmitting unit is provided with an E/O device for converting each electric signal into an optical signal having the wavelengths of $\lambda 1$ through $\lambda n$. The optical signal generated by the above described units is transmitted after being wavelength-multiplexed by the multiplexer MUX. The wavelength-multiplexed optical signal is amplified by an optical amplifier. The dispersion compensating unit compensates for the dispersion, and the resultant signal is amplified again by the optical amplifier, and then transmitted through the transmission line. Assuming that, with the amount of dispersion through the transmission line of 16 ps/nm/km for 80 km (the transmission line between nodes, for example, between optical amplifiers or between OADM devices is referred to as a 'span') using 4 spans (three nodes between the transmitting station and the receiving station. In the case shown in FIG. 31A, two combinations of two optical amplifiers and a dispersion compensation unit as nodes, and one OADM node are inserted), the amount of the dispersion compensation unit of the transmitting unit is, for example, −700 ps/nm. The amount of dispersion compensation of the dispersion compensation unit as a node inserted in the transmission line is, for example, −1200 ps/nm. The receiving unit comprises a dispersion compensation unit between the optical amplifiers; a demultiplexer DMUX for wavelength-demultiplexing a wavelength-multiplexed optical signal; and an O/E device for converting an optical signal having a demultiplexed wavelength into an electric signal. In this example, the compensation amount of the dispersion compensation unit of the receiving unit is, for example, −1200 ps/nm. At this time, the tolerance of the receiving unit is ±200 ps/nm.

Thus, when the amount of dispersion of each dispersion compensation unit is set, appropriate dispersion compensation can be performed in the wavelength division-multiplexing system for transmission of 80 km through 4 spans.

FIG. 31B shows an example of a variation of the combination of the dispersion compensation unit with an optical amplifier.

The first example shown in FIG. 31B is the configuration in which the dispersion compensation unit normally indicates a nonlinear effect with a large loss. First, a first-stage optical amplifier for amplifying the level of the optical signal up to a predetermined level is provided to compensate for the loss of the dispersion compensation unit, and to prevent the nonlinear effect in the dispersion compensation unit. The optical signal amplified up to the predetermined level is input to the dispersion compensation unit and the dispersion is compensated for. The optical signal output from the dispersion compensation unit is transmitted, for example, 80 km, and amplified up to a required level to transmit the optical signal to the next optical repeater.

The second example shown in FIG. 31B is the configuration for use when the loss of the dispersion compensation unit is small.

The transmitted optical signal, not amplified, is input to the dispersion compensation unit, and amplified by the optical amplifier after the dispersion is compensated. In this case, the loss of the dispersion compensation unit is small. Therefore, since the level of the optical signal, which has passed through the dispersion compensation unit, is not small enough, the resultant SN ratio is not too bad after the optical signal is amplified later by the optical amplifier.

The third example shown in FIG. 31B is the configuration in which the dispersion compensation unit indicates a small nonlinear effect as using a fiber grating.

In this case, an optical signal is first amplified by an optical amplifier, and is then input to a dispersion compensation unit. The optical amplifier makes the optical signal having a large power. However, since the dispersion compensation unit indicates a small nonlinear effect, there is the smallest possibility that the nonlinear effect may invite the waveform deterioration. Therefore, an optical amplifier can be provided at the first stage. Since the optical amplifier first amplifies the optical signal with a large loss of the dispersion compensation unit, an acceptable SN ratio can be maintained after the optical signal has passed through the dispersion compensator.

A dispersion compensation unit normally includes a dispersion compensation fiber. However, the dispersion compensation fiber generates a large loss, and indicates a nonlinear effect when the level of the input optical signal is higher than a predetermined value. Therefore, before the optical signal is input, it should be amplified to a level lower than a predetermined value so that the optical power can be enlarged to transmit the optical signal after the dispersion compensation. Therefore, when the dispersion compensation fiber is used as a dispersion compensation unit, the first configuration shown in FIG. 31B is recommended.

Figure 32A:
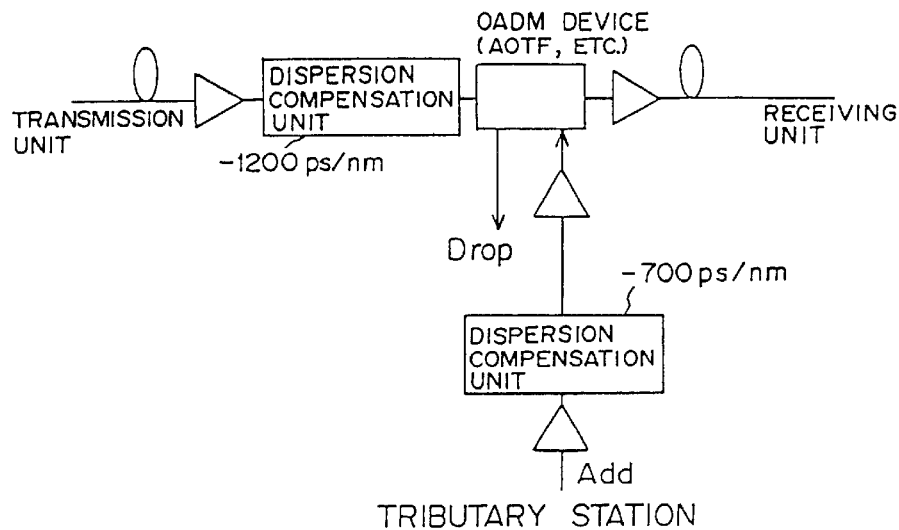
FIGS. 32A and 32B show the configuration for dispersion compensation at the OADM device.
Figure 32B:
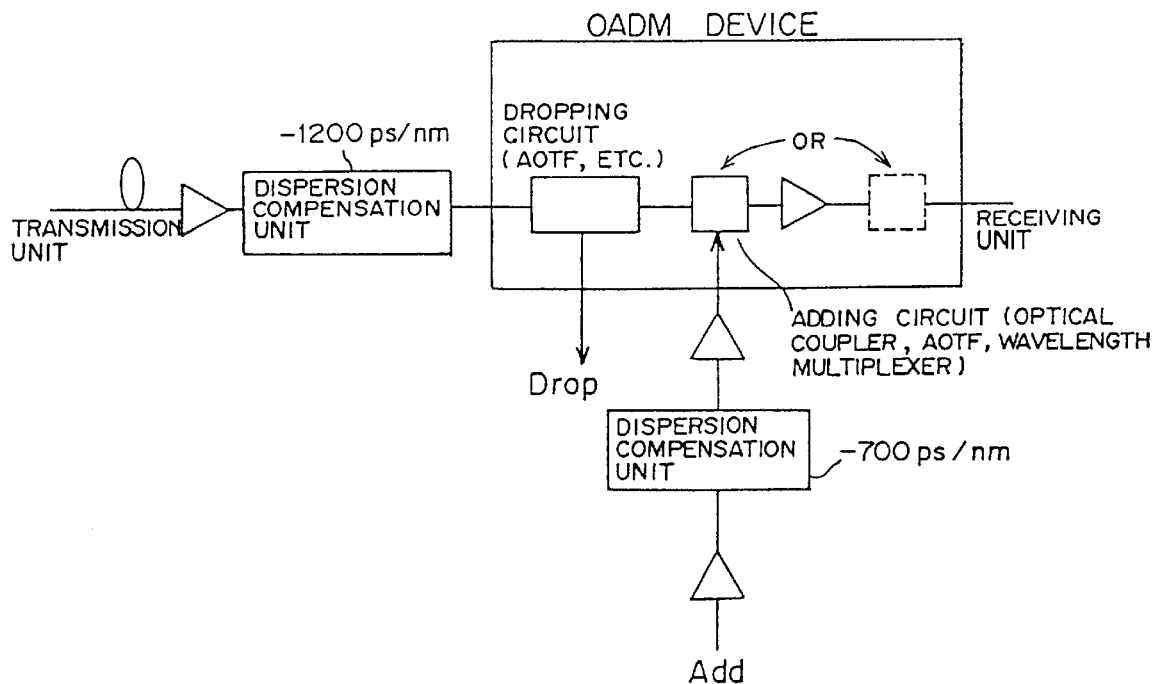

FIGS. 32A and 32B show the configuration of the dispersion compensator in the OADM device.

In the OADM device, a dispersion compensator is provided such that the dispersion compensation can be performed in the same way as for an optical signal transmitted from the transmitting unit to the receiving unit, and it can then be transmitted to the tributary station. On the other hand, an optical signal to be added and transmitted from the tributary station to the receiving unit through the OADM device is effected by the dispersion compensation in the same way as the optical signal transmitted from the transmitting unit shown in FIG. 31A to the receiving unit which receives it is effected.

In FIG. 32A, the optical signal transmitted from the transmitting terminal is dispersion-compensated by the dispersion compensation unit having the same amount of compensation of −1200 ps/nm as the dispersion compensation unit provided in the transmission line shown in FIG. 30, and is then input to the OADM device. A through optical signal is transmitted as is as if there were no OADM device. On the other hand, an optical signal to be dropped also receives the dispersion compensation of −1200 ps/nm, and then it is dropped and transmitted to the tributary station. Therefore, when it is received by the tributary station, it receives the same dispersion compensation as the optical signal which is received after being passed from the transmitting unit shown in FIG. 31A through to the receiving unit. On the other hand, for an optical signal to be added, a dispersion compensation unit corresponding to the dispersion compensation unit having the amount of compensation of −700 ps/nm provided in the transmitter in FIG. 31A is mounted on the add port side. Therefore, the optical signal transmitted as is from the tributary station is added in the OADM device after receiving the dispersion compensation corresponding to the compensation received from the transmitting unit shown in FIG. 31A by the dispersion compensation unit on the add port side. After the addition, it is compensated for dispersion as other optical signals. Therefore, the optical signal added by the tributary station receives the same dispersion compensation as the optical signal passed through from the transmitting unit to the receiving unit shown in FIG. 31A when it is transmitted to the receiving unit.

Thus, dispersion compensation units are incorporated into the network such that the optical signal passing through the OADM device, and the optical signal to be added and dropped can be compensated for dispersion in the same manner while they are transmitted to respective terminal stations.

FIG. 32B shows another configuration of the OADM device.

The OADM device comprises a branch circuit such as an AOTF, etc. for dropping an optical signal; and an insertion circuit such as an optical coupler, an AOTF, wavelength multiplexer, etc. As described above by referring to FIG. 32B, an optical signal to be added and dropped is compensated for dispersion as an optical signal passing through from the transmitting unit to the receiving unit. Therefore, the dispersion compensation unit having the amount of compensation of −1200 ps/nm is provided before the OADM device, and the dispersion compensation unit having the amount of compensation of −700 ps/nm is provided on the adding terminal. The configuration shown in FIG. 32B includes an AOTF exclusively for dropping signals, and an adding operation is performed by an optical coupler, thus practically corresponding to the OADM device shown in FIGS. 6 through 13.

FIGS. 33A through 34B show examples of the configuration of the dispersion compensation unit provided on the adding and dropping terminals of the transmitting unit, the receiving unit, and the OADM device. It is recommended that the amount of compensation can be adjusted in the process performed for recovery from the deterioration with time and damage at the adding and dropping terminals of the transmitting unit, the receiving unit, and the OADM device. Therefore, it is requested that the dispersion compensation unit can be designed to change the amount of compensation.

Figures 33A, 33B:
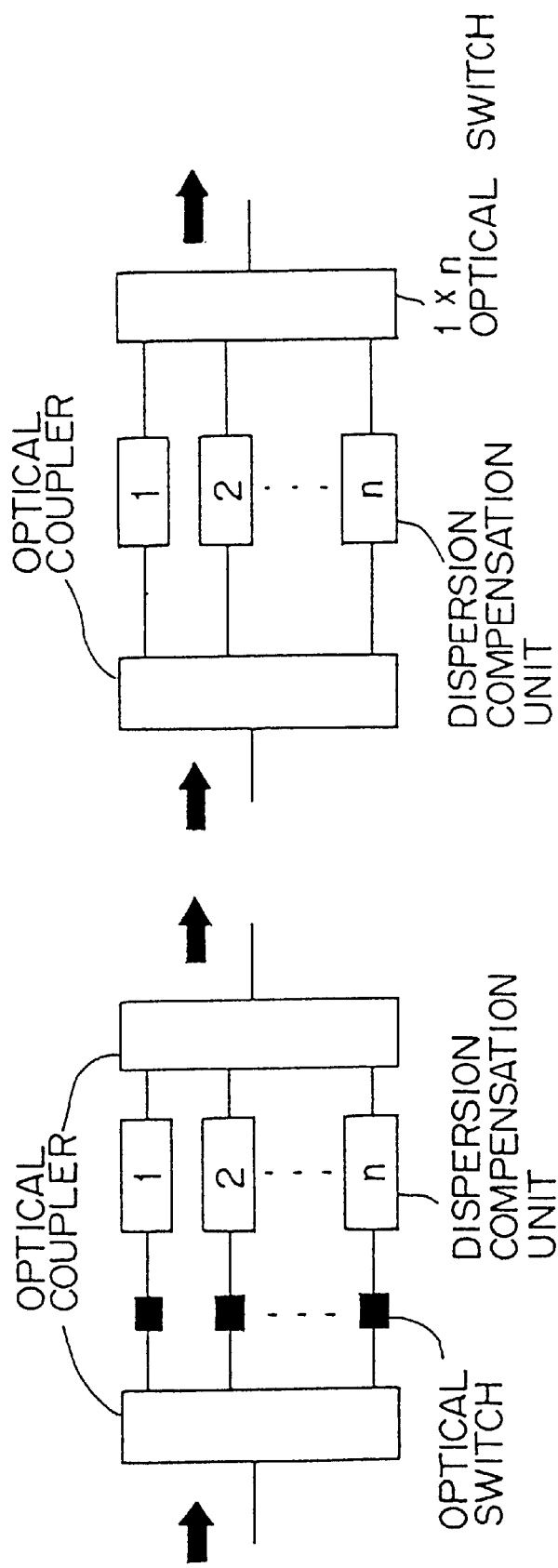
FIGS. 33A and 33B show examples (1) of dispersion compensation units provided at the adding and dropping terminals of an OADM device, a transmitting unit and a receiving unit.

FIG. 33A shows the configuration in which dispersion compensation units 1 through n having different amounts of compensation are provided to equally branch input optical signals using an optical coupler, an optical switch is provided for each dispersion compensation unit so that any of the dispersion compensation units can be selected. Therefore, an optical signal can be output through any of the dispersion compensation units having different amounts of compensation 1 through n. Thus, the change in transmission characteristic of the transmission line can be accepted by selecting an optimum dispersion compensation unit.

FIG. 33B shows the configuration in which a dispersion compensation unit having different amounts of compensation 1 through n is provided, and an 1×n switch is provided on the output side. With this configuration, there is no need to provide an optical switch for each of the dispersion compensation units 1 through n. The input optical signal is branched by an optical coupler, and equally input to all dispersion compensation units for dispersion compensation. In this case, the optimally dispersion-compensated optical signal is selected and output using a 1×n optical switch.

FIG. 34A shows the configuration in which a 1×n optical switch is provided at the input terminal, and an optical signal is input to any one of the dispersion compensation units 1 through n which can optimally compensate for dispersion. An optical signal is assigned an optical path selected by the 1×n optical switch, passes through a corresponding dispersion compensation unit, and is output through the optical coupler.

FIG. 34B shows an example of the configuration of the 1×n optical switch in place of an optical coupler.

The optical path of the input optical signal is determined by the 1×n switch, and the optical signal is input to one of the dispersion compensation units 1 through n. The 1×n switch at the output terminal switches optical paths such that an optical signal from the dispersion compensation unit to which the optical signal has been input can pass through the optical paths, and then the optical signal is output.

The configuration shown in FIGS. 34A and 34B can reduce the decrease of the power of an optical signal when compared with the configuration shown in FIGS. 33A and 33B. That is, in FIGS. 33A and 33B, an input signal is equally divided regardless of whether or not it is input to the dispersion compensation unit. Therefore, the power is reduced by the division. However, with the configuration shown in FIGS. 34A and 34B, the 1×n switch transmits all power of the input signal to one of the dispersion compensation units 1 through n. Therefore, there is no possibility that the power of an optical signal is divided and transmitted to an actually unused optical path.

FIGS. 35 through 38 show examples of variations of the configuration for dispersion compensation.

Figure 35:
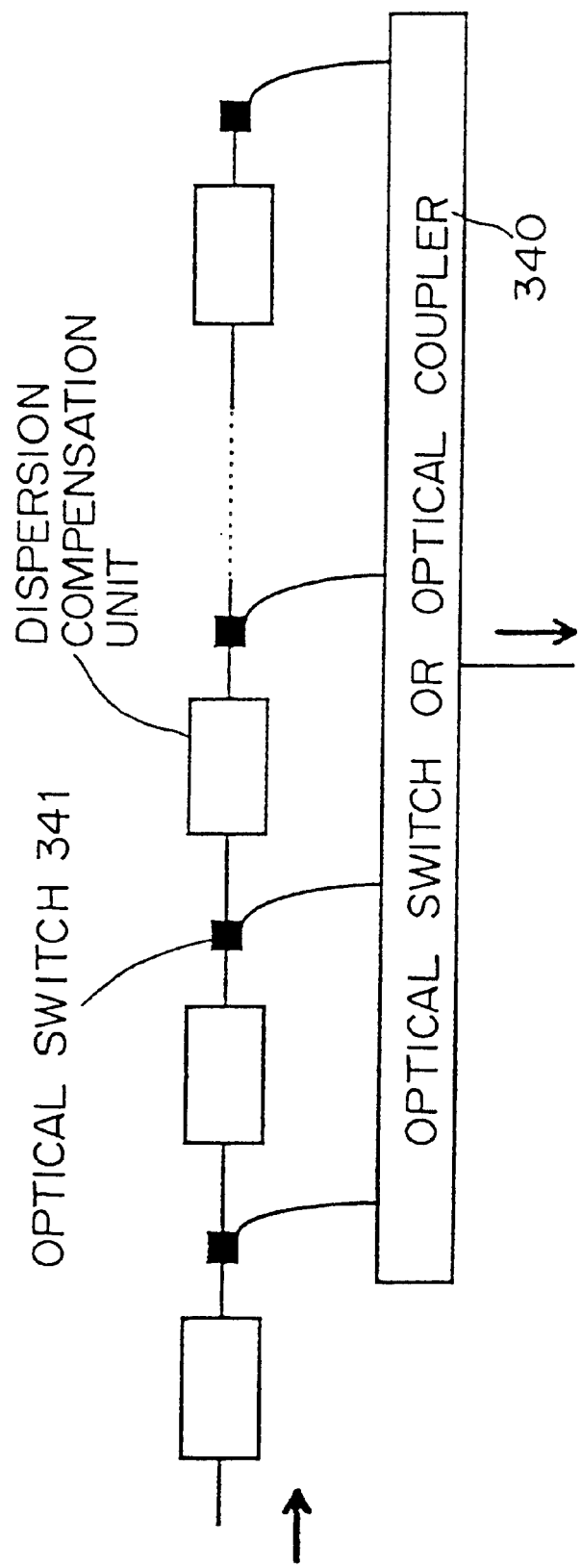
FIG. 35 shows an example (1) of a variation in the configuration for dispersion compensation.

FIG. 35 shows an example of using an optical switch or optical coupler 340. With the configuration, dispersion compensation units such as dispersion compensation fibers, etc. having the same or different amounts of compensation are serially connected, and the dispersion compensation of an optical signal can be optimized by passing the optical signal through a selected number of dispersion compensation units. Although the input optical signal passes through the dispersion compensation unit, the optical path is changed by an optical switch 341 provided after each dispersion compensation unit. Then, the optical signal is transmitted to the optical switch or optical coupler 340 and output. The number of dispersion compensation units through which the optical signal passes depends on which switch changes the optical path, thereby changing the amount of dispersion to be compensated for.

Figure 36:
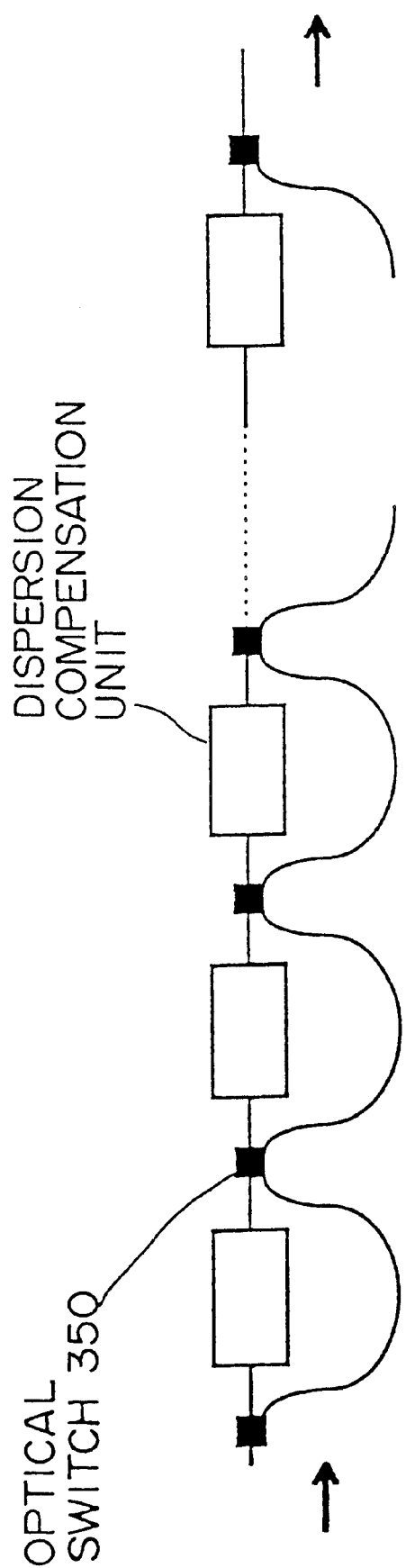
FIG. 36 shows an example (2) of a variation in the configuration for dispersion compensation.

FIG. 36 shows the configuration for changing the number and type of dispersion compensation units through which optical signals pass through. An input optical signal is switched by an optical switch 350 between whether the dispersion compensation unit passes through or bypasses the next dispersion compensation unit. The optical switch 350 is provided before each of the serially connected dispersion compensation units, and determines whether or not the optical signal passes through the dispersion compensation unit provided after each optical switch. With the configuration shown in FIG. 36, a bypass is formed. Consequently, there is no need of passing through the dispersion compensation unit at the first stage when the optical signal passes through the dispersion compensation unit at the second stage. As a result, the amount of dispersion compensation made by the dispersion compensation unit can be optionally set.

Figure 37:
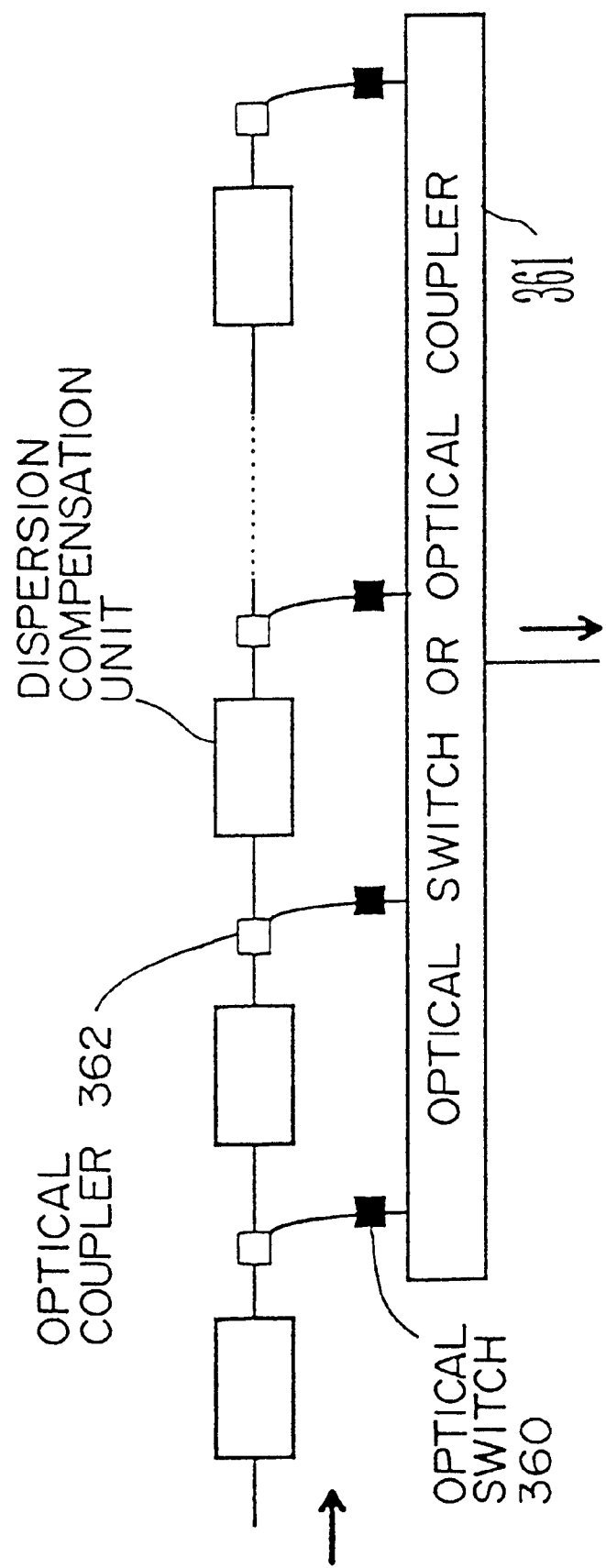
FIG. 37 shows an example (3) of a variation in the configuration for dispersion compensation.

FIG. 37 shows an example of a variation of the configuration shown in FIG. 35. An optical coupler 362 is provided after each of the dispersion compensation units so that an optical signal can be branched. With this configuration, all signals dispersion-compensated by all types of possible amounts of dispersion compensation in the configuration, are transmitted to the respective optical switch 360. When one of the optical switches 360 is open, the optimally dispersion-compensated optical signal can be transmitted to an optical switch or optical coupler 361. Thus, the selected optimally dispersion-compensated optical signal can be transmitted from the optical switch or optical coupler 361. However, with this configuration, the optical signal is branched by the optical coupler 362 regardless of whether or not the optical signal is transmitted to the optical switch or optical coupler 361. As a result, the power of the optical signal becomes smaller as the signal is transmitted to the dispersion compensation unit at the later stage.

Figure 38:
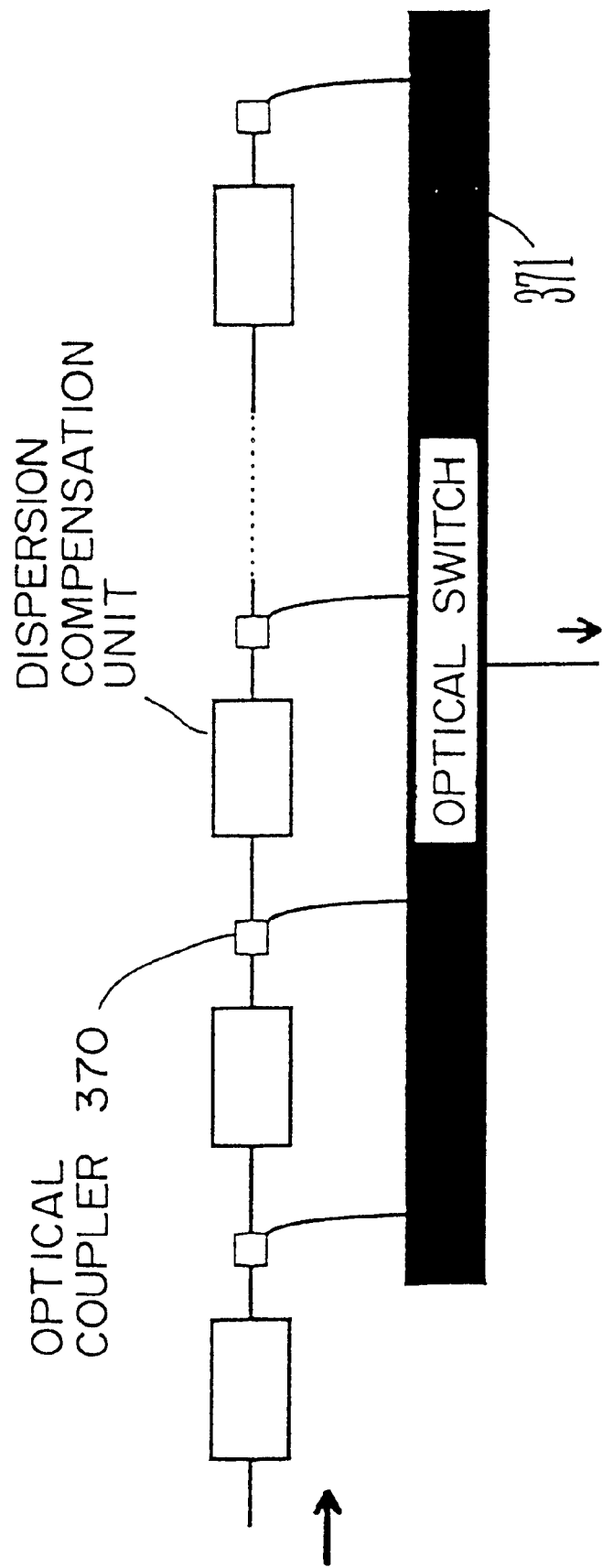
FIG. 38 shows an example (4) of a variation in the configuration for dispersion compensation.

FIG. 38 shows an example of a variation of the configuration shown in FIG. 37. An optical coupler 370 is provided after each of the dispersion compensation units, and the optical signal dispersion-compensated by each of the dispersion compensation units is input to an optical switch 371. The optical switch selects the optimally dispersion-compensated optical signal from among the optical signals processed in various dispersion compensating operations. In this case, the optical signal becomes smaller in power by being branched by the optical coupler 370 at the subsequent stage while the optical signal sequentially passes through dispersion compensation units.

Figure 39:
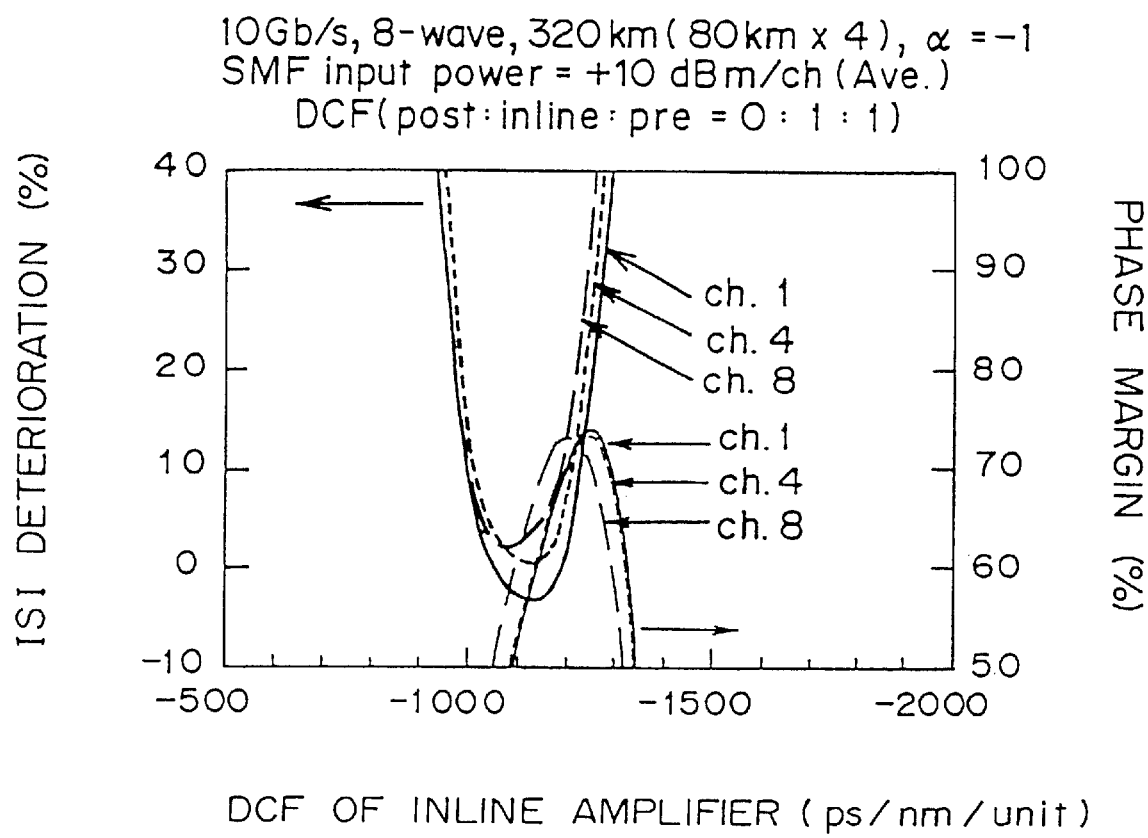
FIG. 39 is a graph (1) showing the dispersion compensation and the waveform deterioration characteristic.
Figure 40:
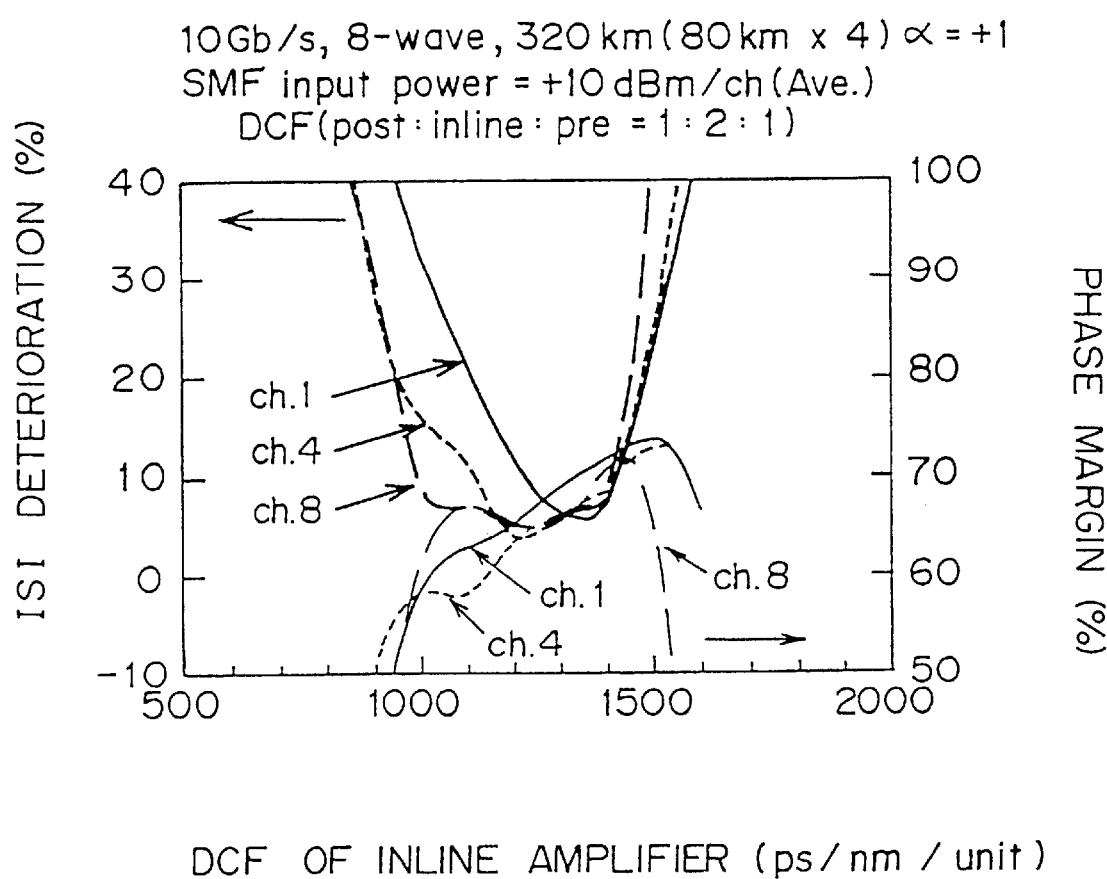
FIG. 40 is a graph (2) showing the dispersion compensation and the waveform deterioration characteristic.

FIGS. 39 and 40 show the dispersion compensation and the waveform deterioration characteristics.

FIG. 39 shows the waveform deterioration when an optical signal is transmitted 80 km through 4 spans when it is an 8-wave-lengths multiplexed signal at 10 Gbps. The power of the light input to the transmission line (single mode fiber: SMF) is an average of +10 dBm per channel. A pre-chirping is performed with α parameter=−1 on the transmission station side. The transmitting station does not use a dispersion compensation fiber, but a repeater and a receiving station perform dispersion-compensation using a dispersion compensation fiber having the same amount of dispersion compensation.

An ISI deterioration refers to the amount of deterioration by the inter-symbol interference, and indicates the deterioration of a signal in the amplification direction. It is recommendable that the ISI deterioration is close to 0%. The phase margin indicates the amount of deterioration of a signal in the phase direction such as the amount of displacement in the time direction of the ON/OFF pattern of an optical signal. It is recommendable that the phase margin is close to 100%.

Assume that the tolerance for the amount of deterioration of an optical signal is 10% in ISI deterioration and 70% in phase margin. In FIG. 39, the width of the portion projecting downward at the ISI deterioration of 10% ranges from about 1000 through 1200 ps/nm/unit for each channel. On the other hand, the width of the portion projecting upward at the phase margin of 70% ranges about 1150 through 1300 ps/nm/unit for each channel.

The overlapping portions of the above described projections refer to the tolerance of the amount of dispersion compensation. A wider tolerance width is desired, but FIG. 39 shows a very narrow width.

FIG. 40 shows the same amount of dispersion compensation for the transmitting station and the receiving station. The repeater has double the amount of dispersion compensation of the transmitting station and the receiving station. The transmitting station performs a pre-chirping on the α parameter=+1.

In FIG. 40, the width of the tolerance cannot be easily recognized. However, on the transmitting side, the dispersion compensation is performed and the a parameter makes a positive pre-chirping, thereby extending the dispersion tolerance.

FIG. 40 shows an easier graph.

Figures 41A, 41B:
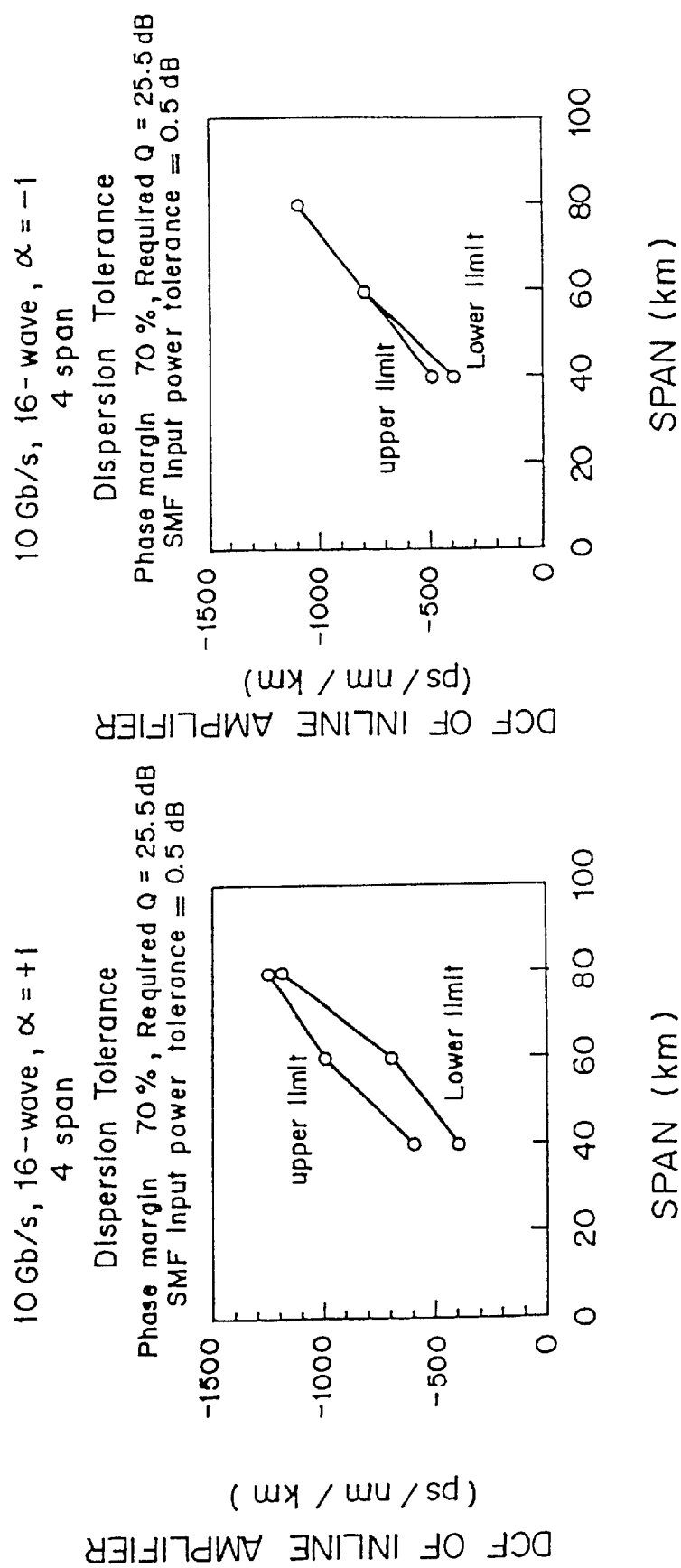
FIGS. 41A and 41B show dispersion tolerance when the phase margin is 70% or more.

FIGS. 41A and 41B show the dispersion tolerance when the phase margin is equal to or higher than 70%.

FIG. 41A shows the pre-chirping with α parameter=+1 on the transmitting side. FIG. 41B shows the pre-chirping with α parameter=−1 on the transmitting side.

FIGS. 41A and 41B show the case in which a pre-chirping is made on the transmitting side. In FIGS. 41A and 41B, an optical signal is transmitted at a transmission speed of 10 Gbps through 4 spans using a 16-wavelengths multiplexed signal. In FIGS. 41A and 41B, the upper limit of the phase margin of 70% is indicated at the upper part of the graph, and the lowel limit is indicated at the lower part of the graph. The range between these upper and lower limits; refers to the dispersion tolerance. As shown in FIG. 41B, when a negative pre-chirping is made on the transmitting side, the upper limit is almost equal to the lower limit, thus allowing only a small tolerance. On the other hand, when a positive pre-chirping is made on the transmitting side as shown in FIG. 41A, there is a large range between the upper and lower limits, thereby allowing a large dispersion tolerance. A large dispersion tolerance indicates that an optical signal can be transmitted at a constant transmission characteristic independent of a change in the length of span of the transmission line although the amount of dispersion compensation of the repeater (inline amplifier) remains at a constant level. This indicates a large tolerance and there is no need of changing the amount of dispersion compensation of the inline amplifier even when the span length of a transmission line changes by branching and inserting an optical signal and the process performed at recovery, etc., and when the optical path of the optical signal is long due to the deterioration of the transmission line although the length of the transmission line is still the same. This is an advantage when a system is actually designed.

Described below is an example of a redundant configuration (path protection) required when a network is designed using an OADM device.

Figure 42:
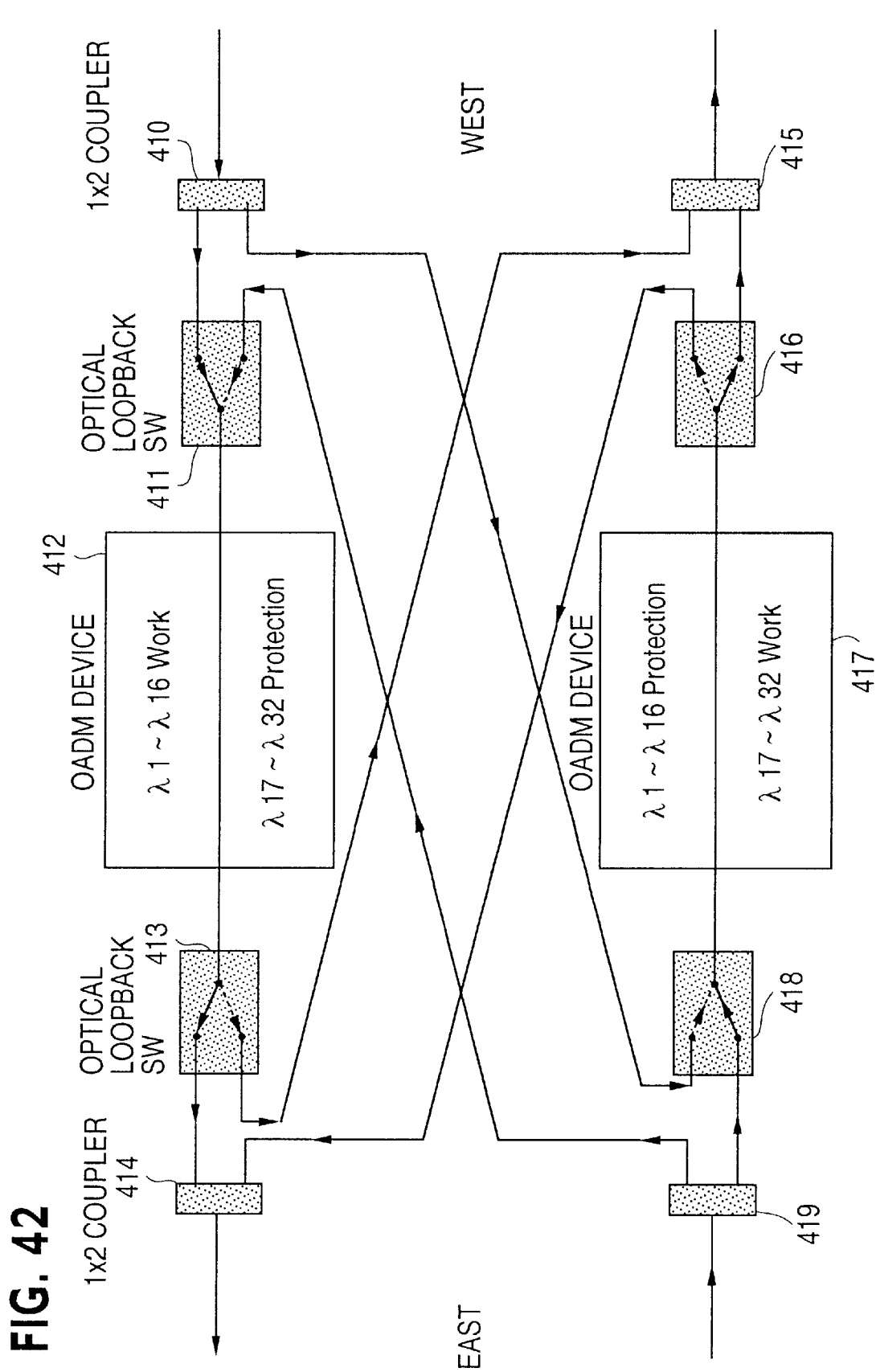
FIG. 42 shows the configuration of the OADM node in the 2-fiber BLSR.

FIG. 42 shows the configuration of the OADM node of a 2-fiber BLSR.

The wavelength division-multiplexing system for multiplexing 32 waves is described below by referring to FIG. 42. In the BLSR, half of the wavelength channels are used for current use (work) and another half for standby use (protection) to make 2-fiber redundant configuration having an up transmission line and a down -transmission line. For example, in FIG. 42, the wavelengths of λ1 through λ16 are set for current use in the communications from the west to the east, and the wavelengths of λ17 through λ32 are set for standby use in the communications from the east to the west.

Normally, an optical signal from the west passes from a 1×2 coupler 410 and is input to a wavelength add/drop unit 412, which uses the wavelengths of λ1 through λ16 for current use, through an optical loopback switch 411. An optical signal output from the wavelength add/drop unit 412 is transmitted to a transmission line through an optical loopback switch 413 and a 1×2 coupler 414. Similarly, when an optical signal is transmitted from the east to the west, it is output from a 1×2 coupler 419 to a wavelength add/drop unit 417 through an optical loopback switch 418. The wavelength add/drop unit 417 uses the wavelengths of λ17 through λ32 for current use. An optical signal from the wavelength add/drop unit 417 is output to the west terminal through an optical loopback switch 416 and 1×2 coupler 415. The wavelengths of λ1 through λ16 constantly carry the same information as the wavelengths of λ17 through λ32.

Figure 43:
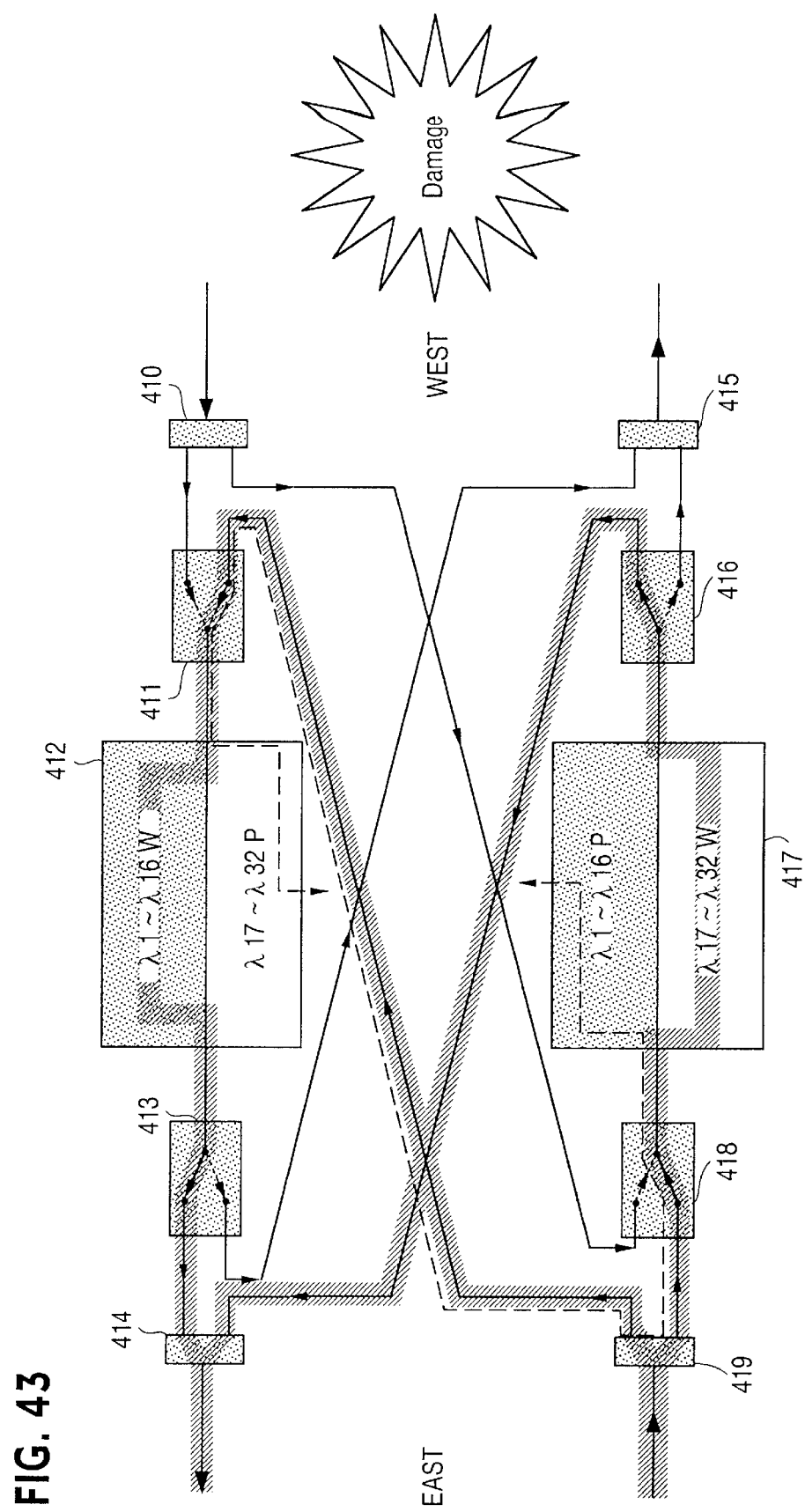
FIG. 43 shows the protection path (1) of the OADM node in the 2-fiber BLSR.

As shown in FIG. 43, if there arises a cable disconnection at the west terminal and an optical signal cannot be transmitted to the west, or an optical signal cannot be received at the west terminal, then a standby line having the wavelengths of λ1 through λ16 from the east is processed by the current device of the wavelength add/drop unit 412, and the current line having the wavelengths of λ17 through λ32 is processed by the current device of the wavelength add/drop unit 417. That is, an optical signal transmitted from the east terminal is transmitted from the 1×2 coupler 419 to the optical loopback switch 418 and also to the optical loopback switch 411. The optical loopback switch 411 disconnects the path from the west terminal and transmits an optical signal from the 1×2 coupler 419 to the wavelength add/drop unit 412. The wavelength add/drop unit 412 processes the optical signal having the wavelengths of λ1 through λ16 in the current device, and transmits it to the east terminal through the optical loopback switch 413 and the 1×2 coupler 414. Another optical signal from the 1×2 coupler 419 is input to the wavelength add/drop unit 417 through the optical loopback switch 418, and the optical signal having the wavelengths of λ17 through λ32 is processed and output by the current device. The optical path of an optical signal output from the wavelength add/drop unit 417 is switched by the optical loopback switch 416, and the signal is transmitted from the 1×2 coupler 414 to the east terminal.

Figure 44:
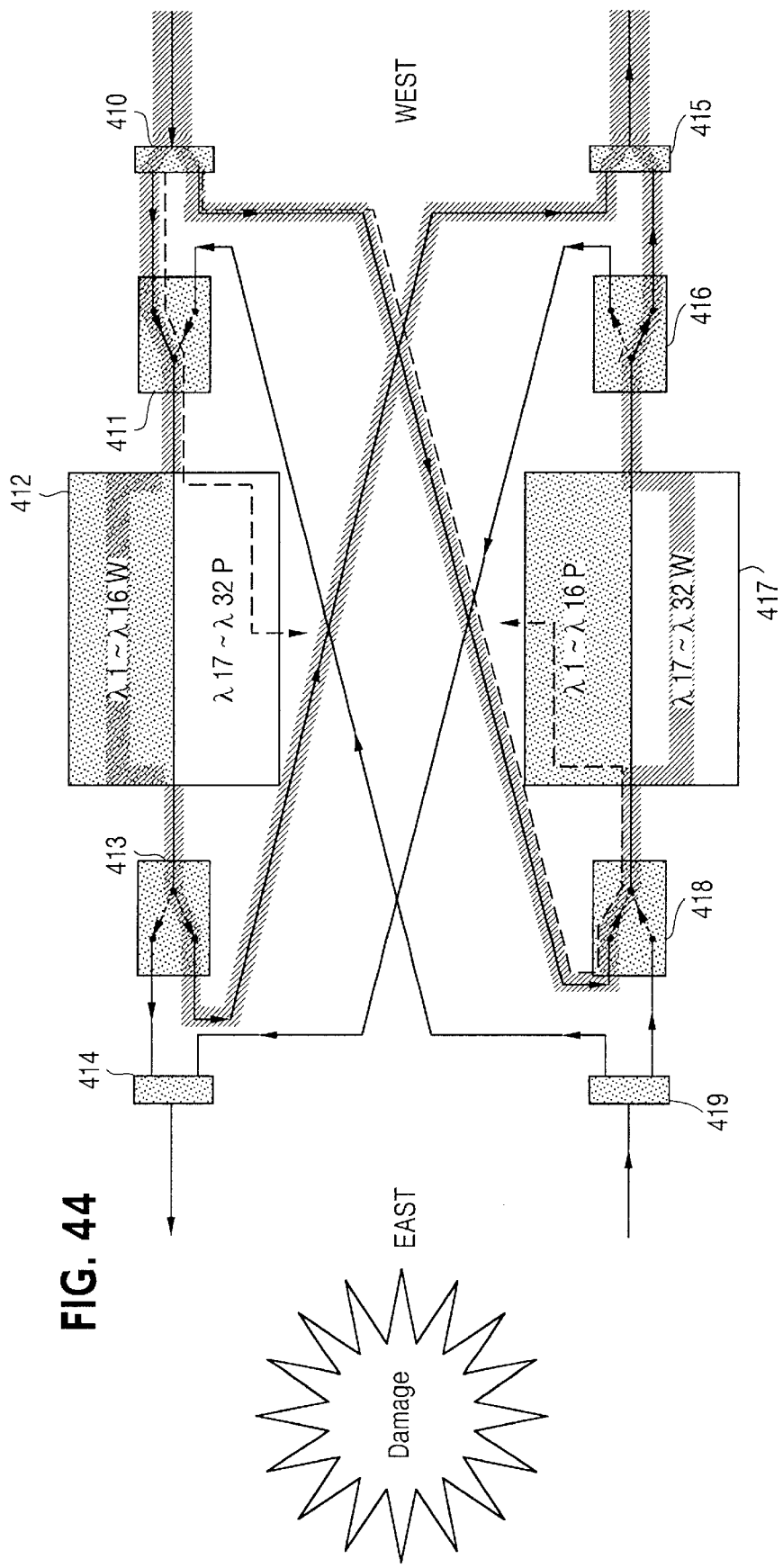
FIG. 44 shows the protection path (2) of the OADM node in the 2-fiber BLSR.

As shown in FIG. 44, when a cable disconnection arises at the east terminal, a process as described above is performed. However, the optical loopback switch 418 performs the operation of the optical loopback switch 411, and the optical loopback switch 413 performs the operation of the above described optical loopback switch 411.

As shown in FIG. 44, the wavelengths for current and standby uses by the wavelength add/drop unit 412 are used by the wavelength add/drop unit 417 with the current use and the standby use interchanging with each other so that there is no need of converting wavelengths of the optical signal when a cable is disconnected and the optical signal should be looped back. Therefore, the configuration of the device can be simplified, thereby reducing the cost of the entire system.

Figure 45:
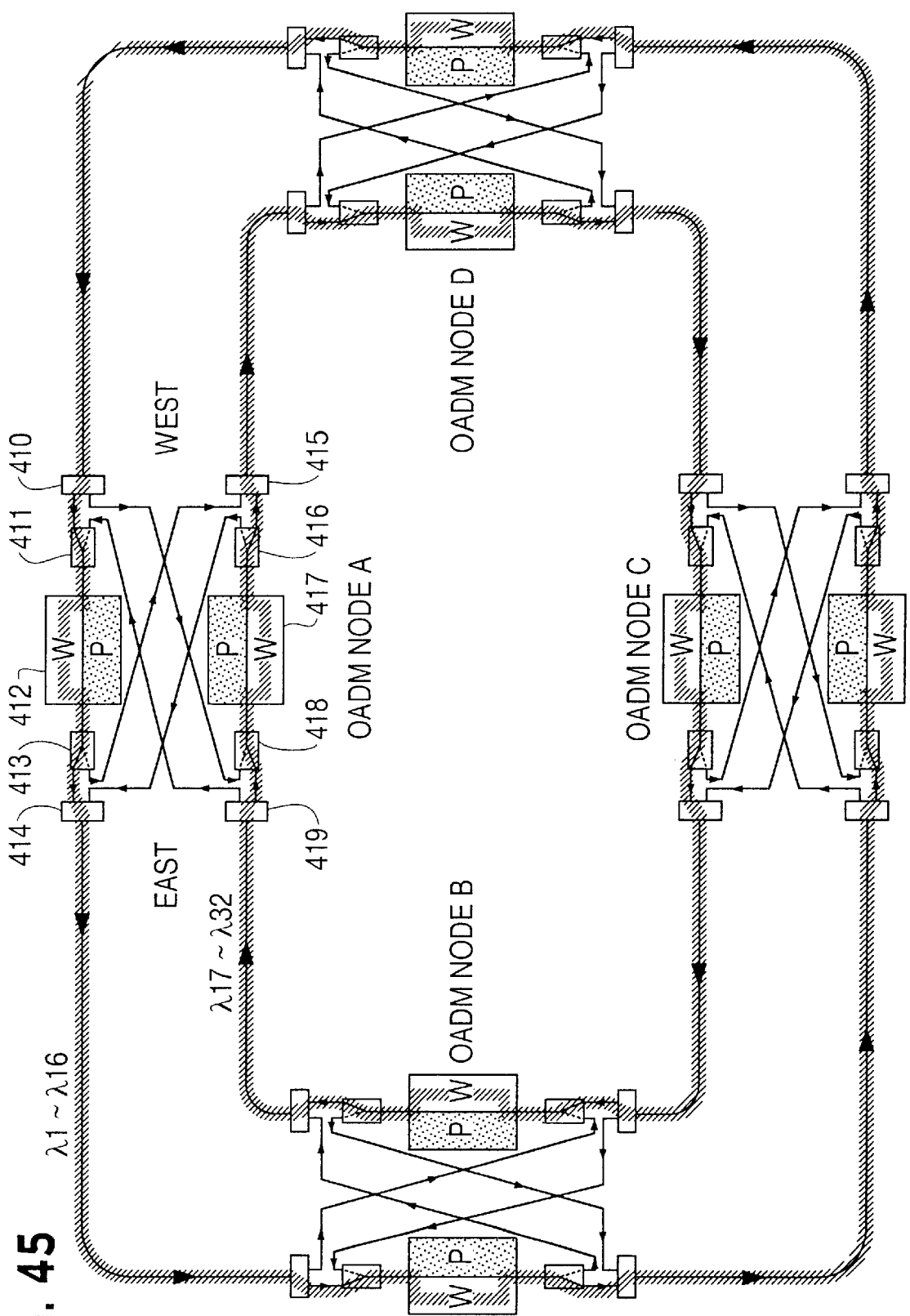
FIG. 45 shows the configuration of a normal 2-fiber BLSR network provided with an OADM node.
Figure 46:
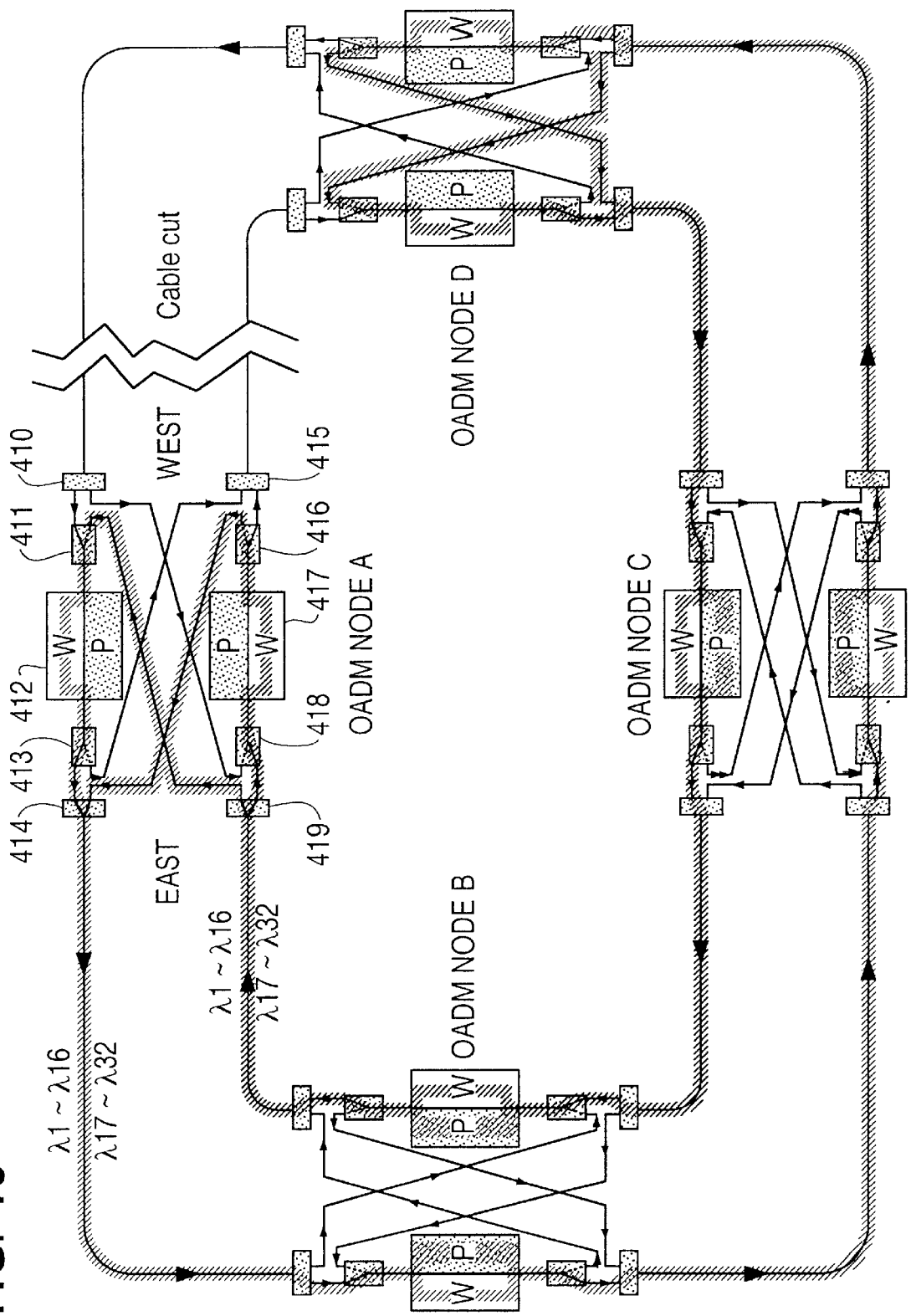
FIG. 46 shows the configuration when the optical cable is disconnected in the 2-fiber BLSR network provided with an OADM node.

The configuration of the device as shown in FIG. 44 is described by the name BLSR (bi-directional line switch ring), and adopted in a ring-shaped network (shown in FIGS. 45 and 46).

FIG. 45 shows a ring-shaped network in the normal operation. OADM nodes A, B, C, and D are in the same state as the OADM nodes shown in FIG. 42. FIG. 46 shows the configuration of the ring-shaped network in which the cable is disconnected at the west terminal of the OADM node A. In this case, the optical loopback switches 411 and 416 perform switching in the OADM node A as shown in FIG. 43. In the OADM node D, the optical loopback switches 413 and 418 interchange with each other as shown in FIG. 44.

Figure 47:
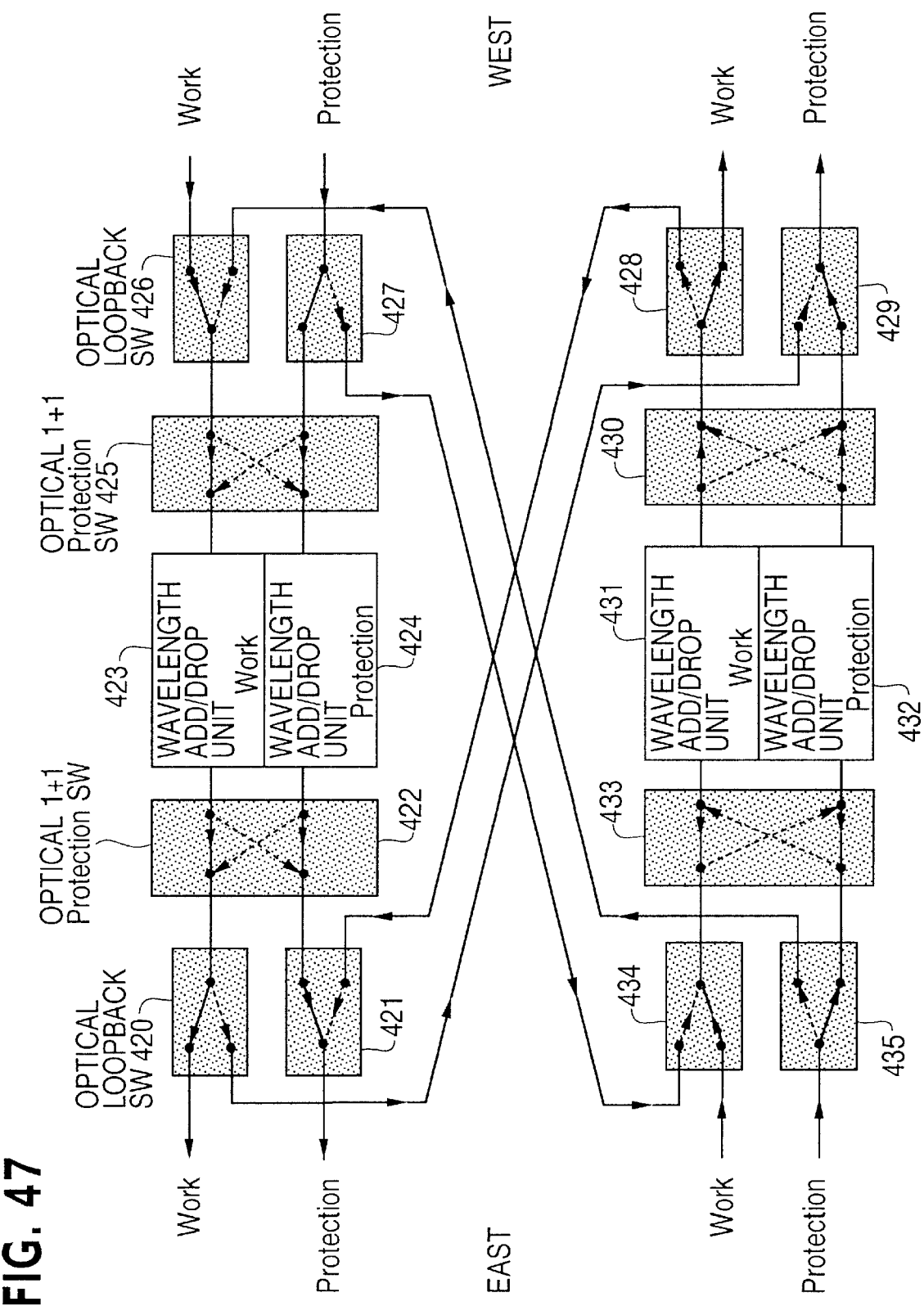
FIG. 47 shows the configuration of the OADM node in a 4-fiber BLSR.

FIG. 47 shows the configuration of the OADM node of the 4-fiber BLSR.

In the 4-fiber BLSR, the wavelength add/drop unit is designed also in a duplex configuration. In the line from the west to the east, a current wavelength add/drop unit 423 and a standby wavelength add/drop unit 424 are provided. In the line from the east to the west, a current wavelength add/drop unit 431 and a standby wavelength add/drop unit 432 are provided. In the 4-fiber BLSR, the transmission line also has a current and standby configuration. For example, a 32-channel is not divided into current and standby uses, but all 32 waves are used.

In the 1+1 protection, the same information is transmitted through a current transmission line and a standby transmission line. In the normal operation, an optical signal input from the west terminal is input to an optical 1+1 protection switch 425 through optical loopback switches 426 and 427. The optical 1+1 protection SW 425 switches the current and standby circuits. Normally, an optical signal transmitted through a high SN ratio is input to the current wavelength add/drop unit 423. An optical signal output from the optical 1+1 protection switch 425 is input to the current wavelength add/drop unit 423 or the standby wavelength add/drop unit 424, processed therein, and input to an optical 1+1 protection switch 422. The optical 1+1 protection switch 422 switches current and standby configurations, and an output optical signal is transmitted to the east terminal through optical loopback switches 420 and 421.

Current and standby optical signals transmitted from the east to the west are respectively input to the current wavelength add/drop unit 431 and a standby wavelength add/drop unit 432 through optical loopback switches 434 and 435 and an optical 1+1 protection switch 433, and then processed. The optical signal output from current and standby wavelength add/drop units 431 and 432 are transmitted to the west terminal through an optical 1+1 protection SW 430, and optical loopback switches 428 and 429.

Figure 48:
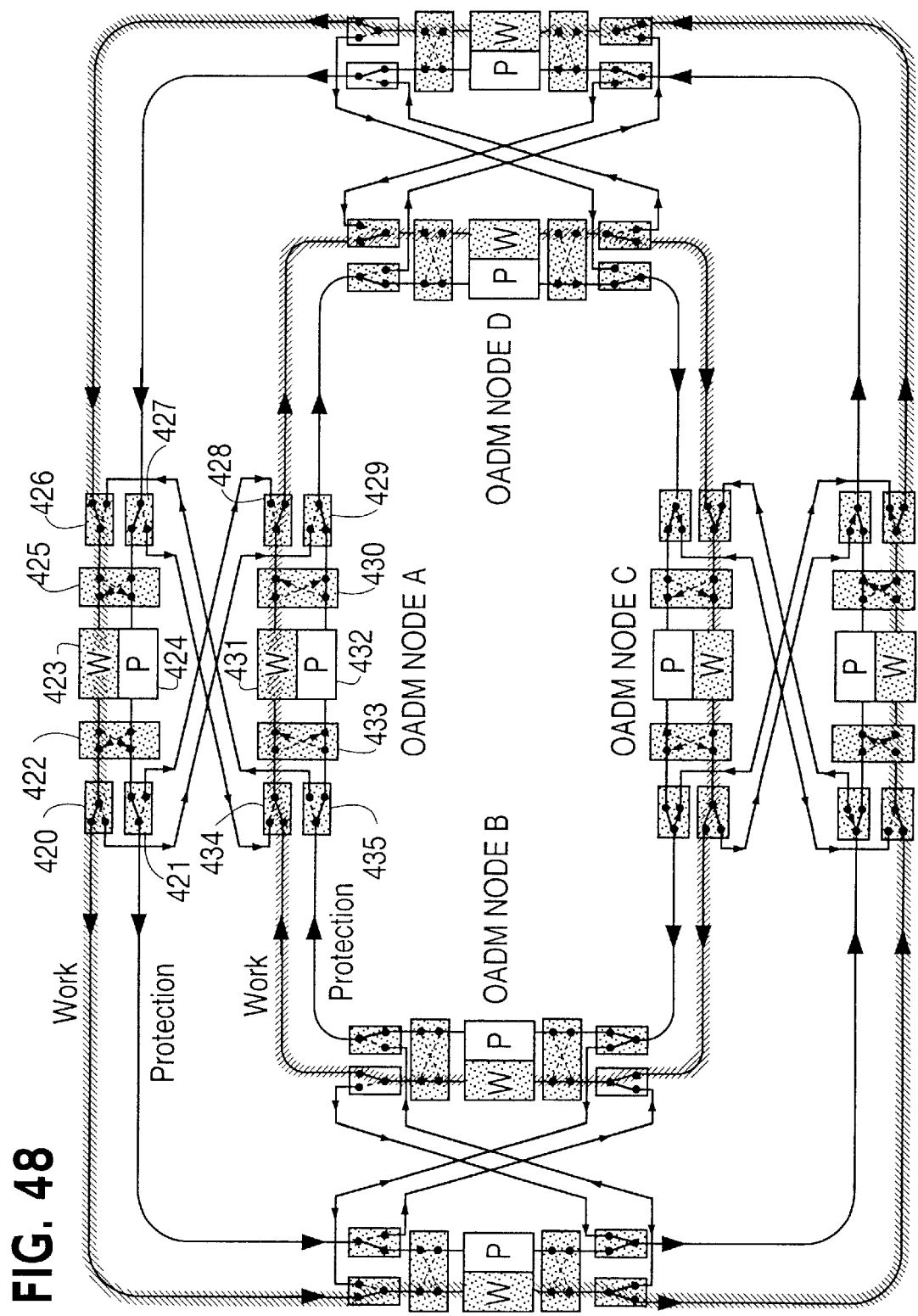
FIG. 48 shows the configuration of a normal 4-fiber BLSR network provided with an OADM node.

FIG. 48 shows an example of the configuration of a ring-shaped network using an OADM node shown in FIG. 47.

Figure 49:
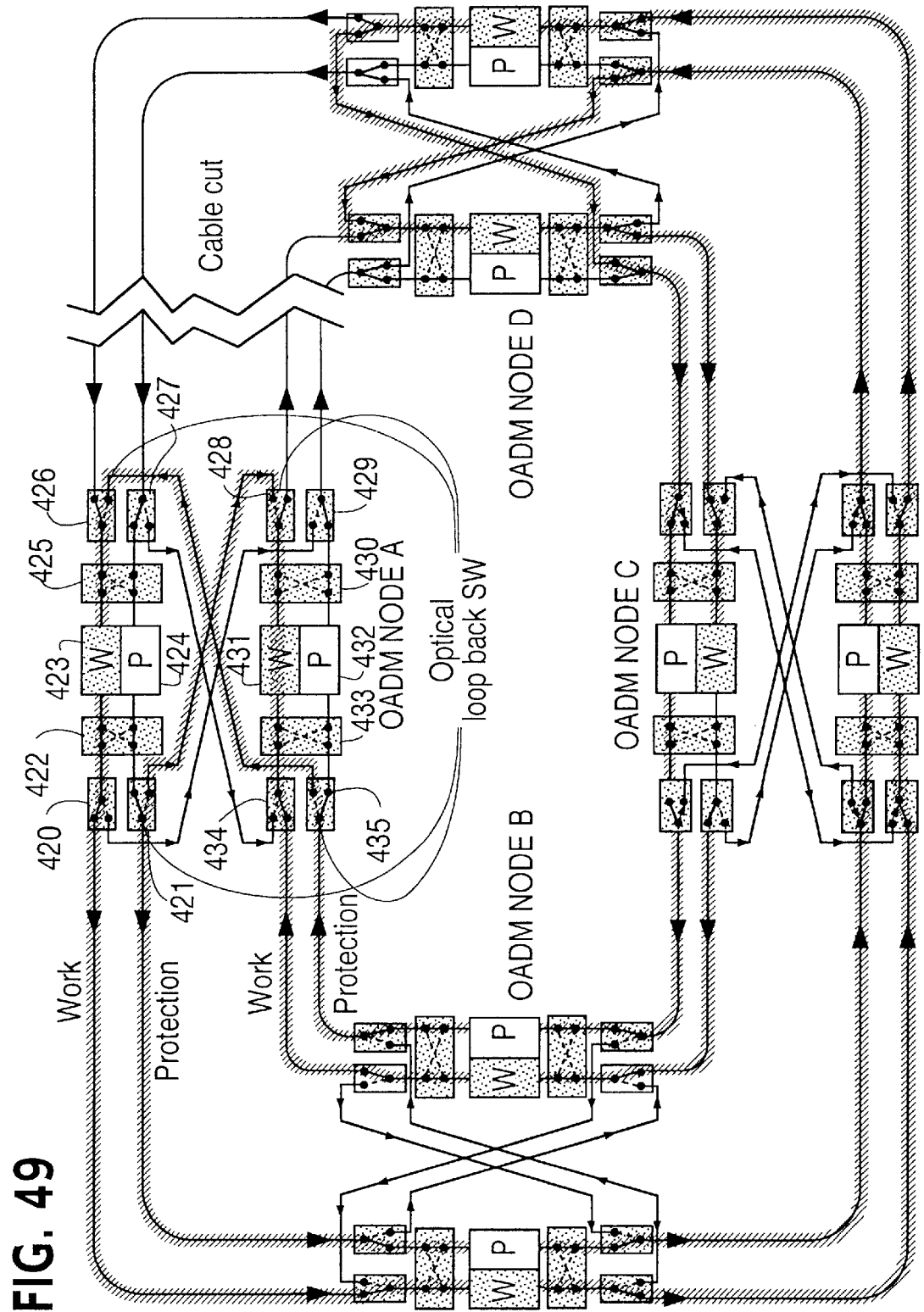
FIG. 49 shows the configuration when the optical cable is disconnected in the 4-fiber BLSR network provided with an OADM node.

When all cables west of the node shown in FIG. 47 cannot be used due to, for example, a disconnection, a loopback transfer is performed by the node (see FIG. 49). The optical signal input from the east current line is input as is to the current wavelength add/drop unit 431. The optical signal output from the current wavelength add/drop unit 431 is input to the optical loopback switch 428 through a optical 1+1 protection switch 430. However, it is not transmitted to the west terminal, but is transferred to the optical loopback switch 421, and is transmitted to the east terminal through a standby circuit. On the other hand, the optical signal input from the standby circuit at the east terminal is transferred by the optical loopback switch 435 to the optical loopback switch 426 after, for example, the disconnection of cable at the west terminal. The optical loopback switch 426 inputs the transferred optical signal to the current wavelength add/drop unit 423 through the optical 1+1 protection switch 425. When this optical signal is output from the current wavelength add/drop unit 423, it is transmitted to the east terminal through the optical 1+1 protection switch 422 and the optical loopback switch 420 using the current circuit.

Described above is the operations of the OADM node A shown in FIG. 49.

When all cables east cannot be used, the above described operations are performed. However, the operations of the optical loopback switch 428 are performed by the optical loopback switch 420, and the operations of the optical loopback switches 435 and 426 are performed by the optical 1+1 protection switches 427 and 434.

Described above is the operations of the OADM node D shown in FIG. 49.

Figure 50:
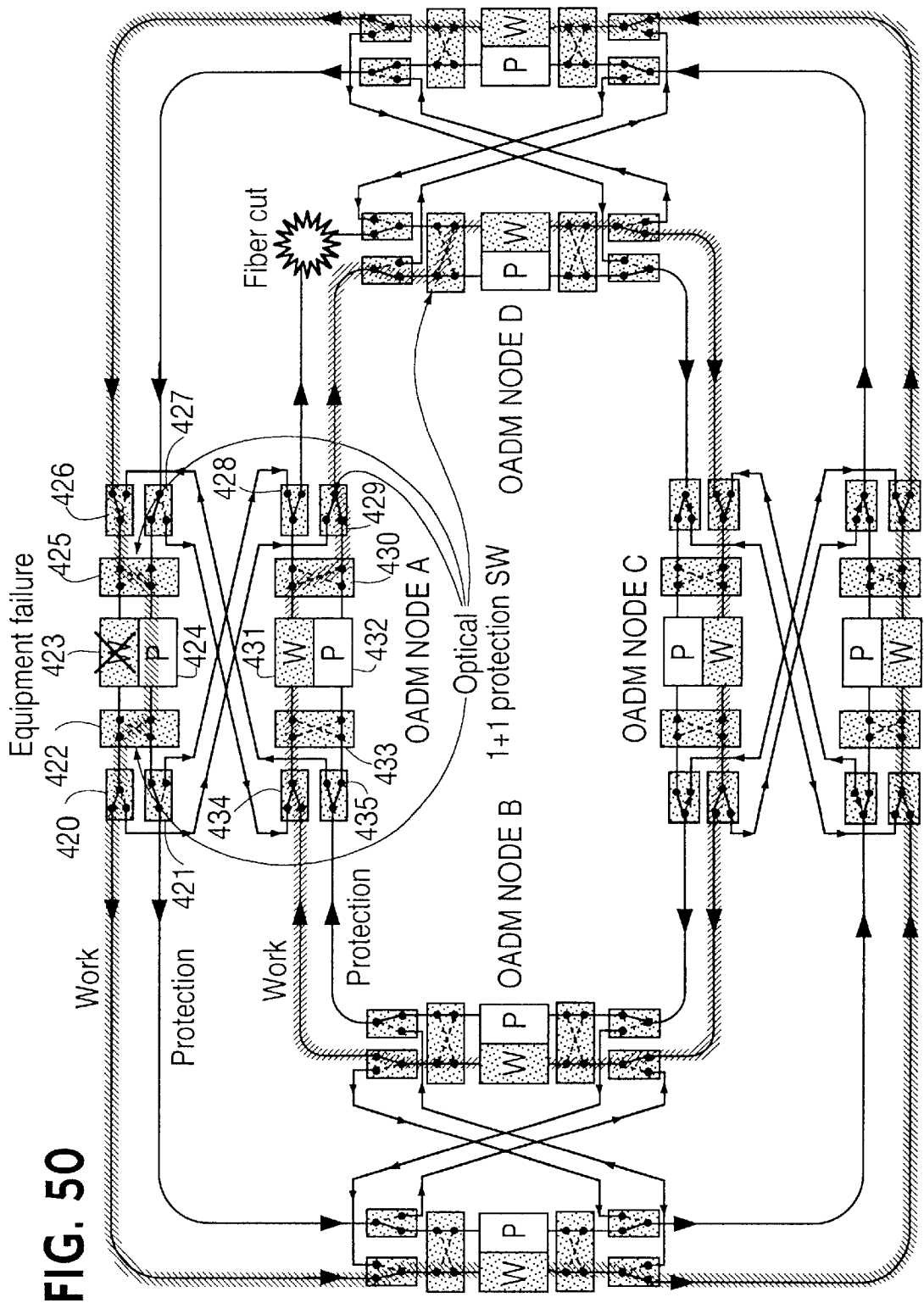
FIG. 50 shows the configuration when a node is faulty and the optical cable is disconnected in the 4-fiber BLSR network provided with an OADM node.

In the 4-fiber BLSR, actions can be taken even if the fault with the current wavelength add/drop unit and the disconnection of the transmission line simultaneously occur. Assume that, for example, as shown in FIG. 50, the current wavelength add/drop unit 423 becomes faulty, and simultaneously the current circuit toward the west is disconnected.

At this time, the path of the optical signal input from the east current circuit is switched to the standby path by the optical 1+1 protection switch 430 through the current wavelength add/drop unit 431, and is then transmitted to the west terminal through the optical loopback switch 429. On the other hand, the optical signal input from the west current circuit is transmitted by the optical 1+1 protection switch 425 to the standby wavelength add/drop unit 424. The signal transmitted from the wavelength add/drop unit 424 is transmitted to the optical loopback switch 420 by the optical 1+1 protection switch 422, and then output to the east terminal using the current circuit.

Thus, when the current circuit of the transmission line is not available, or when the current wavelength add/drop unit is not available, the optical 1+1 protection switch 430 switches the current and standby configurations to overcome the fault.

Figure 51:
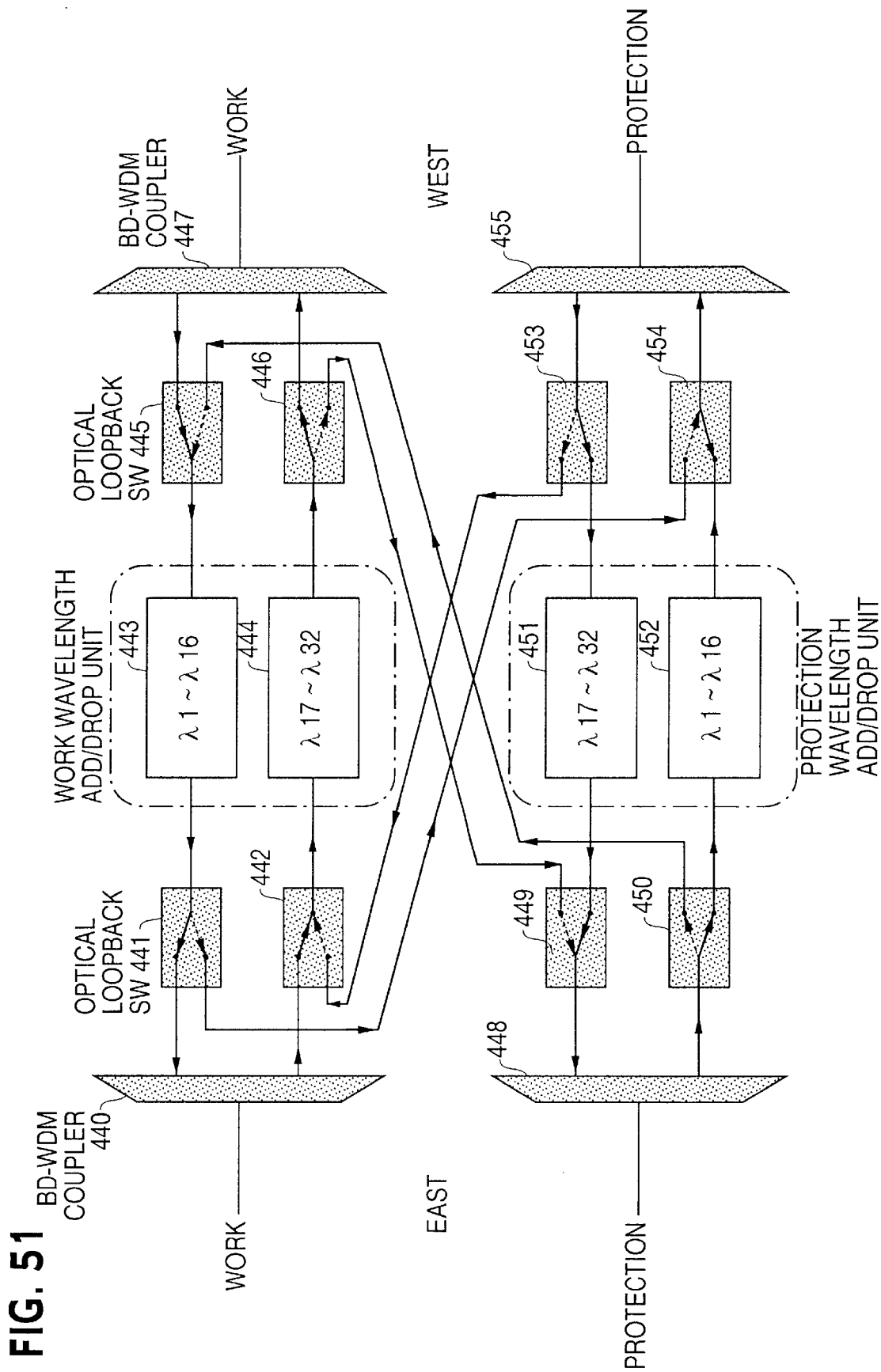
FIG. 51 shows the configuration of a node in the 2-fiber BLSR in the system in which bi-directional transmission is performed using a single fiber.

FIG. 51 shows the configuration of the node of the 2-fiber BLSR in the system for performing a bi-directional transmission using a single fiber.

With the configuration shown in FIG. 51, the optical signal input from the east terminal of the current circuit is branched by a BD-WDM coupler 440, and is input to a wavelength add/drop unit 444 for processing the wavelengths of λ17 through λ32 (assuming that the number of wavelength division-multiplex is 32). In this example, a BD-WDM coupler refers to bi-directional WDM coupler. The optical signal output from the device 444 is input to a BD-WDM coupler 447 through an optical loopback switch 446, and then transmitted to the west terminal using the current circuit. On the other hand, the optical signal having the wavelengths of λ1 through λ16 and input from the west terminal using the current circuit is input to the device 443 for processing the wavelengths λ1 through λ16 in the current wavelength add/drop units through an optical loopback switch 445. The optical signal output from the device 443 is wavelength-multiplexed with an optical signal passing toward west by the BD-WDM coupler 440 through an optical loopback switch 441, and is transmitted toward east through the current circuit.

Thus, when a bidirectional transmission is performed using a single fiber, different wavelengths are used so as not to increase the interference with optical signals propagating in the opposite direction. For example, in FIG. 51, a signal from the west to the east is assumed to have the wavelengths of λ1 through λ16, and a signal from the east to the west is assumed to have the wavelengths of λ17 through λ32.

The operations of the standby configuration during the normal operation are the same as those of the current configuration. However, the standby and current configurations are different from each other in available wavelengths. That is, the wavelengths of the optical signal from the west to the east are λ17 through λ32 while the wavelengths of the optical signal from the east to the west are λ1 through λ16.

Figure 52:
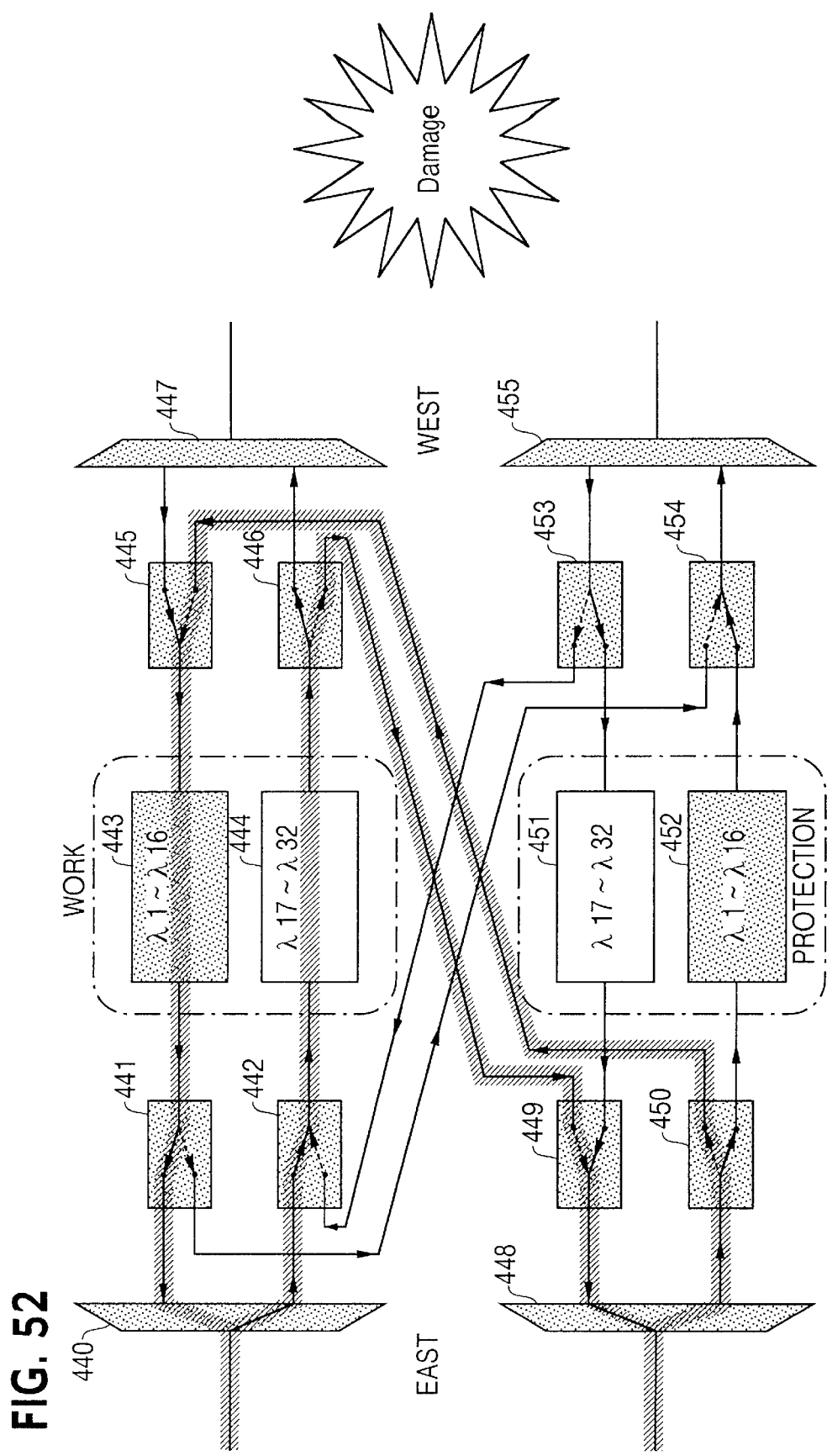
FIG. 52 shows a protection path (1) when a bi-directional OADM node is applied to the 2-fiber BLSR network.

Assume that both current and standby transmission lines at the west terminal of the OADM node cannot be used as shown in FIG. 52. The optical signal having the wavelength of λ1 through λ16 is input to a BD-WDM coupler 448 using the standby circuit from the east terminal, and is then transferred to the optical loopback switch 445 through the optical loopback switch 450. The optical loopback switch 445 inputs the transferred optical signal to the device 443 for processing the wavelengths of λ1 through λ16 in the current wavelength add/drop unit. The optical signal output from the device 443 is input to the BD-WDM coupler 440 through the optical loopback switch 441, and is then transmitted to the east terminal using the current circuit.

On the other hand, the optical signal having the wavelengths of λ17 through λ32 input to the BD-WDM coupler 440 from the east terminal using the current circuit is input to the device 444 through the optical loopback switch 442, and is then processed. The optical signal output from the device 444 is transferred by the optical loopback switch 446 to an optical loopback switch 449, and is then transmitted to the east terminal through the BD-WDM coupler 448 using the standby circuit.

Figure 53:
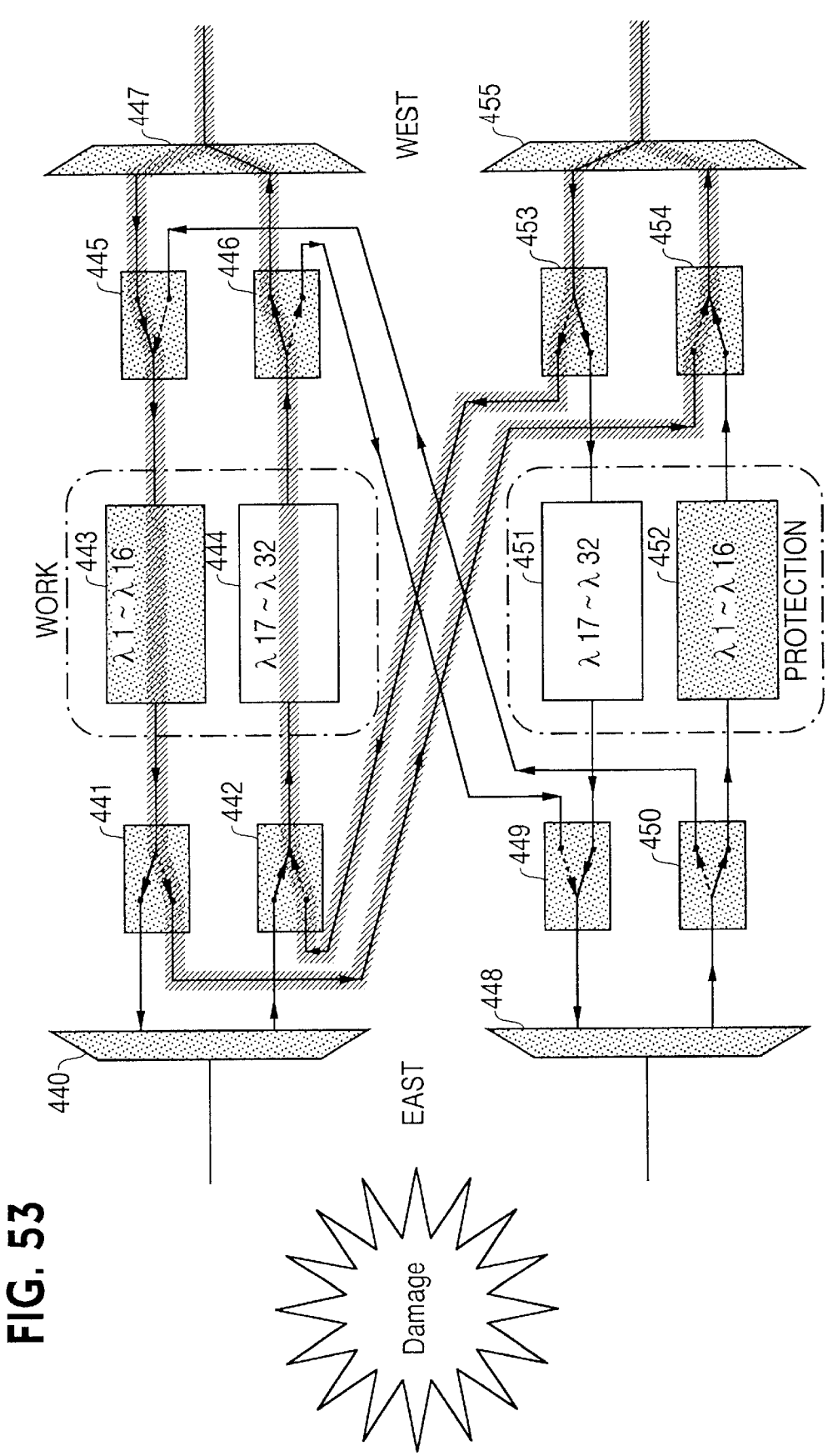
FIG. 53 shows a protection path (2) when a bi-directional OADM node is applied to the 2-fiber BLSR network.

Furthermore, as shown in FIG. 53, when both current and standby transmission lines at the east terminal of the OADM node cannot be used, the operations to be performed are the same as described above. However, the operations of an optical loopback switch 450 are performed by an optical loopback switch 453, and the operations of the optical loopback switches 446 and 449 are performed by the optical loopback switches 441 and 453.

Figure 54:
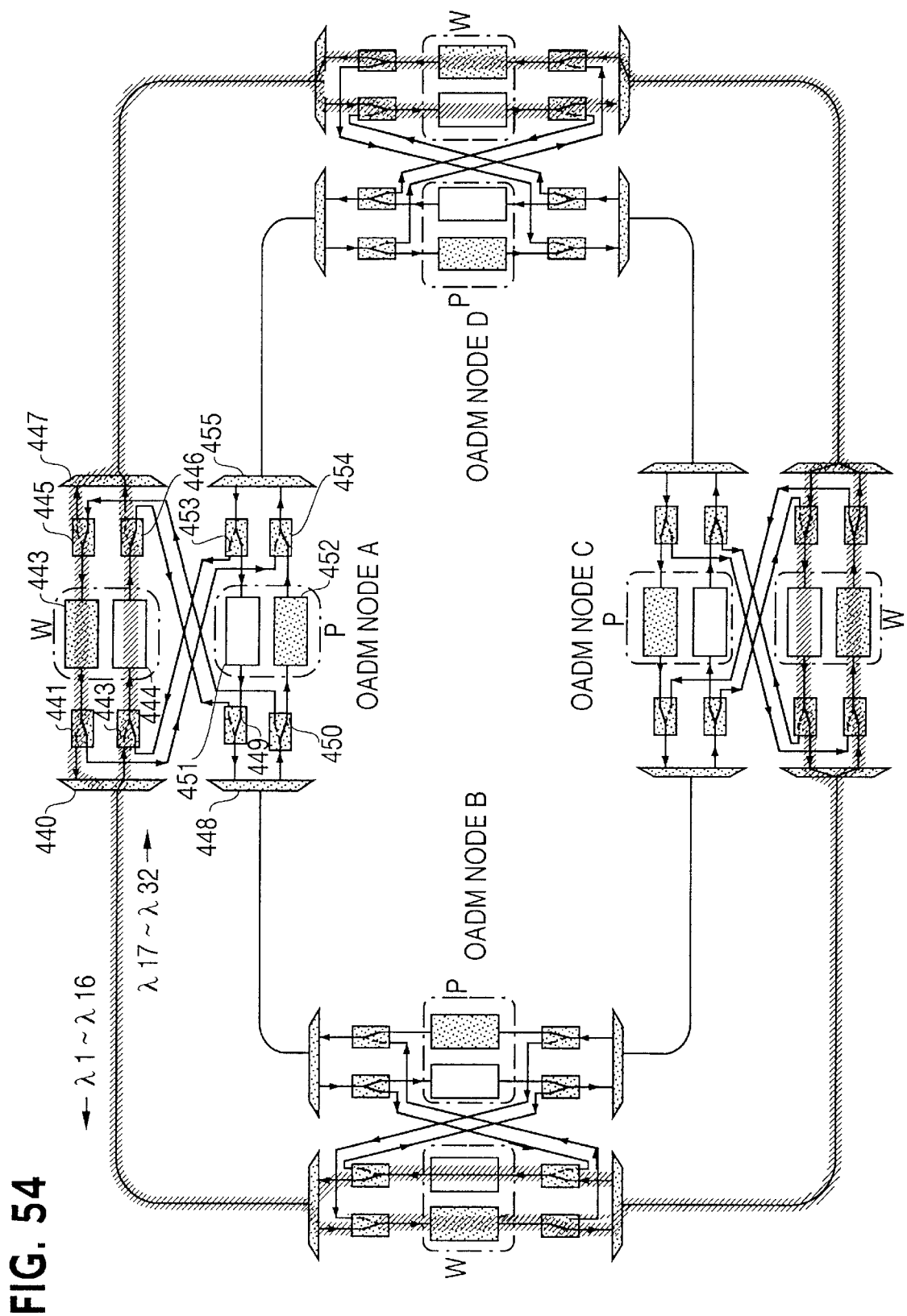
FIG. 54 shows the configuration of a normal 2-fiber BLSR network provided with a bi-directional OADM node.
Figure 55:
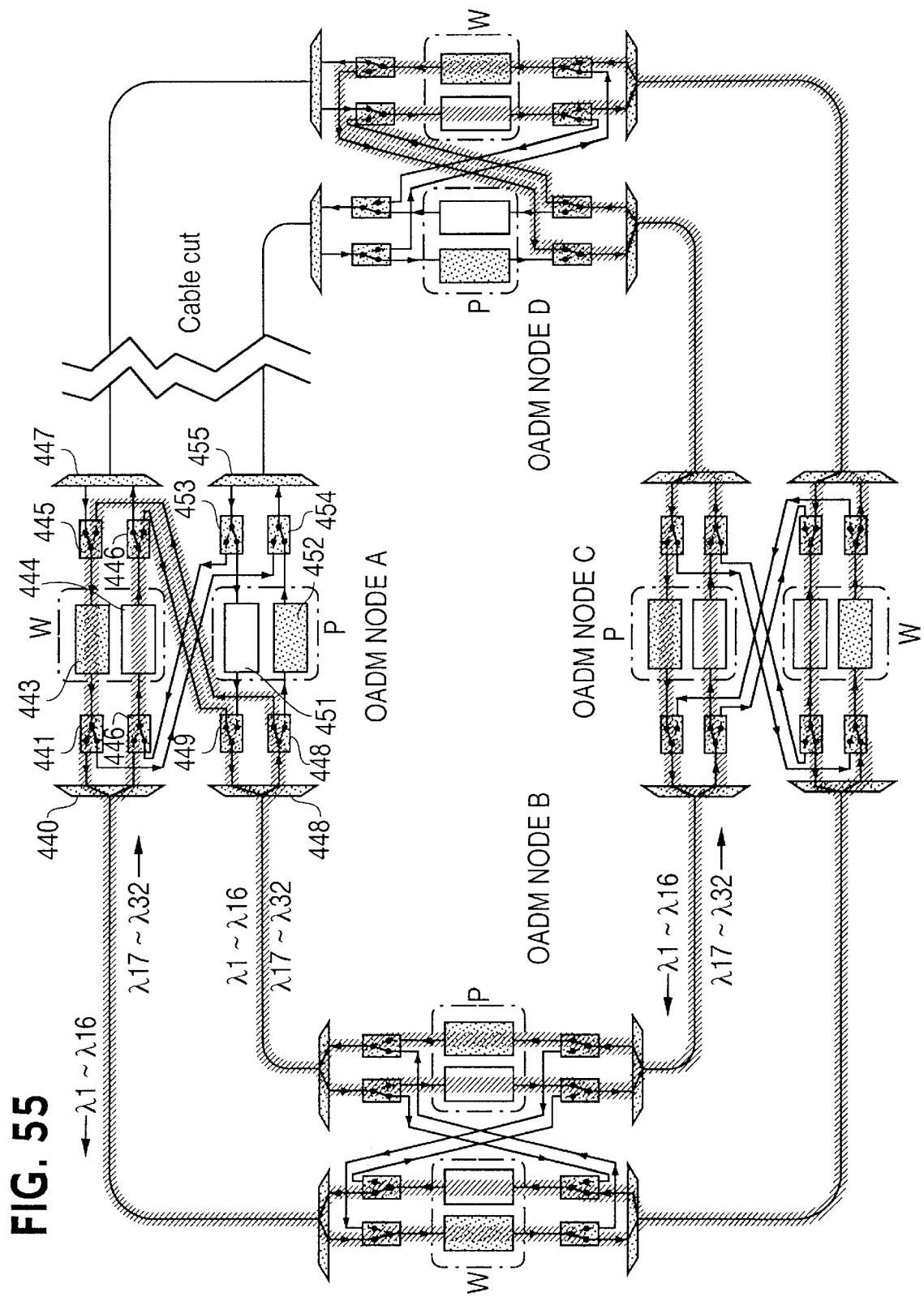
FIG. 55 shows the configuration when the optical cable is disconnected in the 2-fiber BLSR network provided with a bidirectional OADM node.

FIG. 54 shows the configuration of a ring-shaped network using the OADM node showr in FIG. 51. FIG. 55 shows an example of the case in which a cable is disconnected at the west terminal of the OADM node A. In this case, in the OADM node A, the optical loopback switches 445, 446, 449, and 450 operate as in the case shown in FIG. 52. As in the case shown in FIG. 53, the optical loopback switches 441, 442, 453, and 454 operate in the OADM node D.

The optical signal having the wavelengths of λ1 through λ32 described by referring to FIGS. 42 through 54 has the frame configuration corresponding to the SONET OC-192 or OC-48, OC-12, etc. in North America.

Figure 56:
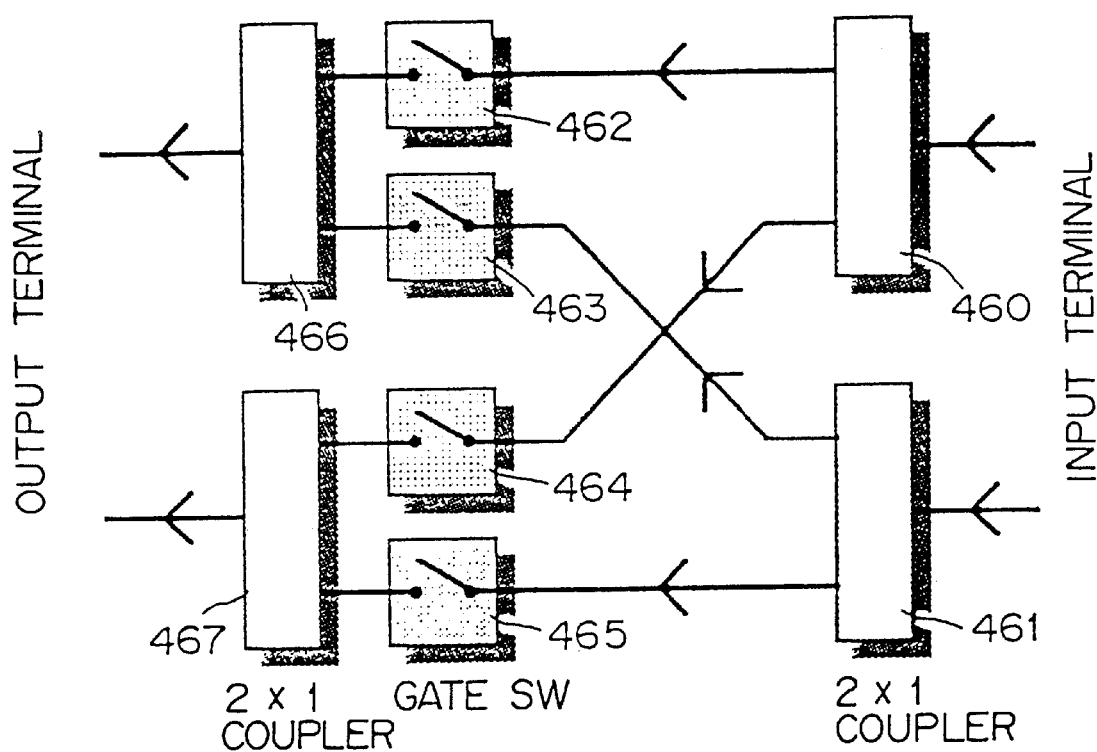
FIG. 56 shows an example of the configuration of an optical 1+1 protection switch.

FIG. 56 shows an example of the configuration of the optical 1+1 protection switch.

The OADM node is designed to have a redundant configuration using an optical 1+1 protection switch. When the optical 1+1 protection switch becomes faulty, the redundant configuration does not successfully function. Therefore, the optical 1+1 protection switch itself should also be redundantly designed.

The optical signal input from the input terminal is double-branched by 2×1 couplers 460 and 461, and input to gate switches 462 through 465. The optical signal which has passed through the gate switches 462 through 465 is output from 2×1 coupler 466 and 467 to the output terminal. When one of the 2×1 couplers 466 and 467 becomes faulty, one group of the gate switches 462 and 463 or the gate switches 464 and 465 is kept open, and the other group is kept closed for transmission of an optical signal. If one of the 2×1 couplers 460 and 461 becomes faulty, then one group of the gate switches 462 and 464 and the gate switches 463 and 465 is kept open and the other group is kept closed for transmission of an optical signal.

Thus, by switching the gate switches 462 through 465, an appropriate action can be taken to recover from the fault even if any of the 2×1 couplers 460, 461, 466, and 467 becomes faulty.

Figure 57A:
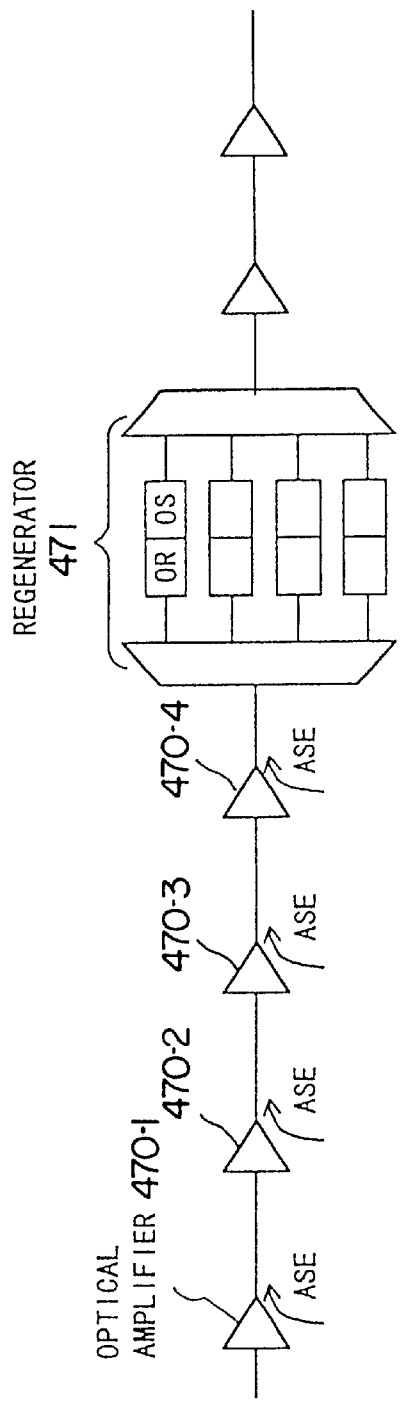
FIGS. 57A and 57B show the concept of how a regenerator can be added in an optical transmission line.
Figure 57B:
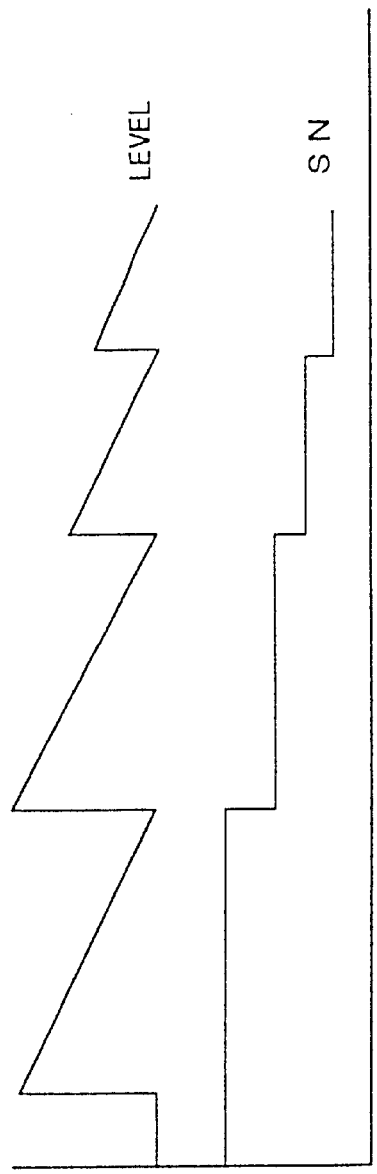

FIGS. 57A and 57B show the concept of how a regenerator should be inserted in an optical transmission system.

As shown in FIG. 57A, optical amplifiers 470-1 through 470-4 are provided in the optical transmission line. After connecting a predetermined number of the optical amplifiers 470-1 through 470-4, a regenerator 471 regenerates an optical signal.

FIG. 57B shows the level change and the deterioration of the SN ratio of an optical signal transmitted through the optical amplifiers 470-1 through 470-4. As shown in FIG. 57B, the level of the optical signal is amplified by the optical amplifiers 470-1 through 470-4, and is attenuated as the signal propagates through the transmission line. Therefore, if only the level of the optical signal is considered, an optical amplifier is provided at appropriate intervals in the transmission line. However, as indicated by the graph of the SN ratio shown in FIG. 57B, noise referred to as ASE (amplified spontaneous emission) is accumulated on the optical signal in the optical amplifier. Therefore, the SN ratio is gradually reduced. The speed of the deterioration of the SN ratio slows down as the deterioration goes on. However, in this state, the information of the optical signal cannot be correctly read. As a result, the optical signal should be regenerated using a regenerator 471 before the SN ratio indicates a serious value. The regenerator 471 demultiplexes a received wavelength-multiplexed optical signal into each wavelength, receives a light for each wavelength using an optical receiver OR, generates an electric signal in the 3R process, converts the electric signal into an optical signal using the optical transmitter OS, and then transmits the resultant signal. The optical signal regenerated for each wavelength is multiplexed with each other, and re-transmitted as a wavelength multiplexed optical signal through the transmission line.

The method of providing the regenerator 471 is to provide the regenerator 471 in the linear network such that the regenerator receives an optical signal which has passed through a predetermined number of optical amplifiers. However, in the ring-shaped network having a redundant configuration, the position of the regenerator should be optimally determined such that the regenerator can receive an optical signal which has passed through a predetermined number of optical amplifiers even if a standby path is available. Normally, if a regenerator is provided after five optical amplifiers, a standby path may not successfully function. Therefore, a regenerator can be provided after less than five optical amplifiers, for example, three amplifiers. With this configuration, an optical signal is regenerated earlier, and a larger number of expensive and complicated regenerators are incorporated into the network. However, this must be optimized in consideration of the performance and cost of the network.

The present invention realizes a simple-designed and inexpensive OADM device and system of an optional wavelength type.

What is claimed is:

1. An AOTF for selecting a wavelength from a multiplexed optical signal having a plurality of wavelengths, and branching or inserting the selected wavelength, comprising:
   a substrate;
   an RF signal source for causing a surface acoustic wave to propagate on the substrate;
   a resonator provided on the substrate; and
   a controller, connected to the resonator, to measure a surface temperature of the substrate by detecting a change in resonant frequency of the resonator, and to control the RF signal source thereby stabilizing operation of the AOTF.

2. An optical selection apparatus for connecting a terminal station to a WDM optical transmission apparatus by performing at least one of branching an optical signal from and inserting an optical signal to the WDM optical transmission apparatus, comprising:
   a first variable wavelength selection filter tuned to select a first wavelength and having an output connected to the terminal station; and
   a second variable wavelength selection filter tuned to select a second wavelength, different from the first wavelength, and having an output connected to the terminal station.

3. The apparatus according to claim 2, wherein the apparatus contains working and protection selection devices, each containing first and second variable wavelength selection filters, the apparatus further comprising a pair of 1×2 optical switches positioned respectively on either side of the working and protection selection devices, one port of each 1×2 optical switch being connected to the working selection device and another port of each 1×2 optical switch being connected to the protection selection device, the 1×2 optical switches normally being connected to the working selection device, but being switched to the protection selection device in the event of a fault in the working selection device.

4. The apparatus according to claim 2, further comprising a pair of 1×2 optical switches positioned respectively on either side of the first and second variable wavelength selection filters and the optical wavelength multiplexer, both of the 1×2 optical switches having one port connected to a working transmission line and one port connected to a protection transmission line, the 1×2 optical switches normally connecting the first and second variable wavelength selection filters to the working transmission line, but connecting the first and second variable wavelength selection filters to the protection transmission line when the working transmission line becomes faulty.

5. The apparatus according to claim 2 wherein each of said first and second variable wavelength selection filters include an AOTF or a plurality of cascade-connection AOTFs.

6. The apparatus according to claim 2 wherein:
   the first and second variable wavelength selection filters are tuned by respective RF signals supplied thereto,
   the first and second variable wavelength selection filters pass through wavelengths to which the first and second variable wavelength selection filters respectively are not tuned, and
   the power of the optical signals passed respectively through said first and second variable wavelength selection filters is adjusted by adjusting the power of the RF signals input to said first and second variable wavelength selection filters.

7. The apparatus according to claim 5, wherein:
   RF signals are input to the AOTFs to tune the first and second variable wavelength selection filters to wavelengths corresponding to the RF signals,
   the apparatus further comprises an optical spectrum monitor downstream from the first and second variable wavelength selection filters for monitoring an optical frequency and an optical power of optical signals having the first and second wavelengths,
   optical signals having the first and second wavelengths are feedback controlled to have optimum optical wavelength and optical power by varying the frequency and power of the RF signals used in driving the AOTFs.

8. The apparatus according to claim 7, further comprising:
   a temperature control circuit to control the temperature of the AOTFs of the first and second variable wavelength selection filters, wherein
   said temperature control circuit being feedback controlled based on the monitoring by said optical spectrum monitor so that optical signals having the first and second wavelengths have optimum optical wavelength and optical power.

9. The apparatus according to claim 7 wherein:
an optical switch is provided at an input to the optical spectrum monitor so that the optical spectrum monitor can be switched to monitor at least optical signals downstream from the first and second variable wavelength selection filters and optical signals upstream from the first and second variable wavelength selection filters.

10. The apparatus according to claim 5, wherein RF signals are applied to the AOTFs of the first and second variable wavelength selection filters to respectively select optical signals having the first and second wavelengths, the apparatus further comprising:
an optical coupler provided at the output of at least one of the first and second variable wavelength selection filters to branch a portion of the selected optical signal;
a photodetector connected to the optical coupler to monitor the optical power of the signal branched thereby, the frequency or power of the RF signal applied to the AOTF of the at least one selection filter being varied to maximize the optical power monitored by the photodetector, with characteristic fluctuations in the AOTF of the at least one selection filter being processed.

11. The apparatus according to claim 10 wherein:
a low frequency signal is superposed on the RF signal applied to the AOTF of the at least one selection filter to determine a center position of the optical wavelength or to determine the optimum RF power, based on the optical signal received by the photodetector.

12. The apparatus according to claim 2 wherein:
the WDM optical transmission apparatus transmits optical signals on successively different optical wavelengths; and
the first wavelength to which said first variable wavelength selection filter is tuned and the second wavelength to which said second variable wavelength selection filter is tuned are adjacent wavelengths of the successively different wavelengths.

13. The apparatus according to claim 2 wherein:
the first and second variable wavelength selection filters pass through wavelengths to which the first and second variable wavelength selection filters respectively are not tuned,
the first and second wavelengths are branched from the WDM optical transmission apparatus to the terminal station such that said first and second variable wavelength selection filters function only in branching optical signals, and
the apparatus further comprises an optical wavelength multiplexer to insert an optical signal from a terminal station by wavelength multiplexing the optical signal from a terminal station with a signal which has passed through said first and second variable wavelength selection filters.

14. The apparatus according to claim 13, further comprising:
a branch wavelength multiplexer connecting the outputs of the first and second variable wavelength selection filters to the terminal station, for multiplexing an optical signal having the first wavelength with an optical signal having the second wavelength.

15. The apparatus according to claim 14, further comprising a variable optical attenuator, provided between the output of said first variable wavelength selection filter and said branch wavelength multiplexer to adjust a power of the optical signal having the first wavelength to be approximately equal to a power of the optical signal having the second wavelength.

16. The apparatus according to claim 14 wherein:
an optical spectrum monitor is connected to an output port of said branch wavelength multiplexer to monitor the existence, wavelength, and power of the optical signals multiplexed by the branch wavelength multiplexer.

17. The apparatus according to claim 13, wherein:
an input transmission line supplies optical signals to the first variable wavelength selection filter,
the optical wavelength multiplexer supplies optical signals to an output transmission line, and
the apparatus further comprises optical amplifiers, provided respectively between the input transmission line and the first variable wavelength selection filter, and between said optical wavelength multiplexer and the output transmission line, to compensate for signal loss in the transmission lines and said optical selection apparatus.

18. The optical transmission apparatus according to claim 17 wherein:
said optical amplifier between the input transmission line and said first variable wavelength selection filter is formed by a first amplifier device, a dispersion compensator to compensate for dispersion of the optical signal caused in the input transmission line, and a second amplifier device to compensate for signal loss in said dispersion compensator.

19. The apparatus according to claim 17, further comprising:
a coupler to branch light, provided between said input transmission line and said first optical amplifier or between said second optical amplifier and said output transmission line; and
a monitor to monitor the existence, wavelength, and power of light branched by said coupler.

20. The apparatus according to claim 17 wherein:
optical signals having the first and second wavelengths are branched by said first and second variable wavelength selection filters even when the optical signal to be inserted by the wavelength multiplexer is not received.

21. The apparatus according to claim 13 wherein:
the first variable wavelength selection filter receives optical signals from an input transmission line,
a demultiplexer is provided between said first variable wavelength selection filter and the input transmission line;
a part of optical signals transmitted from said demultiplexer are branched, and the branched optical signals are transmitted to a receiving terminal station;
said first and second variable wavelength selection filters pass through to an output transmission line, optical signals having wavelengths to which the first and second variable wavelength section filters are not tuned,
the first and second wavelengths are not transmitted to the output transmission line.

22. The apparatus according to claim 2, wherein:
the first and second variable wavelength selection filters output to a through port optical signals having wavelengths to which the first and second wavelength selection filters are respectively not tuned, the apparatus further comprises a polarization dispersion eliminator provided downstream from the through ports of said first and second variable wavelength selection filters.

23. The apparatus according to claim 22, wherein first and second polarization dispersion eliminators are respectively provided downstream from the through ports of the first and second variable wavelength selection filters.

24. The apparatus according to claim 23, wherein the first and second polarization dispersion eliminators each include a PANDA fiber.

25. An optical transmission unit for connecting a terminal station to a WDM optical transmission apparatus by performing at least one of branching an optical signal from and inserting an optical signal to the WDM optical transmission apparatus, comprising:

a first variable wavelength tunable filter having an input, a control port and first and second outputs, to select an optical signal having a wavelength corresponding to a signal supplied to the control port, the selected optical signal being output from the first output and remaining optical signals being output from the second output; and a second variable wavelength tunable filter having an input, a control port and first and second outputs, to select an optical signal having a wavelength corresponding to a signal supplied to the control port, the selected optical signal being output from the first output and remaining optical signals being output from the second output, the input of the second variable wavelength tunable filter being connected to one of the outputs of the first variable wavelength tunable filter, the signal supplied to the control port of the second variable wavelength tunable filter corresponding to a wavelength adjacent to but different from the wavelength of the optical signal selected by the first variable wavelength tunable filter.

26. An optical transmission unit according to claim 25, wherein the first and second variable wavelength tunable filter s are acousto-optic tunable filters.

27. An optical transmission unit according to claim 25, wherein the input of the second variable wavelength tunable filter is connected to the second output of the first variable wavelength tunable filter.

28. An optical transmission unit according to claim 25, further comprising a wavelength multiplexer to combine the optical signals output from the first outputs of the first and second variable wavelength tunable filters.

* * * * *